US010044235B2

(12) United States Patent
Takatsu et al.

(10) Patent No.: US 10,044,235 B2
(45) Date of Patent: Aug. 7, 2018

(54) WIRELESS POWER TRANSFER SYSTEM AND VEHICLE ELECTRIC POWER SUPPLY DEVICE

(71) Applicant: IHI CORPORATION, Tokyo (JP)

(72) Inventors: Yuji Takatsu, Tokyo (JP); Sho Hashizume, Tokyo (JP); Susumu Tokura, Tokyo (JP); Akio Ueda, Tokyo (JP); Kei Akune, Tokyo (JP); Tooru Hayashi, Tokyo (JP); Shohei Shibata, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 15/267,330

(22) Filed: Sep. 16, 2016

(65) Prior Publication Data
US 2017/0001531 A1 Jan. 5, 2017

Related U.S. Application Data

(63) Continuation of application No. PCT/JP2015/058074, filed on Mar. 18, 2015.

(30) Foreign Application Priority Data

Mar. 18, 2014 (JP) .................................. 2014-054461
Mar. 21, 2014 (JP) .................................. 2014-059316

(51) Int. Cl.
*H01F 27/42* (2006.01)
*H01F 37/00* (2006.01)
(Continued)

(52) U.S. Cl.
CPC ............. *H02J 50/90* (2016.02); *B60L 11/182* (2013.01); *B60L 11/1824* (2013.01); *E04H 6/24* (2013.01);
(Continued)

(58) Field of Classification Search
CPC ................ B60L 11/1829; B60L 11/182; B60L 11/1831; H02J 50/12; H02J 50/80; H02J 50/90; H02J 7/025; Y10T 90/125
See application file for complete search history.

(56) References Cited

U.S. PATENT DOCUMENTS 5,821,731 A * 10/1998 Kuki .................. B60L 11/1805
320/108
5,850,135 A 12/1998 Kuki et al.
(Continued)

FOREIGN PATENT DOCUMENTS

CN 201674240 U 12/2010
CN 102130511 A 7/2011
(Continued)

*Primary Examiner* — Rexford Barnie
*Assistant Examiner* — Rasem Mourad
(74) *Attorney, Agent, or Firm* — Volpe and Koenig, P.C.

(57) ABSTRACT

The wireless power transfer system obtains, by means of data transfer, specific coil position information that is coil position information corresponding to information related to a position of the electric power supply secondary coil in a specific object that is an object that has made an electric power supply request, and electric power is supplied in a wireless manner from the electric power supply primary coil to the electric power supply secondary coil after the posture/position adjustment mechanism adjusts the relative posture or position between the electric power supply primary coil and the electric power supply secondary coil incorporated in the specific object based on the information related to the position of the electric power supply secondary coil in the specific object corresponding to the specific coil position information.

3 Claims, 24 Drawing Sheets

(51) Int. Cl.

| | | |
|---|---|---|
| *H01F 38/00* | (2006.01) | |
| *H02J 50/90* | (2016.01) | |
| *E04H 6/24* | (2006.01) | |
| *H02J 7/00* | (2006.01) | |
| *H02J 7/02* | (2016.01) | |
| *H02J 50/10* | (2016.01) | |
| *B60L 11/18* | (2006.01) | |
| *H02J 50/80* | (2016.01) | |
| *H02J 50/12* | (2016.01) | |
| *B60M 7/00* | (2006.01) | |
| *E04H 6/42* | (2006.01) | |

(52) U.S. Cl.
CPC .......... *H02J 7/0027* (2013.01); *H02J 7/0042* (2013.01); *H02J 7/025* (2013.01); *H02J 50/10* (2016.02); *H02J 50/12* (2016.02); *H02J 50/80* (2016.02); *B60L 11/1829* (2013.01); *B60M 7/003* (2013.01); *E04H 6/42* (2013.01); *Y02T 10/7005* (2013.01); *Y02T 10/7055* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 8,035,255 B2 | 10/2011 | Kurs et al. | |
| 8,106,539 B2 | 1/2012 | Schatz et al. | |
| 9,197,093 B2* | 11/2015 | Sagata | B60L 11/182 |
| 9,555,716 B2* | 1/2017 | Martin | B60L 11/182 |
| 9,577,449 B2* | 2/2017 | Hoover | H02J 7/025 |
| 2010/0123452 A1* | 5/2010 | Amano | B60L 11/182 |
| | | | 323/359 |
| 2010/0295506 A1 | 11/2010 | Ichikawa | |
| 2011/0063213 A1 | 3/2011 | Kang et al. | |
| 2011/0164700 A1 | 7/2011 | Porat et al. | |
| 2011/0175455 A1* | 7/2011 | Hashiguchi | H02J 5/005 |
| | | | 307/104 |
| 2013/0058426 A1 | 3/2013 | Porat et al. | |
| 2013/0335015 A1* | 12/2013 | Ichikawa | H02J 7/025 |
| | | | 320/108 |
| 2014/0015312 A1* | 1/2014 | Niizuma | E04H 6/22 |
| | | | 307/9.1 |
| 2014/0217966 A1* | 8/2014 | Schneider | B60L 11/182 |
| | | | 320/108 |
| 2015/0167340 A1 | 6/2015 | Niizuma | |
| 2016/0006269 A1 | 1/2016 | Hashiguchi | |
| 2016/0075249 A1 | 3/2016 | Grabar et al. | |
| 2016/0297305 A1* | 10/2016 | Ichikawa | B60L 11/182 |
| 2017/0018963 A1 | 1/2017 | Takatsu et al. | |

FOREIGN PATENT DOCUMENTS

| | | | |
|---|---|---|---|
| CN | 102160254 A | 8/2011 | |
| CN | 102465619 A | 5/2012 | |
| CN | 103502546 A | 1/2014 | |
| EP | 2546950 A2 | 1/2013 | |
| JP | 09-213378 A | 8/1997 | |
| JP | 2009-134193 A | 6/2009 | |
| JP | 2010-124522 A | 6/2010 | |
| JP | 2010-246348 A | 10/2010 | |
| JP | 2011-060260 A | 3/2011 | |
| JP | 2011-097814 A | 5/2011 | |
| JP | 2011-147280 A | 7/2011 | |
| JP | 2011-217452 A | 10/2011 | |
| JP | 2011217452 A * | 10/2011 | ............ B60L 11/182 |
| JP | 2012-010551 A | 1/2012 | |
| JP | 2014-043698 A | 3/2014 | |
| WO | 2014/030463 A1 | 2/2014 | |
| WO | 2014/038691 A1 | 3/2014 | |

* cited by examiner

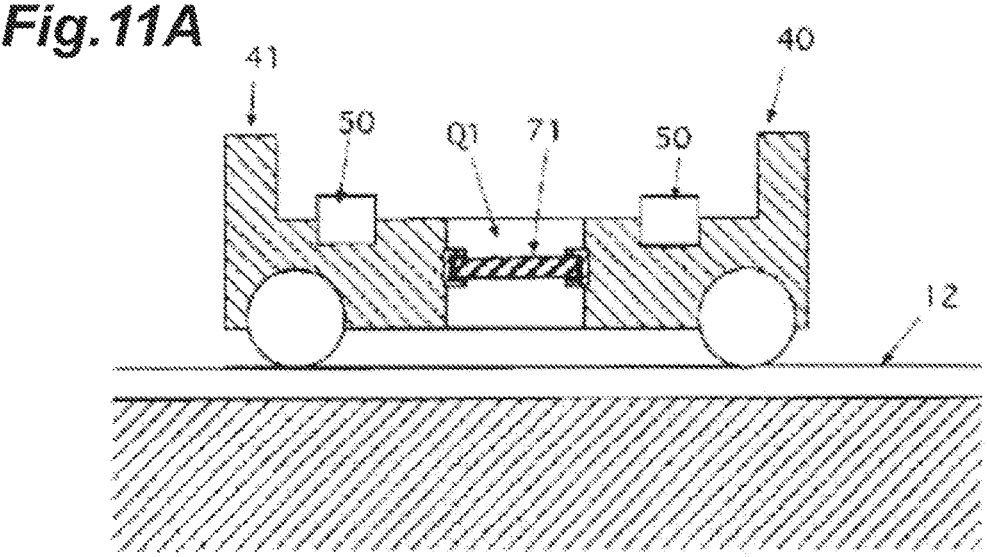
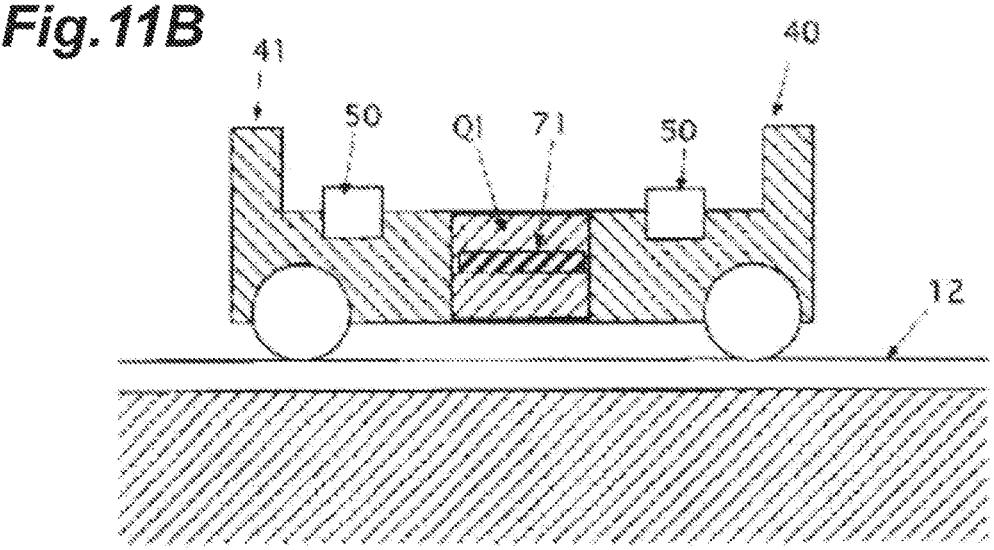

WIRELESS POWER TRANSFER SYSTEM AND VEHICLE ELECTRIC POWER SUPPLY DEVICE

CROSS-REFERENCE TO RELATED APPLICATIONS

This application is a continuation application of International Application No. PCT/JP2015/058074, filed Mar. 18, 2015, which claims priority to Japanese Patent Application No. 2014-054461 filed Mar. 18, 2014 and Japanese Patent Application No. 2014-059316 filed Mar. 21, 2014. The contents of these applications are incorporated herein by reference in their entirety.

TECHNICAL FIELD

The present disclosure relates to a wireless power transfer system and a vehicle electric power supply device that supplies electric power to a vehicle capable of receiving power supply.

BACKGROUND ART

In recent years, vehicles driven by electric power have been used.

This leads to a need for supplying electric power to a vehicle.

For example, electric power is supplied to a parked vehicle from an electric power supply apparatus.

The electric power supply apparatus is capable of supplying electric power to a vehicle in a wireless manner.

For example, such an idea is studied that a vehicle has a wireless type electric power supply secondary coil on a bottom part thereof, and an electric power supply primary coil is provided below the vehicle to supply electric power to the vehicle.

FIGS. 24A and 24B are conceptual diagrams of a wireless power transfer system.

The concept illustrated in FIGS. 24A and 24B has been disclosed in U.S. Pat. No. 8,035,255.

When the wireless type power transfer is employed, it is desired that electric power is supplied with a small energy loss from the electric power supply primary coil to the electric power supply secondary coil.

Furthermore, when the wireless type power transfer is employed to supply electric power from the electric power supply primary coil to the electric power supply secondary coil, it is desired that usage is easy.

In the wireless power transfer system, electric power is supplied in a wireless manner from the electric power supply primary coil to the electric power supply secondary coil via a magnetic field formed in a space between the electric power supply primary coil and the electric power supply secondary coil.

This feature imposes a reasonable restriction on a distance and a misalignment between the electric power supply primary coil and the electric power supply secondary coil. An attempt to supply electric power while exceeding the restriction of distance and misalignment leads to failure, that is, a large energy loss.

In a case where the electric power supply secondary coil is incorporated in a vehicle, a position of the electric power supply secondary coil is different depending on a vehicle type. In a case where wireless power transfer with a small energy loss is expected, positioning of the electric power supply secondary coil and the electric power supply primary coil is required.

CITATION LIST

Patent Literatures

Patent Literature 1: Japanese Unexamined Patent Publication No. 2011-60260
Patent Literature 2: Japanese Unexamined Patent Publication No. 2011-97814
Patent Literature 3: U.S. Pat. No. 8,035,255
Patent Literature 4: U.S. Pat. No. 8,106,539

SUMMARY OF DISCLOSURE

Technical Problem

The present disclosure describes a wireless power transfer system and a vehicle electric power supply device capable of performing easily available power supply with a small energy loss using a simple structure.

Solution to Problem

In order to achieve the above-mentioned purpose, an aspect of the present disclosure is a wireless power transfer system that supplies electric power to an object in which an electric power supply secondary coil capable of receiving wireless power transfer is incorporated, the wireless power transfer system including: an electric power supply apparatus having an electric power supply primary coil capable of supplying electric power to the electric power supply secondary coil in a wireless manner, and a drive circuit that drives the electric power supply primary coil; and a posture/position adjustment mechanism capable of adjusting a relative posture or position between the electric power supply primary coil and the electric power supply secondary coil, wherein the wireless power transfer system obtains, by means of data transfer, specific coil position information that is coil position information corresponding to information related to a position of the electric power supply secondary coil in a specific object that is an object that has made an electric power supply request, and electric power is supplied in a wireless manner from the electric power supply primary coil to the electric power supply secondary coil after the posture/position adjustment mechanism adjusts the relative posture or position between the electric power supply primary coil and the electric power supply secondary coil incorporated in the specific object based on the information related to the position of the electric power supply secondary coil in the specific object corresponding to the specific coil position information.

Owing to the above-mentioned configuration, the object has the electric power supply secondary coil capable of receiving wireless power transfer. The electric power supply apparatus has the electric power supply primary coil capable of supplying electric power to the electric power supply secondary coil in a wireless manner, and the drive circuit that drives the electric power supply primary coil. The posture/position adjustment mechanism is capable of adjusting the relative posture or position between the electric power supply primary coil and the electric power supply secondary coil. The specific coil position information that is the coil position information corresponding to the information related to the position of the electric power supply secondary coil in the specific object that is the object that has made the electric power supply request is obtained by means of data transfer. Electric power is supplied in a wireless manner from the electric power supply primary coil to the electric power supply secondary coil after the posture/position adjustment mechanism adjusts the relative posture or position between the electric power supply primary coil and the electric power supply secondary coil incorporated in the specific object based on the information related to the position of the electric power supply secondary coil in the specific object corresponding to the specific coil position information.

As a result, electric power can be efficiently supplied in a wireless manner from the electric power supply primary coil to the electric power supply secondary coil incorporated in the specific object.

In order to achieve the above-mentioned purpose, an aspect of the present disclosure is a wireless power transfer system that supplies electric power to an object in which an electric power supply secondary coil capable of receiving wireless power transfer is incorporated, the wireless power transfer system including: an electric power supply apparatus having an electric power supply primary coil capable of supplying electric power to the electric power supply secondary coil in a wireless manner, and a drive circuit that drives the electric power supply primary coil; and a posture/position adjustment mechanism capable of adjusting a relative posture or position between the electric power supply primary coil and the object, wherein the wireless power transfer system obtains, by means of data transfer, specific coil position information that is coil position information corresponding to information related to a position of the electric power supply secondary coil in a specific object that is an object that has made an electric power supply request, and electric power is supplied in a wireless manner from the electric power supply primary coil to the electric power supply secondary coil after the posture/position adjustment mechanism adjusts a relative posture or position between the electric power supply primary coil and the specific object based on the information related to the position of the electric power supply secondary coil in the specific object corresponding to the specific coil position information.

Owing to the above-mentioned configuration, the object has the electric power supply secondary coil capable of receiving wireless power transfer. The electric power supply apparatus has the electric power supply primary coil capable of supplying electric power to the electric power supply secondary coil in a wireless manner, and the drive circuit that drives the electric power supply primary coil. The posture/position adjustment mechanism is capable of adjusting the relative posture or position between the electric power supply primary coil and the object. The specific coil position information that is the coil position information corresponding to the information related to the position of the electric power supply secondary coil in the specific object that is the object that has made the electric power supply request is obtained by means of data transfer. Electric power is supplied in a wireless manner from the electric power supply primary coil to the electric power supply secondary coil after the posture/position adjustment mechanism adjusts the relative posture or position between the electric power supply primary coil and the specific object based on the information related to the position of the electric power supply secondary coil in the specific object corresponding to the specific coil position information.

As a result, electric power can be efficiently supplied in a wireless manner from the electric power supply primary coil to the electric power supply secondary coil incorporated in the specific object.

In order to achieve the above-mentioned purpose, an aspect of the present disclosure is a wireless power transfer system that supplies electric power to an object in which an electric power supply secondary coil capable of receiving wireless power transfer is incorporated, the wireless power transfer system including: an electric power supply apparatus having an electric power supply primary coil capable of supplying electric power to the electric power supply secondary coil in a wireless manner, and a drive circuit that drives the electric power supply primary coil; and a posture/position adjustment mechanism capable of adjusting a posture or position of the electric power supply primary coil, wherein the wireless power transfer system obtains, by means of data transfer, specific coil position information that is coil position information corresponding to information related to a position of the electric power supply secondary coil in a specific object that is an object that has made an electric power supply request, and electric power is supplied in a wireless manner from the electric power supply primary coil to the electric power supply secondary coil after the posture/position adjustment mechanism adjusts the posture or position of the electric power supply primary coil based on the information related to the position of the electric power supply secondary coil in the specific object corresponding to the specific coil position information.

Owing to the above-mentioned configuration, the object has the electric power supply secondary coil capable of receiving wireless power transfer. The electric power supply apparatus has the electric power supply primary coil capable of supplying electric power to the electric power supply secondary coil in a wireless manner, and the drive circuit that drives the electric power supply primary coil. The posture/position adjustment mechanism is capable of adjusting the posture or position of the electric power supply primary coil. The specific coil position information that is the coil position information corresponding to the information related to the position of the electric power supply secondary coil in the specific object that is the object that has made the electric power supply request is obtained by means of data transfer. Electric power is supplied in a wireless manner from the electric power supply primary coil to the electric power supply secondary coil after the posture/position adjustment mechanism adjusts the posture or position of the electric power supply primary coil based on the information related to the position of the electric power supply secondary coil in the specific object corresponding to the specific coil position information.

As a result, electric power can be efficiently supplied in a wireless manner from the electric power supply primary coil to the electric power supply secondary coil incorporated in the specific object.

In order to achieve the above-mentioned purpose, an aspect of the present disclosure is a wireless power transfer system that supplies electric power to an object in which an electric power supply secondary coil capable of receiving wireless power transfer is incorporated, the wireless power transfer system including: an electric power supply apparatus having an electric power supply primary coil capable of supplying electric power to the electric power supply secondary coil in a wireless manner, and a drive circuit that drives the electric power supply primary coil; and a posture/position adjustment mechanism capable of adjusting a posture or position of the object, wherein the wireless power transfer system obtains, by means of data transfer, specific coil position information that is coil position information corresponding to information related to a position of the electric power supply secondary coil in a specific object that is an object that has made an electric power supply request, and electric power is supplied in a wireless manner from the electric power supply primary coil to the electric power supply secondary coil after the posture/position adjustment mechanism adjusts a posture or position of the specific object based on the information related to the position of the electric power supply secondary coil in the specific object corresponding to the specific coil position information.

Owing to the above-mentioned configuration, the object has the electric power supply secondary coil capable of receiving wireless power transfer. The electric power supply apparatus has the electric power supply primary coil capable of supplying electric power to the electric power supply secondary coil in a wireless manner, and the drive circuit that drives the electric power supply primary coil. The posture/position adjustment mechanism is capable of adjusting the posture or position of the object. The specific coil position information that is the coil position information corresponding to the information related to the position of the electric power supply secondary coil in the specific object that is the object that has made the electric power supply request is obtained by means of data transfer. Electric power is supplied in a wireless manner from the electric power supply primary coil to the electric power supply secondary coil after the posture/position adjustment mechanism adjusts the posture or position of the specific object based on the information related to the position of the electric power supply secondary coil in the specific object corresponding to the specific coil position information.

As a result, electric power can be efficiently supplied in a wireless manner from the electric power supply primary coil to the electric power supply secondary coil incorporated in the specific object.

In order to achieve the above-mentioned purpose, an aspect of the present disclosure is a wireless power transfer system that supplies electric power to an object in which an electric power supply secondary coil capable of receiving wireless power transfer is incorporated, the wireless power transfer system including: an object support structure that is a structure capable of supporting the object; an electric power supply apparatus having an electric power supply primary coil capable of supplying electric power to the electric power supply secondary coil in a wireless manner, and a drive circuit that drives the electric power supply primary coil; and a posture/position adjustment mechanism capable of adjusting a posture or position of the object support structure, wherein the wireless power transfer system obtains, by means of data transfer, specific coil position information that is coil position information corresponding to information related to a position of the electric power supply secondary coil in a specific object that is an object that has made an electric power supply request, and electric power is supplied in a wireless manner from the electric power supply primary coil to the electric power supply secondary coil after the posture/position adjustment mechanism adjusts the posture or position of the object support structure that supports the specific object based on the information related to the position of the electric power supply secondary coil in the specific object corresponding to the specific coil position information.

Owing to the above-mentioned configuration, the object has the electric power supply secondary coil capable of receiving wireless power transfer. The object support structure is the structure capable of supporting the object. The electric power supply apparatus has the electric power supply primary coil capable of supplying electric power to the electric power supply secondary coil in a wireless manner, and the drive circuit that drives the electric power supply primary coil. The posture/position adjustment mechanism is capable of adjusting the posture or position of the object support structure. The specific coil position information that is the coil position information corresponding to the information related to the position of the electric power supply secondary coil in the specific object that is the object that has made the electric power supply request is obtained by means of data transfer. Electric power is supplied in a wireless manner from the electric power supply primary coil to the electric power supply secondary coil after the posture/position adjustment mechanism adjusts the posture or position of the object support structure that supports the specific object based on the information related to the position of the electric power supply secondary coil in the specific object corresponding to the specific coil position information.

As a result, electric power can be efficiently supplied in a wireless manner from the electric power supply primary coil to the electric power supply secondary coil incorporated in the specific object.

In order to achieve the above-mentioned purpose, an aspect of the present disclosure is a wireless power transfer system that supplies electric power to an object in which an electric power supply secondary coil capable of receiving wireless power transfer is incorporated, the wireless power transfer system including: an object support structure that is a structure capable of supporting the object; an electric power supply apparatus having an electric power supply primary coil capable of supplying electric power to the electric power supply secondary coil in a wireless manner, and a drive circuit that drives the electric power supply primary coil; a relay apparatus having a combination electromagnetic circuit holding a relay coil or a relay core capable of relaying wireless power transfer from the electric power supply primary coil to the electric power supply secondary coil; and a posture/position adjustment mechanism capable of adjusting a posture or position of the combination electromagnetic circuit, wherein the wireless power transfer system obtains, by means of data transfer, specific coil position information that is coil position information corresponding to information related to a position of the electric power supply secondary coil in a specific object that is an object that has made an electric power supply request, and electric power is supplied in a wireless manner from the electric power supply primary coil to the electric power supply secondary coil after the posture/position adjustment mechanism adjusts the posture or position of the combination electromagnetic circuit based on the information related to the position of the electric power supply secondary coil in the specific object corresponding to the specific coil position information.

Owing to the above-mentioned configuration, the object has the electric power supply secondary coil capable of receiving wireless power transfer. The object support structure is the structure capable of supporting the object. The electric power supply apparatus has the electric power supply primary coil capable of supplying electric power to the electric power supply secondary coil in a wireless manner, and the drive circuit that drives the electric power supply primary coil. The relay apparatus has the combination electromagnetic circuit holding the relay coil or the relay core capable of relaying wireless power transfer from the electric power supply primary coil to the electric power supply secondary coil. The posture/position adjustment mechanism is capable of adjusting the posture or position of the combination electromagnetic circuit. The specific coil position information that is the coil position information corresponding to the information related to the position of the electric power supply secondary coil in the specific object that is the object that has made the electric power supply request is obtained by means of data transfer. Electric power is supplied in a wireless manner from the electric power supply primary coil to the electric power supply secondary coil after the posture/position adjustment mechanism adjusts the posture or position of the combination electromagnetic circuit based on the information related to the position of the electric power supply secondary coil in the specific object corresponding to the specific coil position information.

As a result, electric power can be efficiently supplied in a wireless manner from the electric power supply primary coil to the electric power supply secondary coil incorporated in the specific object.

Hereinafter, a wireless power transfer system according to an embodiment of the present disclosure will be described. The present disclosure includes any of embodiments described below or an aspect that combines two or more of these embodiments.

The wireless power transfer system according to the embodiment of the present disclosure is configured such that the wireless power transfer system preliminarily correlates each of a plurality of items of identification information capable of identifying each of a plurality of objects with a corresponding one of a plurality of items of coil position information corresponding to information related to a position of the electric power supply secondary coil in the plurality of objects, and records, in a database, each of the plurality of items of identification information and each of the plurality of items of coil position information, the wireless power transfer system obtains specific identification information that is identification information of the specific object that is the object that has made the electric power supply request, and the wireless power transfer system obtains, as the specific coil position information and by means of data transfer, the coil position information related to the specific identification information extracted from the database.

The wireless power transfer system according to the embodiment of the present disclosure preliminarily correlates each of the plurality of items of identification information capable of identifying each of the plurality of objects with the corresponding one of the plurality of items of coil position information corresponding to the information related to the position of the electric power supply secondary coil in the plurality of objects, and records, in the database, each of the plurality of items of identification information and each of the plurality of items of coil position information. The specific identification information that is the identification information of the specific object that is the object that has made the electric power supply request is obtained. The coil position information related to the specific identification information extracted from the database is obtained as the specific coil position information by means of data transfer.

As a result, the specific coil position information can be easily obtained in accordance with a lot of objects, and electric power can be efficiently supplied in a wireless manner from the electric power supply primary coil to the electric power supply secondary coil incorporated in the specific object.

The wireless power transfer system according to the embodiment of the present disclosure is configured such that the wireless power transfer system preliminarily correlates each of a plurality of items of identification information capable of identifying a kind of each of a plurality of objects with a corresponding one of a plurality of items of coil position information corresponding to information related to a position of the electric power supply secondary coil in the plurality of objects, and records, in a database, each of the plurality of items of identification information and each of the plurality of items of coil position information, the wireless power transfer system obtains specific identification information that is identification information of the specific object that is the object that has made the electric power supply request, and the wireless power transfer system obtains, as the specific coil position information and by means of data transfer, the coil position information related to the specific identification information extracted from the database.

Owing to the configuration of the embodiment of the present disclosure, each of the plurality of items of identification information capable of identifying the kind of each of the plurality of objects is preliminarily correlated with the corresponding one of the plurality of items of coil position information corresponding to the information related to the position of the electric power supply secondary coil in the plurality of objects, and each of the plurality of items of identification information and each of the plurality of items of coil position information are recorded in the database. The specific identification information that is the identification information of the specific object that is the object that has made the electric power supply request is obtained.

As a result, the specific coil position information can be easily obtained in accordance with a lot of kinds of the objects, and electric power can be efficiently supplied in a wireless manner from the electric power supply primary coil to the electric power supply secondary coil incorporated in the specific object.

The wireless power transfer system according to the embodiment of the present disclosure is configured such that when the coil position information related to the specific identification information is recorded in the database, the wireless power transfer system obtains, as the specific coil position information, the coil position information related to the specific identification information from the database, and when the coil position information related to the specific identification information is not recorded in the database, the wireless power transfer system obtains the coil position information from the object, correlates the specific identification information with the obtained coil position information, and records, in the database, the specific identification information and the obtained coil position information.

Owing to the form of the embodiment of the disclosure, when the coil position information related to the specific identification information is recorded in the database, the coil position information related to the specific identification information is obtained as the specific coil position information from the database. When the coil position information related to the specific identification information is not recorded in the database, the coil position information is obtained from the object, the specific identification information is correlated with the obtained coil position information, and the specific identification information and the obtained coil position information are recorded in the database.

As a result, owing to such a configuration that when the coil position information related to the specific identification information is not recorded in the database, the coil position information is obtained from the object, the specific identification information is correlated with the obtained coil position information, and the specific identification information and the obtained coil position information are recorded in the database, the specific coil position information can be easily obtained in accordance with a lot of kinds of the objects, and electric power can be efficiently supplied in a wireless manner from the electric power supply primary coil to the electric power supply secondary coil incorporated in the specific object.

The wireless power transfer system according to the embodiment of the present disclosure is provided in a parking device, and the wireless power transfer system obtains the specific identification information when waiting for an entry into the parking device.

Owing to the configuration of the embodiment of the present disclosure, the wireless power transfer system is provided in the parking device, and obtains the specific identification information when waiting for the entry into the parking device.

As a result, the relative posture or position between the electric power supply primary coil and the electric power supply secondary coil is adjusted in accordance with the kind of the specific object, and electric power can be efficiently supplied from the electric power supply primary coil to the electric power supply secondary coil incorporated in the specific object.

The wireless power transfer system according to the embodiment of the present disclosure obtains the specific identification information when receiving the electric power supply request.

Owing to the configuration of the present disclosure, the specific identification information is obtained when the electric power supply request is received.

As a result, the relative posture or position between the electric power supply primary coil and the electric power supply secondary coil is adjusted in accordance with the kind of the specific object, and electric power can be efficiently supplied from the electric power supply primary coil to the electric power supply secondary coil incorporated in the specific object.

In order to achieve the above-mentioned purpose, an aspect of the present disclosure is a wireless power transfer system that supplies electric power to an object in which an electric power supply secondary coil capable of receiving wireless power transfer is incorporated, the wireless power transfer system including: an electric power supply apparatus having an electric power supply primary coil capable of supplying electric power to the electric power supply secondary coil in a wireless manner, and a drive circuit that drives the electric power supply primary coil; a posture/position adjustment mechanism that is a mechanism capable of expanding and contracting a six-axis linear motion actuator to set a spatial six-degree-of-freedom of the electric power supply primary coil to a predetermined spatial six-degree-of-freedom; and a position change mechanism provided at a specific position to support the posture/position adjustment mechanism, the position change mechanism being capable of changing a position of the posture/position adjustment mechanism between an approach position that is a position to approach the object and a separate position that is a position to be separated from the object, wherein when a specific object that is an object that has made an electric power supply request is located at the specific position, electric power is supplied in a wireless manner from the electric power supply primary coil to the electric power supply secondary coil after specific coil position information corresponding to information related to a position of the electric power supply secondary coil incorporated in the specific object is obtained, the position change mechanism changes the position of the posture/position adjustment mechanism from the separate position to the approach position, and the posture/position adjustment mechanism expands and contracts the six-axis linear motion actuator based on the specific coil position information to set the spatial six-degree-of-freedom of the electric power supply primary coil to the predetermined spatial six-degree-of-freedom and adjust a relative posture or position between the electric power supply primary coil and the electric power supply secondary coil incorporated in the specific object.

Owing to the above-mentioned configuration of the present disclosure, the electric power supply apparatus has the electric power supply primary coil capable of supplying electric power to the electric power supply secondary coil in a wireless manner, and the drive circuit that drives the electric power supply primary coil. The posture/position adjustment mechanism is the mechanism capable of expanding and contracting the six-axis linear motion actuator to set the spatial six-degree-of-freedom of the electric power supply primary coil to the predetermined spatial six-degree-of-freedom. The position change mechanism is provided at the specific position to support the posture/position adjustment mechanism, and capable of changing the position of the posture/position adjustment mechanism between the approach position that is the position to approach the object and the separate position that is the position to be separated from the object. When the specific object that is the object that has made the electric power supply request is located at the specific position, electric power is supplied in a wireless manner from the electric power supply primary coil to the electric power supply secondary coil after the specific coil position information corresponding to the information related to the position of the electric power supply secondary coil incorporated in the specific object is obtained, the position change mechanism changes the position of the posture/position adjustment mechanism from the separate position to the approach position, and the posture/position adjustment mechanism expands and contracts the six-axis linear motion actuator based on the specific coil position information to set the spatial six-degree-of-freedom of the electric power supply primary coil to the predetermined spatial six-degree-of-freedom and adjust the relative posture or position between the electric power supply primary coil and the electric power supply secondary coil incorporated in the specific object.

As a result, electric power can be efficiently supplied in a wireless manner from the electric power supply primary coil to the electric power supply secondary coil incorporated in the specific object.

In order to achieve the above-mentioned purpose, an aspect of the present disclosure is a wireless power transfer system that supplies electric power to an object in which an electric power supply secondary coil capable of receiving wireless power transfer is incorporated, the wireless power transfer system including: an electric power supply apparatus having an electric power supply primary coil that is provided at a specific position and capable of supplying electric power to the electric power supply secondary coil in a wireless manner, and a drive circuit that drives the electric power supply primary coil; and a posture/position adjustment mechanism that is a mechanism that is provided at the specific position and capable of expanding and contracting a six-axis linear motion actuator to set a spatial six-degreeof-freedom of the object to a predetermined spatial six-degree-of-freedom, wherein when a specific object that is an object that has made an electric power supply request is located at the specific position, electric power is supplied in a wireless manner from the electric power supply primary coil to the electric power supply secondary coil after specific coil position information corresponding to information related to a position of the electric power supply secondary coil incorporated in the specific object is obtained, and the posture/position adjustment mechanism expands and contracts the six-axis linear motion actuator based on the specific coil position information to set a spatial six-degree-of-freedom of the specific object to a predetermined spatial six-degree-of-freedom and adjust a relative posture or position between the electric power supply primary coil and the electric power supply secondary coil incorporated in the specific object.

Owing to the above-mentioned configuration of the present disclosure, the electric power supply apparatus has the electric power supply primary coil that is provided at the specific position and capable of supplying electric power to the electric power supply secondary coil in a wireless manner, and the drive circuit that drives the electric power supply primary coil.

The posture/position adjustment mechanism is the mechanism that is provided at the specific position and capable of expanding and contracting the six-axis linear motion actuator to set the spatial six-degree-of-freedom of the object to the predetermined spatial six-degree-of-freedom. When the specific object that is the object that has made the electric power supply request is located at the specific position, electric power is supplied in a wireless manner from the electric power supply primary coil to the electric power supply secondary coil after the specific coil position information corresponding to the information related to the position of the electric power supply secondary coil incorporated in the specific object is obtained, and the posture/position adjustment mechanism expands and contracts the six-axis linear motion actuator based on the specific coil position information to set the spatial six-degree-of-freedom of the specific object to the predetermined spatial six-degree-of-freedom and adjust the relative posture or position between the electric power supply primary coil and the electric power supply secondary coil incorporated in the specific object.

As a result, electric power can be efficiently supplied in a wireless manner from the electric power supply primary coil to the electric power supply secondary coil incorporated in the specific object.

In order to achieve the above-mentioned purpose, an aspect of the present disclosure is a wireless power transfer system that supplies electric power to an object in which an electric power supply secondary coil capable of receiving wireless power transfer is incorporated, the wireless power transfer system including: an object support structure that is a structure capable of supporting the object; an electric power supply apparatus having an electric power supply primary coil that is provided at a specific position and capable of supplying electric power to the electric power supply secondary coil in a wireless manner, and a drive circuit that drives the electric power supply primary coil; and a posture/position adjustment mechanism that is a mechanism that is provided at the specific position and capable of expanding and contracting a six-axis linear motion actuator to set a spatial six-degree-of-freedom of the object support structure to a predetermined spatial six-degree-of-freedom, wherein when the object support structure that supports a specific object that is an object that has made an electric power supply request is located at the specific position, electric power is supplied in a wireless manner from the electric power supply primary coil to the electric power supply secondary coil after specific coil position information corresponding to information related to a position of the electric power supply secondary coil incorporated in the specific object is obtained, and the posture/position adjustment mechanism expands and contracts the six-axis linear motion actuator based on the specific coil position information to set the spatial six-degree-of-freedom of the object support structure that supports the specific object to the predetermined spatial six-degree-of-freedom and adjust a relative posture or position between the electric power supply primary coil and the electric power supply secondary coil incorporated in the specific object.

Owing to the above-mentioned configuration of the present disclosure, the object support structure is the structure capable of supporting the object. The electric power supply apparatus has the electric power supply primary coil that is provided at the specific position and capable of supplying electric power to the electric power supply secondary coil in a wireless manner, and the drive circuit that drives the electric power supply primary coil. The posture/position adjustment mechanism is the mechanism that is provided at the specific position and capable of expanding and contracting the six-axis linear motion actuator to set the spatial six-degree-of-freedom of the object support structure to the predetermined spatial six-degree-of-freedom. When the specific object that is the object that has made the electric power supply request is located at the specific position, electric power is supplied in a wireless manner from the electric power supply primary coil to the electric power supply secondary coil after the specific coil position information corresponding to the information related to the position of the electric power supply secondary coil incorporated in the specific object is obtained, and the posture/position adjustment mechanism expands and contracts the six-axis linear motion actuator based on the specific coil position information to set the spatial six-degree-of-freedom of the object support structure that supports the specific object to the predetermined spatial six-degree-of-freedom and adjust the relative posture or position between the electric power supply primary coil and the electric power supply secondary coil incorporated in the specific object.

As a result, electric power can be efficiently supplied in a wireless manner from the electric power supply primary coil to the electric power supply secondary coil incorporated in the specific object.

In order to achieve the above-mentioned purpose, an aspect of the present disclosure is a wireless power transfer system that supplies electric power to an object in which an electric power supply secondary coil capable of receiving wireless power transfer is incorporated, the wireless power transfer system including: an electric power supply apparatus having an electric power supply primary coil that is provided at a specific position and capable of supplying electric power to the electric power supply secondary coil in a wireless manner, and a drive circuit that drives the electric power supply primary coil; a relay apparatus having a combination electromagnetic circuit holding a relay coil or a relay core capable of relaying wireless power transfer from the electric power supply primary coil to the electric power supply secondary coil; and a posture/position adjustment mechanism that is a mechanism that is provided at the specific position and capable of expanding and contracting a six-axis linear motion actuator to set a spatial six-degree-of-freedom of the combination electromagnetic circuit to a predetermined spatial six-degree-of-freedom, wherein when a specific object that is an object that has made an electric power supply request is located at the specific position, electric power is supplied in a wireless manner from the electric power supply primary coil to the electric power supply secondary coil after specific coil position information corresponding to information related to a position of the electric power supply secondary coil incorporated in the specific object is obtained, and the posture/position adjustment mechanism expands and contracts the six-axis linear motion actuator based on the specific coil position information to set the spatial six-degree-of-freedom of the combination electromagnetic circuit to the predetermined spatial six-degree-of-freedom and cause the combination electromagnetic circuit to be located between the electric power supply primary coil and the electric power supply secondary coil.

Owing to the above-mentioned configuration of the present disclosure, the electric power supply apparatus has the electric power supply primary coil that is provided at the specific position and capable of supplying electric power to the electric power supply secondary coil in a wireless manner, and the drive circuit that drives the electric power supply primary coil. The relay apparatus has the combination electromagnetic circuit holding the relay coil or the relay core capable of relaying wireless power transfer from the electric power supply primary coil to the electric power supply secondary coil. The posture/position adjustment mechanism is the mechanism that is provided at the specific position and capable of expanding and contracting the six-axis linear motion actuator to set the spatial six-degree-of-freedom of the combination electromagnetic circuit to the predetermined spatial six-degree-of-freedom. When the specific object that is the object that has made the electric power supply request is located at the specific position, electric power is supplied in a wireless manner from the electric power supply primary coil to the electric power supply secondary coil after the specific coil position information corresponding to the information related to the position of the electric power supply secondary coil incorporated in the specific object is obtained, and the posture/position adjustment mechanism expands and contracts the six-axis linear motion actuator based on the specific coil position information to set the spatial six-degree-of-freedom of the combination electromagnetic circuit to the predetermined spatial six-degree-of-freedom and cause the combination electromagnetic circuit to be located between the electric power supply primary coil and the electric power supply secondary coil.

As a result, electric power can be efficiently supplied in a wireless manner from the electric power supply primary coil to the electric power supply secondary coil incorporated in the specific object.

In order to achieve the above-mentioned purpose, an aspect of the present disclosure is a wireless power transfer system that supplies electric power to an object in which an electric power supply secondary coil capable of receiving wireless power transfer is incorporated, the wireless power transfer system including: movable body capable of supporting the object; an electric power supply apparatus having an electric power supply primary coil that is provided at a specific position and capable of supplying electric power to the electric power supply secondary coil in a wireless manner, and a drive circuit that drives the electric power supply primary coil; and a posture/position adjustment mechanism that is a mechanism that is provided at the movable body and capable of expanding and contracting a six-axis linear motion actuator to set a spatial six-degree-of-freedom of the object to a predetermined spatial six-degree-of-freedom, wherein when the movable body that supports a specific object that is an object that has made an electric power supply request is located at the specific position, electric power is supplied in a wireless manner from the electric power supply primary coil to the electric power supply secondary coil after specific coil position information corresponding to information related to a position of the electric power supply secondary coil incorporated in the specific object is obtained, and the posture/position adjustment mechanism expands and contracts the six-axis linear motion actuator based on the specific coil position information to set a spatial six-degree-of-freedom of the specific object to a predetermined spatial six-degree-of-freedom and adjust a relative posture or position between the electric power supply primary coil and the electric power supply secondary coil incorporated in the specific object.

Owing to the above-mentioned configuration of the present disclosure, the movable body is capable of supporting the object. The electric power supply apparatus has the electric power supply primary coil that is provided at the specific position and capable of supplying electric power to the electric power supply secondary coil in a wireless manner, and the drive circuit that drives the electric power supply primary coil. The posture/position adjustment mechanism is the mechanism that is provided at the movable body and capable of expanding and contracting the six-axis linear motion actuator to set the spatial six-degree-of-freedom of the object to the predetermined spatial six-degree-of-freedom. When the movable body that supports the specific object that is the object that has made the electric power supply request is located at the specific position, electric power is supplied in a wireless manner from the electric power supply primary coil to the electric power supply secondary coil after the specific coil position information corresponding to the information related to the position of the electric power supply secondary coil incorporated in the specific object is obtained, and the posture/position adjustment mechanism expands and contracts the six-axis linear motion actuator based on the specific coil position information to set the spatial six-degree-of-freedom of the specific object to the predetermined spatial six-degree-of-freedom and adjust the relative posture or position between the electric power supply primary coil and the electric power supply secondary coil incorporated in the specific object.

As a result, electric power can be efficiently supplied in a wireless manner from the electric power supply primary coil to the electric power supply secondary coil incorporated in the specific object.

In order to achieve the above-mentioned purpose, an aspect of the present disclosure is a wireless power transfer system that supplies electric power to an object in which an electric power supply secondary coil capable of receiving wireless power transfer is incorporated, the wireless power transfer system including: an object support structure that is a structure capable of supporting the object; a movable body that is equipped with the object support structure that supports the object and capable of moving; an electric power supply apparatus having an electric power supply primary coil that is provided at a specific position and capable of supplying electric power to the electric power supply secondary coil in a wireless manner, and a drive circuit that drives the electric power supply primary coil; and a posture/ position adjustment mechanism that is a mechanism that is provided at the movable body and capable of expanding and contracting a six-axis linear motion actuator to set a spatial six-degree-of-freedom of the object support structure to a predetermined spatial six-degree-of-freedom, wherein when the movable body equipped with the object support structure that supports a specific object that is an object that has made an electric power supply request is located at the specific position, electric power is supplied in a wireless manner from the electric power supply primary coil to the electric power supply secondary coil after specific coil position information corresponding to information related to a position of the electric power supply secondary coil incorporated in the specific object is obtained, and the posture/position adjustment mechanism expands and contracts the six-axis linear motion actuator based on the specific coil position information to set the spatial six-degree-of-freedom of the object support structure that supports the specific object to the predetermined spatial six-degree-of-freedom and adjust a relative posture or position between the electric power supply primary coil and the electric power supply secondary coil incorporated in the specific object.

Owing to the above-mentioned configuration of the present disclosure, the object support structure is the structure capable of supporting the object. The movable body is equipped with the object support structure that supports the object and capable of moving. The electric power supply apparatus has the electric power supply primary coil that is provided at the specific position and capable of supplying electric power to the electric power supply secondary coil in a wireless manner, and the drive circuit that drives the electric power supply primary coil. The posture/position adjustment mechanism is the mechanism that is provided at the movable body and capable of expanding and contracting the six-axis linear motion actuator to set the spatial six-degree-of-freedom of the object support structure to the predetermined spatial six-degree-of-freedom. When the movable body equipped with the object support structure that supports the specific object that is the object that has made the electric power supply request is located at the specific position, electric power is supplied in a wireless manner from the electric power supply primary coil to the electric power supply secondary coil after the specific coil position information corresponding to the information related to the position of the electric power supply secondary coil incorporated in the specific object is obtained, and the posture/position adjustment mechanism expands and contracts the six-axis linear motion actuator based on the specific coil position information to set the spatial six-degree-of-freedom of the object support structure that supports the specific object to the predetermined spatial six-degree-of-freedom and adjust the relative posture or position between the electric power supply primary coil and the electric power supply secondary coil incorporated in the specific object.

As a result, electric power can be efficiently supplied in a wireless manner from the electric power supply primary coil to the electric power supply secondary coil incorporated in the specific object.

In order to achieve the above-mentioned purpose, an aspect of the present disclosure is a wireless power transfer system that supplies electric power to an object in which an electric power supply secondary coil capable of receiving wireless power transfer is incorporated, the wireless power transfer system including: a movable body that supports the object and is capable of moving; an electric power supply apparatus having an electric power supply primary coil that is provided at a specific position and capable of supplying electric power to the electric power supply secondary coil in a wireless manner, and a drive circuit that drives the electric power supply primary coil; a relay apparatus having a combination electromagnetic circuit holding a relay coil or a relay core capable of relaying wireless power transfer from the electric power supply primary coil to the electric power supply secondary coil; and a posture/position adjustment mechanism that is a mechanism that is provided at the movable body and capable of expanding and contracting a six-axis linear motion actuator to set a spatial six-degree-of-freedom of the combination electromagnetic circuit to a predetermined spatial six-degree-of-freedom, wherein when the movable body that supports a specific object that is an object that has made an electric power supply request is located at the specific position, electric power is supplied in a wireless manner from the electric power supply primary coil to the electric power supply secondary coil after specific coil position information corresponding to information related to a position of the electric power supply secondary coil incorporated in the specific object is obtained, and the posture/position adjustment mechanism expands and contracts the six-axis linear motion actuator based on the specific coil position information to set the spatial six-degree-of-freedom of the combination electromagnetic circuit to the predetermined spatial six-degree-of-freedom and cause the combination electromagnetic circuit to be located between the electric power supply primary coil and the electric power supply secondary coil.

Owing to the above-mentioned configuration of the present disclosure, the movable body supports the object and is capable of moving. The electric power supply apparatus has the electric power supply primary coil that is provided at the specific position and capable of supplying electric power to the electric power supply secondary coil in a wireless manner, and the drive circuit that drives the electric power supply primary coil. The relay apparatus has the combination electromagnetic circuit holding the relay coil or the relay core capable of relaying wireless power transfer from the electric power supply primary coil to the electric power supply secondary coil. The posture/position adjustment mechanism is the mechanism that is provided at the movable body and capable of expanding and contracting the six-axis linear motion actuator to set the spatial six-degree-of-freedom of the combination electromagnetic circuit to the predetermined spatial six-degree-of-freedom. When the movable body that supports the specific object that is the object that has made the electric power supply request is located at the specific position, electric power is supplied in a wireless manner from the electric power supply primary coil to the electric power supply secondary coil after the specific coil position information corresponding to the information related to the position of the electric power supply secondary coil incorporated in the specific object is obtained, and the posture/position adjustment mechanism expands and contracts the six-axis linear motion actuator based on the specific coil position information to set the spatial six-degree-of-freedom of the combination electromagnetic circuit to the predetermined spatial six-degree-of-freedom and cause the combination electromagnetic circuit to be located between the electric power supply primary coil and the electric power supply secondary coil.

As a result, electric power can be efficiently supplied in a wireless manner from the electric power supply primary coil to the electric power supply secondary coil incorporated in the specific object.

The wireless power transfer system according to the embodiment of the present disclosure preliminarily correlates each of a plurality of items of kind information corresponding to a kind of a plurality of objects with a corresponding one of a plurality of items of coil position information corresponding to information related to a position of the electric power supply secondary coil in the plurality of objects, and records, in a database, each of the plurality of items of kind information and each of the plurality of items of coil position information, the wireless power transfer system obtains specific kind information that is kind information of the specific object that is the object that has made the electric power supply request, and the wireless power transfer system obtains, as the specific coil position information, the coil position information related to the specific kind information extracted from the database.

Owing to the configuration of the embodiment of the present disclosure, each of the plurality of items of kind information corresponding to the kind of the plurality of objects is preliminarily correlated with the corresponding one of the plurality of items of coil position information corresponding to the information related to the position of the electric power supply secondary coil in the plurality of objects, and each of the plurality of items of kind information and each of the plurality of items of coil position information are recorded in the database. The specific kind information that is the kind information of the specific object that is the object that has made the electric power supply request is obtained, and the coil position information related to the specific kind information extracted from the database is obtained as the specific coil position information.

As a result, the specific coil position information can be easily obtained in accordance with a lot of kinds of the objects, and electric power can be efficiently supplied in a wireless manner from the electric power supply primary coil to the electric power supply secondary coil incorporated in the specific object.

In order to achieve the above-mentioned purpose, a parking device according to the present disclosure capable of causing a vehicle that is an object to be parked includes a main structure forming a parking space in which the vehicle is parked and the above-mentioned wireless power transfer system.

Owing to the above-mentioned configuration of the present disclosure, the main structure forms the parking space in which the vehicle is parked. The wireless power transfer system is configured as mentioned above.

As a result, it is possible to realize the parking device that provides the above-mentioned effects when electric power is supplied in a wireless manner to the electric power supply secondary coil incorporated in the vehicle in the parking device.

Advantageous Effects of Disclosure

As described above, the wireless power transfer system according to an aspect of the present disclosure has the following effects owing to its configuration.

Electric power is supplied in a wireless manner after the specific coil position information is obtained and the relative posture or position between the electric power supply primary coil and the electric power supply secondary coil is adjusted based on the specific coil position information. Therefore, electric power can be efficiently supplied in a wireless manner from the electric power supply primary coil to the electric power supply secondary coil.

Electric power is supplied in a wireless manner after the specific coil position information is obtained and the relative posture or position between the electric power supply primary coil and the object is adjusted based on the specific coil position information. Therefore, electric power can be efficiently supplied in a wireless manner from the electric power supply primary coil to the electric power supply secondary coil incorporated in the specific object.

Electric power is supplied in a wireless manner after the specific coil position information is obtained and the posture or position of the electric power supply primary coil is adjusted based on the specific coil position information. Therefore, electric power can be efficiently supplied in a wireless manner from the electric power supply primary coil to the electric power supply secondary coil incorporated in the specific object.

Electric power is supplied in a wireless manner after the specific coil position information is obtained and the posture or position of the specific object is adjusted based on the specific coil position information. Therefore, electric power can be efficiently supplied in a wireless manner from the electric power supply primary coil to the electric power supply secondary coil incorporated in the specific object.

Electric power is supplied in a wireless manner after the specific coil position information is obtained and the posture or position of the object support structure that supports the specific object is adjusted based on the specific coil position information. Therefore, electric power can be efficiently supplied in a wireless manner from the electric power supply primary coil to the electric power supply secondary coil incorporated in the specific object.

Electric power is supplied in a wireless manner after the specific coil position information is obtained and the posture or position of the combination electromagnetic circuit is adjusted based on the specific coil position information. Therefore, electric power can be efficiently supplied in a wireless manner from the electric power supply primary coil to the electric power supply secondary coil incorporated in the specific object.

Each of the plurality of items of identification information is preliminarily correlated with the corresponding one of the plurality of items of coil position information, each of the plurality of items of identification information and each of the plurality of items of coil position information are recorded, the specific identification information of the specific object that has made the electric power supply request is obtained, and the specific coil position information related to the specific identification information is obtained. Therefore, the specific coil position information can be easily obtained in accordance with a lot of objects, and electric power can be efficiently supplied in a wireless manner from the electric power supply primary coil to the electric power supply secondary coil incorporated in the specific object.

Each of the plurality of items of identification information is preliminarily correlated with the corresponding one of the plurality of items of coil position information, each of the plurality of items of identification information and each of the plurality of items of coil position information are recorded, the specific identification information of the specific object that has made the electric power supply request is obtained, and the specific coil position information related to the specific identification information is obtained. Therefore, the specific coil position information can be easily obtained in accordance with a lot of kinds of the objects, and electric power can be efficiently supplied in a wireless manner from the electric power supply primary coil to the electric power supply secondary coil incorporated in the specific object.

The specific identification information is obtained when the entry into the parking device is waited for. Therefore, the relative posture or position between the electric power supply primary coil and the electric power supply secondary coil is adjusted in accordance with the kind of the specific object, and electric power can be efficiently supplied in a wireless manner from the electric power supply primary coil to the electric power supply secondary coil incorporated in the specific object.

When the coil position information related to the specific identification information is not recorded in the database, the identification information and the coil position information are obtained from the object, the obtained identification information is correlated with the obtained coil position information, and the obtained identification information and the obtained coil position information are recorded in the database. Therefore, the specific coil position information can be easily obtained in accordance with a lot of kinds of the objects, and electric power can be efficiently supplied in a wireless manner from the electric power supply primary coil to the electric power supply secondary coil incorporated in the specific object.

The specific identification information is obtained when the electric power supply request is received. Therefore, the relative posture or position between the electric power supply primary coil and the electric power supply secondary coil is adjusted in accordance with the kind of the specific object, and electric power can be efficiently supplied in a wireless manner from the electric power supply primary coil to the electric power supply secondary coil incorporated in the specific object.

Thus, it is possible to provide the wireless power transfer system that is easily available with a small energy loss using a simple structure, and the parking device to which the same is applied.

As described above, the wireless power transfer system according to an aspect of the present disclosure has the following effects owing to its configuration.

When the object having the electric power supply request is located at the specific position, electric power is supplied in a wireless manner from the electric power supply primary coil to the electric power supply secondary coil after the position change mechanism provided at the specific position changes the position of the posture/position adjustment mechanism to the approach position to approach the object, the posture/position adjustment mechanism expands and contracts the six-axis linear motion actuator based on the information related to the position of the electric power supply secondary coil incorporated in the object to change the spatial six-degree-of-freedom of the electric power supply primary coil and adjust the relative spatial relation between the electric power supply primary coil and the electric power supply secondary coil. Therefore, electric power can be efficiently supplied in a wireless manner from the electric power supply primary coil to the electric power supply secondary coil incorporated in the specific object.

When the object having the electric power supply request is located at the specific position, electric power is supplied in a wireless manner from the electric power supply primary coil to the electric power supply secondary coil after the posture/position adjustment mechanism provided at the specific position expands and contracts the six-axis linear motion actuator based on the information related to the position of the electric power supply secondary coil incorporated in the object to change the spatial six-degree-of-freedom of the object and adjust the relative spatial relation between the electric power supply primary coil and the electric power supply secondary coil. Therefore, electric power can be efficiently supplied in a wireless manner from the electric power supply primary coil to the electric power supply secondary coil incorporated in the specific object.

When the object support structure that supports the object having the electric power supply request is located at the specific position, electric power is supplied in a wireless manner from the electric power supply primary coil to the electric power supply secondary coil after the posture/position adjustment mechanism provided at the specific position expands and contracts the six-axis linear motion actuator based on the information related to the position of the electric power supply secondary coil incorporated in the object to change the spatial six-degree-of-freedom of the object support structure that supports the object and adjust the relative spatial relation between the electric power supply primary coil and the electric power supply secondary coil. Therefore, electric power can be efficiently supplied in a wireless manner from the electric power supply primary coil to the electric power supply secondary coil incorporated in the specific object.

When the object having the electric power supply request is located at the specific position, electric power is supplied in a wireless manner from the electric power supply primary coil to the electric power supply secondary coil after the posture/position adjustment mechanism provided at the specific position expands and contracts the six-axis linear motion actuator based on the information related to the position of the electric power supply secondary coil incorporated in the object to change the spatial six-degree-of-freedom of the combination electromagnetic circuit and cause the combination electromagnetic circuit to be located between the electric power supply primary coil and the electric power supply secondary coil. Therefore, electric power can be efficiently supplied in a wireless manner from the electric power supply primary coil to the electric power supply secondary coil incorporated in the specific object.

When the movable body that supports the object having the electric power supply request is located at the specific position, electric power is supplied in a wireless manner from the electric power supply primary coil to the electric power supply secondary coil after the posture/position adjustment mechanism provided at the movable body expands and contracts the six-axis linear motion actuator based on the information related to the position of the electric power supply secondary coil incorporated in the object to change the spatial six-degree-of-freedom of the object and adjust the relative spatial relation between the electric power supply primary coil and the electric power supply secondary coil. Therefore, electric power can be efficiently supplied in a wireless manner from the electric power supply primary coil to the electric power supply secondary coil incorporated in the specific object.

When the movable body equipped with the object support structure that supports the object having the electric power supply request is located at the specific position, electric power is supplied in a wireless manner from the electric power supply primary coil to the electric power supply secondary coil after the posture/position adjustment mechanism provided at the movable body expands and contracts the six-axis linear motion actuator based on the information related to the position of the electric power supply secondary coil incorporated in the object to change the spatial six-degree-of-freedom of the object support structure and adjust the relative spatial relation between the electric power supply primary coil and the electric power supply secondary coil. Therefore, electric power can be efficiently supplied in a wireless manner from the electric power supply primary coil to the electric power supply secondary coil incorporated in the specific object.

When the movable body that supports the object having the electric power supply request and is capable of moving is located at the specific position, electric power is supplied in a wireless manner from the electric power supply primary coil to the electric power supply secondary coil after the posture/position adjustment mechanism provided at the movable body expands and contracts the six-axis linear motion actuator based on the information related to the position of the electric power supply secondary coil incorporated in the object to change the spatial six-degree-of-freedom of the combination electromagnetic circuit and cause the combination electromagnetic circuit to be located between the electric power supply primary coil and the electric power supply secondary coil. Therefore, electric power can be efficiently supplied in a wireless manner from the electric power supply primary coil to the electric power supply secondary coil incorporated in the specific object.

Each of the plurality of items of kind information is preliminarily correlated with the corresponding one of the plurality of items of coil position information, each of the plurality of items of kind information and each of the plurality of items of coil position information are recorded, the specific kind information of the specific object that has made the electric power supply request is obtained, and the specific coil position information related to the specific kind information is obtained. Therefore, the specific coil position information can be easily obtained in accordance with a lot of kinds of the objects, and electric power can be efficiently supplied in a wireless manner from the electric power supply primary coil to the electric power supply secondary coil incorporated in the specific object.

The above-mentioned wireless power transfer system is applied to the parking device that supplies electric power to the parked vehicle in a wireless manner. Therefore, it is possible to realize the parking device that provides the above-mentioned effects when electric power is supplied in a wireless manner to the electric power supply secondary coil incorporated in the vehicle in the parking device.

Thus, it is possible to provide the wireless power transfer system capable performing easily available power supply with a small energy loss using a simple structure, and the parking device to which the same is applied.

BRIEF DESCRIPTION OF DRAWINGS

FIGS. 11A and 11B are partial cross-sectional views of the vehicle electric power supply device according to the first and the seventh embodiments of the present disclosure.

DESCRIPTION OF EMBODIMENTS

Figure 1:
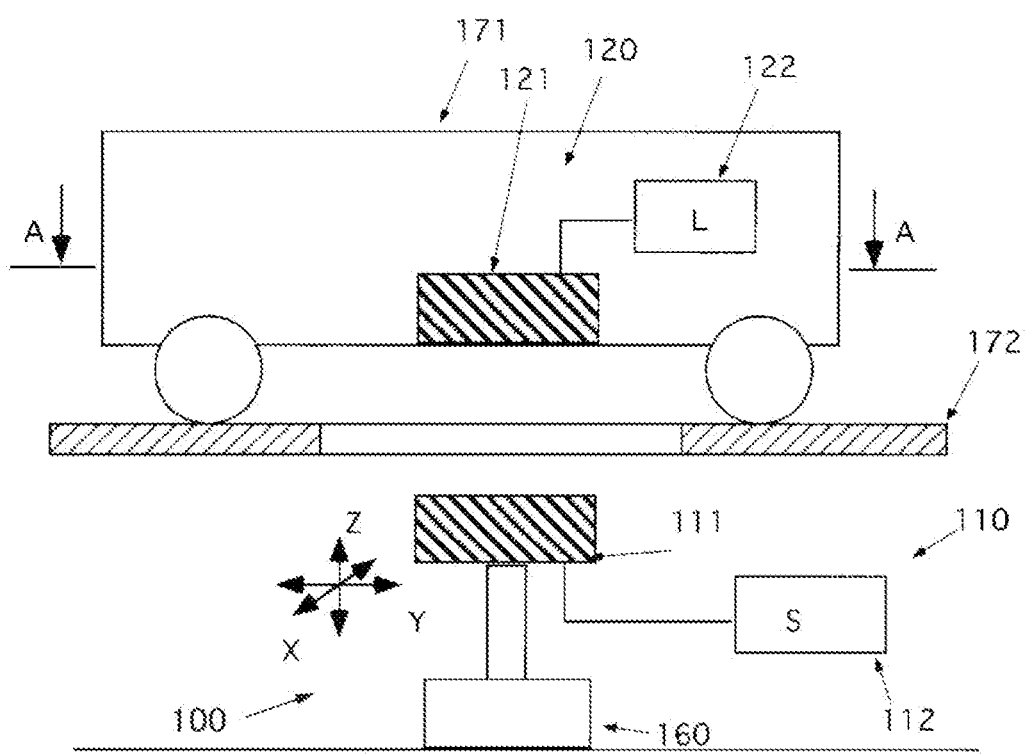
FIG. 1 is a conceptual diagram of a wireless power transfer system according to a third embodiment of the present disclosure.

Hereinafter, embodiments for practicing the present disclosure will be described with reference to the drawings.

To begin with, a wireless power transfer system according to an embodiment of the present disclosure will be described based on the drawings.

First, a wireless power transfer system 100 according to a first embodiment of the present disclosure will be described.

The wireless power transfer system 100 according to the first embodiment of the present disclosure includes an electric power supply apparatus 110, a power receiving apparatus 120, and a posture/position adjustment mechanism 160.

An electric power supply primary coil 111 is a transmission side apparatus that can supply, in a wireless manner, electric power to an electric power supply secondary coil 121.

The electric power supply apparatus 110 includes the electric power supply primary coil 111, a drive circuit 112, and an adjustment circuit (not illustrated).

The electric power supply primary coil 111 is a transmission side coil circuit that supplies electric power in a wireless manner.

The drive circuit 112 is an electric circuit that drives the electric power supply primary coil 111.

For example, the drive circuit 112 supplies AC electric power having a predetermined frequency of the electric power supply primary coil.

The adjustment circuit (not illustrated) is a circuit that adjusts electric and magnetic properties of the electric power supply apparatus 110.

For example, the adjustment circuit (not illustrated) adjusts an electromagnetic resonance frequency of the electric power supply apparatus 110.

The electric power supply primary coil is provided at a specific position that is at least one particular position.

The power receiving apparatus 120 is a reception side apparatus to which electric power is supplied in a wireless manner from the electric power supply primary coil.

The power receiving apparatus 120 includes the electric power supply secondary coil 121 and a load 122.

The power receiving apparatus 120 may include the electric power supply secondary coil 121, the load 122, and an adjustment circuit (not illustrated).

The electric power supply secondary coil 121 is a reception side coil circuit for enabling wireless power transfer.

The adjustment circuit (not illustrated) is a circuit that adjusts electric and magnetic properties of the power receiving apparatus 120.

For example, the adjustment circuit (not illustrated) adjusts an electromagnetic resonance frequency of the power receiving apparatus 120.

The electric power supply secondary coil 121 is incorporated in an object.

Electric power supplied in a wireless manner from the electric power supply primary coil 111 can be supplied to the electric power supply secondary coil 121.

When an electric current flows in the electric power supply primary coil 111, a magnetic field is generated in a space sandwiched between the electric power supply primary coil 111 and the electric power supply secondary coil 121, and the generated magnetic field causes an electric current of the electric power supply primary coil 111 to flow.

When a relative posture or position between the electric power supply primary coil 111 and the electric power supply secondary coil 121 is set to a predetermined posture or position, electric power can be efficiently supplied in a wireless manner from the electric power supply primary coil 111 to the electric power supply secondary coil 121 with a small energy loss.

The posture/position adjustment mechanism 160 is a mechanism that can adjust the relative posture or position between the electric power supply primary coil 111 and the electric power supply secondary coil 121.

The posture/position adjustment mechanism 160 can adjust the relative posture or position between the electric power supply primary coil 111 and the electric power supply secondary coil 121 to the predetermined posture or position.

The posture/position adjustment mechanism 160 may be provided at the specific position that is at least one particular position.

The posture/position adjustment mechanism 160 can adjust the relative posture or position between the electric power supply primary coil 111 and the electric power supply secondary coil 121 to the predetermined posture or position based on position information of the electric power supply secondary coil 121 which will be described later.

Hereinafter, two examples of the wireless power transfer system according to the first embodiment of the present disclosure will be described.

First, first control of the wireless power transfer system will be described.

Figure 6:
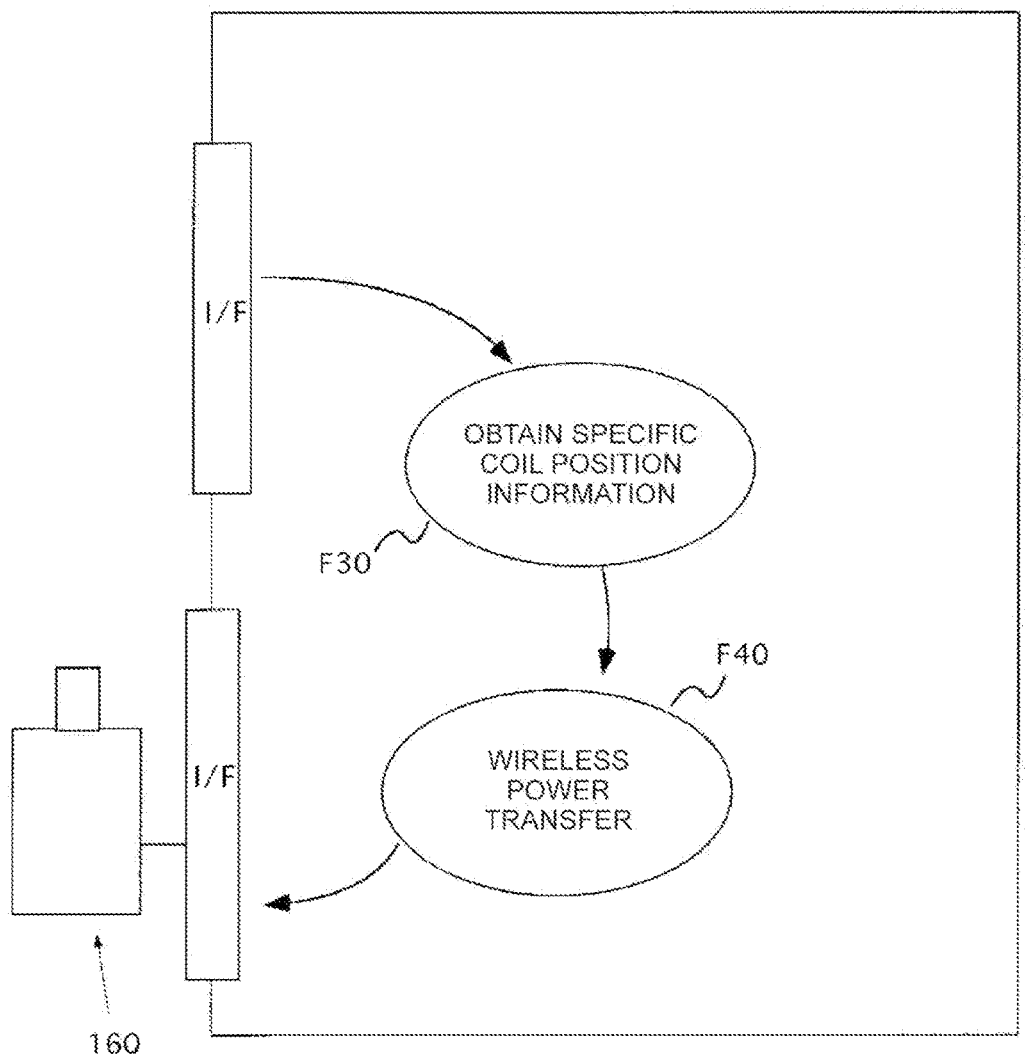
FIG. 6 is a first functional block diagram of the wireless power transfer system according to the embodiment of the present disclosure.

FIG. 6 is a first functional block diagram of the wireless power transfer system according to the embodiment of the present disclosure.

The first wireless power transfer system according to the embodiment of the present disclosure causes a control device to realize a specific coil position information obtaining function F30 and a wireless power transfer function F40.

The specific coil position information obtaining function F30 is a function to obtain, by means of data transfer, specific coil position information that is coil position information corresponding to information related to a position of the electric power supply secondary coil in a specific object that is an object that has made an electric power supply request.

The specific coil position information obtaining function F30 may obtain, when the specific object stops at the specific position, by means of the data transfer, the specific coil position information that is the coil position information corresponding to the information related to the position of the electric power supply secondary coil in the specific object that is the object that has made the electric power supply request.

For example, the specific coil position information obtaining function F30 obtains the specific coil position information by means of the data transfer through communication.

For example, the specific coil position information obtaining function F30 obtains, when the specific object stops at the specific position, the specific coil position information by means of the data transfer through the communication.

For example, the specific coil position information obtaining function F30 obtains, from the specific object, the specific coil position information by means of the data transfer through the communication.

For example, the specific coil position information obtaining function F30 obtains, when the specific object stops at the specific position, the specific coil position information by means of the data transfer through the communication.

The wireless power transfer function F40 is a function to supply, in a wireless manner, electric power from the electric power supply primary coil 111 to the electric power supply secondary coil 121 after the posture/position adjustment mechanism 160 adjusts the relative posture or position between the electric power supply primary coil 111 and the electric power supply secondary coil 121 incorporated in the specific object based on the information related to the position of the electric power supply secondary coil in the specific object corresponding to the specific coil position information.

The wireless power transfer function F40 supplies, in a wireless manner, electric power from the electric power supply primary coil 111 to the electric power supply secondary coil 121 after the posture/position adjustment mechanism 160 adjusts the relative posture or position between the electric power supply primary coil 111 and the electric power supply secondary coil 121 incorporated in the specific object based on the information related to the position of the electric power supply secondary coil in the specific object corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the relative posture or position between the electric power supply primary coil 111 and the electric power supply secondary coil 121 incorporated in the specific object based on the information related to the position of the electric power supply secondary coil in the specific object corresponding to the specific coil position information when an object 171 is located at the specific position.

Next, second control of the wireless power transfer system will be described.

Figure 7:
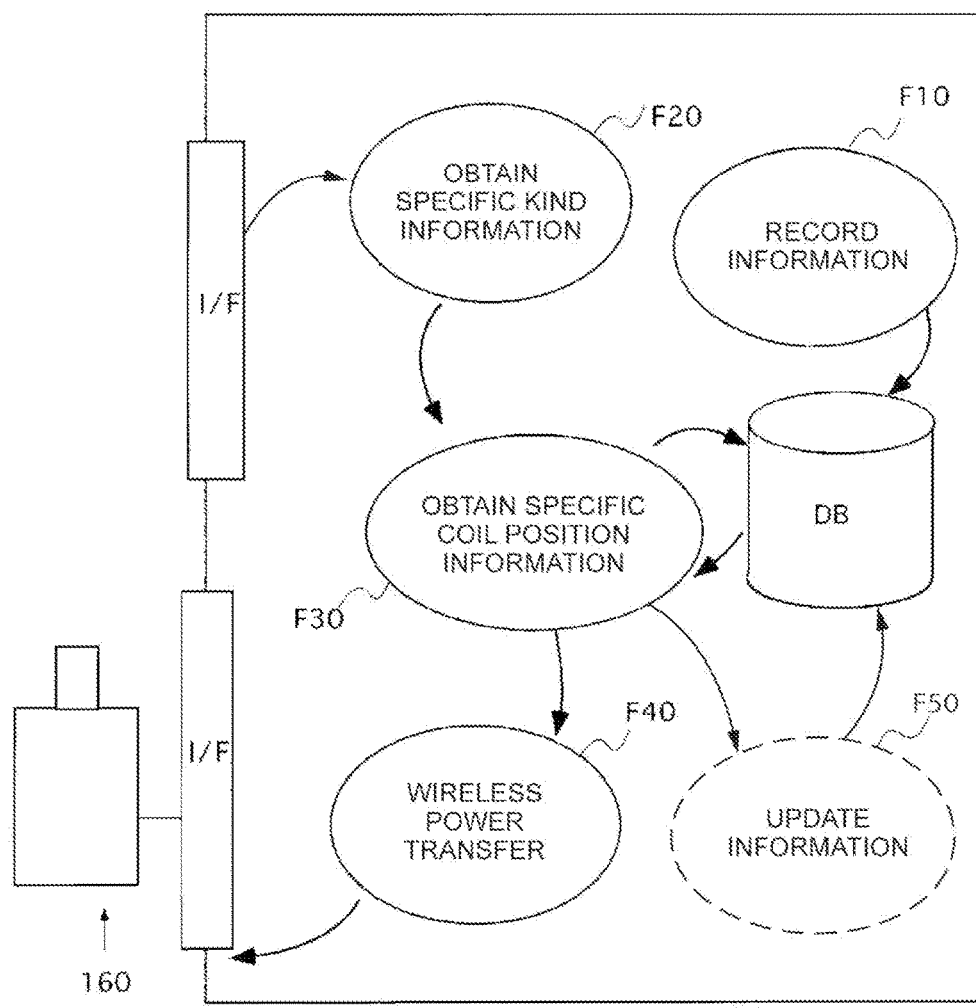
FIG. 7 is a second functional block diagram of the wireless power transfer system according to the embodiment of the present disclosure.

FIG. 7 is a second functional block diagram of the wireless power transfer system according to the embodiment of the present disclosure.

The wireless power transfer system according to the embodiment of the present disclosure causes a control device to realize an information recording function F10, a specific identification information obtaining function F20, a specific coil position information obtaining function F30, and a wireless power transfer function F40.

The wireless power transfer system according to the embodiment of the present disclosure may cause the control device to realize the information recording function F10, the specific identification information obtaining function F20, the specific coil position information obtaining function F30, the wireless power transfer function F40, and an information updating function F50.

The information recording function F10 is a function to preliminarily correlate each of a plurality of items of identification information with a corresponding one of a plurality of items of coil position information corresponding to information related to a position of the electric power supply secondary coil in an object, and record each of the plurality of items of identification information and each of the plurality of items of coil position information.

The information recording function F10 correlates each of the plurality of items of identification information with the corresponding one of the plurality of items of coil position information, and records, in a database DB, each of the plurality of items of identification information and each of the plurality of items of coil position information.

The plurality of items of identification information is a plurality of items of information capable of identifying each of a plurality of objects.

For example, the identification information is an ID provided to the object.

When the object is a vehicle, for example, the identification information is a plate number of the vehicle.

The plurality of items of identification information may be the plurality of items of information capable of identifying a kind of each of the plurality of objects.

When the object is a vehicle, for example, the identification information is a name or a code provided to a type of the vehicle.

The coil position information is information corresponding to the information related to the position of the electric power supply secondary coil in the object.

For example, the coil position information is a code corresponding to information for specifying the position of the electric power supply secondary coil 121 in the object 171.

For example, when the object is a vehicle, the information related to the position of the electric power supply secondary coil 121 is coordinate data of the electric power supply secondary coil 121 in the vehicle.

For example, the coil position information is a code corresponding to the coordinate data.

When the object is a vehicle, for example, the coil position information is a distance from a position of a center point of a shaft of a front wheel of the vehicle toward a center point of a shaft of a rear wheel to the electric power supply primary coil.

When the object is a vehicle, for example, the coil position information is the distance from the position of the center point of the shaft of the front wheel of the vehicle toward the center point of the shaft of the rear wheel to the electric power supply primary coil, and an area value of the electric power supply secondary coil.

When the object is a vehicle, for example, the coil position information is a distance from the position of the center point of the shaft of the rear wheel of the vehicle toward the center point of the shaft of the front wheel to the electric power supply primary coil.

When the object is a vehicle, for example, the coil position information is the distance from the position of the center point of the shaft of the rear wheel of the vehicle toward the center point of the shaft of the front wheel to the electric power supply primary coil, and the area value of the electric power supply secondary coil.

When there is a plurality of wireless power transfer systems, each of the plurality of wireless power transfer systems may have a database.

When there is the plurality of wireless power transfer systems, the plurality of wireless power transfer systems may share a particular database.

The plurality of wireless power transfer systems may access the particular database through a wide area communication network.

For example, the plurality of wireless power transfer systems accesses the particular database through the Internet.

The specific identification information obtaining function F20 is a function to obtain, by means of data transfer, specific identification information that is identification information of a specific object that is an object that has made an electric power supply request.

The specific identification information obtaining function F20 may obtain, by means of the data transfer, the specific identification information that is the identification information of the specific object that is the object that has made the electric power supply request.

The specific identification information obtaining function F20 may obtain and temporarily record the specific identification information that is the identification information of the specific object that is the object that has made the electric power supply request.

The specific identification information obtaining function F20 may obtain, by means of the data transfer, and record the specific identification information that is the identification information of the specific object that is the object that has made the electric power supply request.

In a case where the wireless power transfer system is used in a parking device for a vehicle, the specific identification information obtaining function F20 may obtain the specific identification information when waiting for an entry into the parking device.

For example, in a case where the wireless power transfer system is used in the parking device for a vehicle, the specific identification information obtaining function F20 obtains, by means of the data transfer, the specific identification information from the specific object when waiting for the entry into the parking device.

The specific identification information obtaining function F20 may obtain the specific identification information when receiving the electric power supply request.

For example, the specific identification information obtaining function F20 obtains, by means of the data transfer, the specific identification information from the specific object when receiving the electric power supply request.

The specific coil position information obtaining function F30 is a function to obtain, by means of the data transfer, specific coil position information that is coil position information related to the obtained specific identification information.

The specific coil position information obtaining function F30 obtains, as the specific coil position information and by means of the data transfer, the coil position information related to the specific identification information extracted from the database DB.

The specific coil position information obtaining function F30 may obtain, when the specific object stops at the specific position, the specific coil position information that is the coil position information related to the obtained specific identification information.

The specific coil position information obtaining function F30 may receive the specific identification information from the specific identification information obtaining function F20, and refer to the database DB to obtain, as the specific coil position information, the coil position information related to the specific identification information.

When the specific coil position information obtaining function F30 fails in obtaining, by means of the data transfer, the specific coil position information that is the coil position information related to the obtained specific identification information, the specific coil position information obtaining function F30 may transmit the specific identification information to the information updating function F50.

The information updating function F50 is a function to obtain the coil position information from the object and correlate the specific identification information with the obtained coil position information to record the specific identification information and the obtained coil position information in the database DB.

The information updating function F50 may obtain, upon receiving the specific identification information, the coil position information from the object and correlate the specific identification information with the obtained coil position information to record the specific identification information and the obtained coil position information in the database DB.

When the coil position information related to the specific identification information is recorded in the database DB, the information updating function F50 may obtain, as the specific coil position information, the coil position information related to the specific identification information from the database DB, and when the coil position information related to the specific identification information is not recorded in the database DB, the information updating function F50 may obtain the coil position information from the object, correlate the specific identification information with the obtained coil position information, and record, in the database DB, the specific identification information and the obtained coil position information.

For example, when the coil position information related to the specific identification information is not recorded in the database DB, the information updating function F50 may obtain, by means of the data transfer through communication, the coil position information from the object, correlate the specific identification information with the obtained coil position information, and record, in the database DB, the specific identification information and the obtained coil position information.

For example, when the coil position information related to the specific identification information is not recorded in the database DB, the information updating function F50 may obtain, by means of a separate measurement apparatus, the coil position information from the object, correlate the obtained specific identification information with the obtained coil position information, and record, in the database DB, the obtained specific identification information and the obtained coil position information.

The separate measurement apparatus is an apparatus that can measure the position of the electric power supply secondary coil in the object.

When the coil position information related to the specific identification information is recorded in the database DB, the coil position information related to the specific identification information may be obtained as the specific coil position information from the database DB, and when the specific identification information is not recorded in the database DB, the coil position information may be obtained from the object, the specific identification information may be correlated with the obtained coil position information, and the specific identification information and the obtained coil position information may be recorded in the database DB.

The wireless power transfer function F40 is a function to supply, in a wireless manner, electric power from the electric power supply primary coil 111 to the electric power supply secondary coil 121 after the posture/position adjustment mechanism 160 adjusts the relative posture or position between the electric power supply primary coil 111 and the electric power supply secondary coil 121 incorporated in the specific object 171 based on the information related to the position of the electric power supply secondary coil 121 in the specific object 171 corresponding to the specific coil position information.

The wireless power transfer function F40 supplies, in a wireless manner, electric power from the electric power supply primary coil 111 to the electric power supply secondary coil 121 after causing the posture/position adjustment mechanism 160 to adjust the relative posture or position between the electric power supply primary coil 111 and the electric power supply secondary coil 121 incorporated in the specific object 171 based on the information related to the position of the electric power supply secondary coil in the specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the relative posture or position between the electric power supply primary coil 111 and the electric power supply secondary coil 121 incorporated in the specific object 171 based on the information related to the position of the electric power supply secondary coil in the specific object 171 corresponding to the specific coil position information when the object 171 is located at the specific position.

Next, a wireless power transfer system 100 according to a second embodiment of the present disclosure will be described.

The wireless power transfer system 100 according to the second embodiment of the present disclosure includes an electric power supply apparatus 110, a power receiving apparatus 120, and a posture/position adjustment mechanism 160.

Since the configurations of the electric power supply apparatus 110 and the power receiving apparatus 120 are the same as those of the wireless power transfer system 100 according to the first embodiment, the description will be omitted.

The posture/position adjustment mechanism 160 is a mechanism that can adjust a relative posture or position between an electric power supply primary coil 111 and an object 171.

The posture/position adjustment mechanism 160 can adjust the relative posture or position between the electric power supply primary coil 111 and the object 171 to a predetermined posture or position.

The posture/position adjustment mechanism 160 may be provided at a specific position that is at least one particular position.

For example, the posture/position adjustment mechanism 160 can adjust the relative posture or position between the electric power supply primary coil 111 and the object 171 to the predetermined posture or position based on position information of an electric power supply secondary coil 121 which will be described later.

For example, the posture/position adjustment mechanism 160 can raise the object 171 to adjust the relative posture or position between the electric power supply primary coil 111 and the object 171 to the predetermined posture or position based on the position information of the electric power supply secondary coil 121 which will be described later.

Hereinafter, two examples of the wireless power transfer system according to the second embodiment of the present disclosure will be described.

First, first control of the wireless power transfer system will be described.

FIG. 6 is a first functional block diagram of the wireless power transfer system according to the embodiment of the present disclosure.

The first wireless power transfer system according to the embodiment of the present disclosure causes a control device to realize a specific coil position information obtaining function F30 and a wireless power transfer function F40.

Since the specific coil position information obtaining function F30 is the same as that of the wireless power transfer system according to the first embodiment, the description will be omitted.

The wireless power transfer function F40 is a function to supply, in a wireless manner, electric power from the electric power supply primary coil 111 to the electric power supply secondary coil 121 after the posture/position adjustment mechanism 160 adjusts the relative posture or position between the electric power supply primary coil 111 and the specific object 171 based on the information related to the position of the electric power supply secondary coil 121 in the specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the relative posture or position between the electric power supply primary coil 111 and the specific object 171 based on the information related to the position of the electric power supply secondary coil 121 in the specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the relative posture or position between the electric power supply primary coil 111 and the specific object 171 based on the information related to the position of the electric power supply secondary coil in the specific object 171 corresponding to the specific coil position information when the object 171 is located at the specific position.

Next, second control of the wireless power transfer system will be described.

FIG. 7 is a second functional block diagram of the wireless power transfer system according to the embodiment of the present disclosure.

The wireless power transfer system according to the embodiment of the present disclosure causes a control device to realize an information recording function F10, a specific identification information obtaining function F20, a specific coil position information obtaining function F30, and a wireless power transfer function F40.

The wireless power transfer system according to the embodiment of the present disclosure may cause the control device to realize the information recording function F10, the specific identification information obtaining function F20, the specific coil position information obtaining function F30, the wireless power transfer function F40, and an information updating function F50.

Since the information recording function F10, the specific identification information obtaining function F20, the specific coil position information obtaining function F30, and the information updating function F50 are the same as those of the wireless power transfer system according to the first embodiment, the description will be omitted.

The wireless power transfer function F40 is a function to supply, in a wireless manner, electric power from the electric power supply primary coil 111 to the electric power supply secondary coil 121 after the posture/position adjustment mechanism 160 adjusts the relative posture or position between the electric power supply primary coil 111 and the specific object 171 based on the information related to the position of the electric power supply secondary coil in the specific object corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the relative posture or position between the electric power supply primary coil 111 and the specific object 171 based on the information related to the position of the electric power supply secondary coil 121 in the specific object corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the relative posture or position between the electric power supply primary coil 111 and the specific object 171 based on the information related to the position of the electric power supply secondary coil 121 in the specific object corresponding to the specific coil position information when the object 171 is located at the specific position.

Next, a wireless power transfer system 100 according to a third embodiment of the present disclosure will be described.

Figure 2:
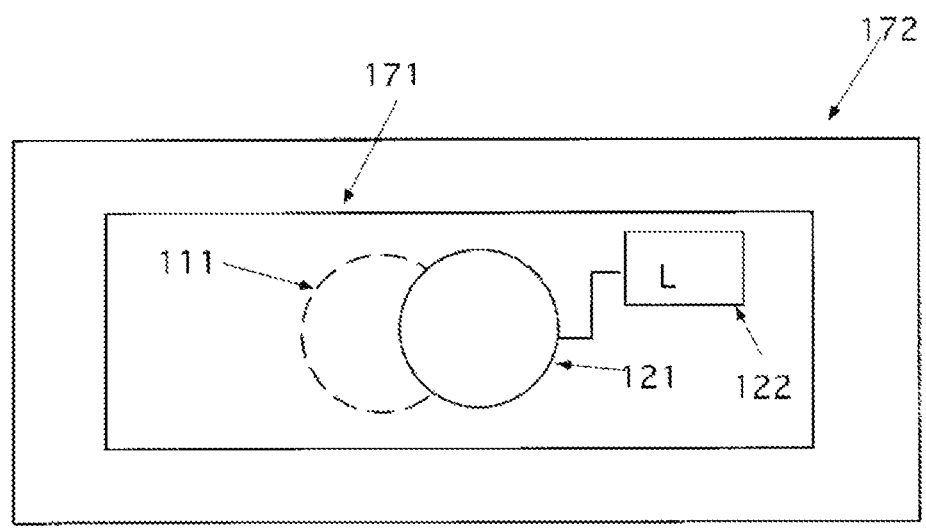
FIG. 2 is a cross-sectional diagram taken along line A-A of the wireless power transfer system according to the third embodiment of the present disclosure.

FIG. 1 is a conceptual diagram of the wireless power transfer system according to the third embodiment of the present disclosure. FIG. 2 is a cross-sectional diagram taken along line A-A of the wireless power transfer system according to the third embodiment of the present disclosure.

The wireless power transfer system 100 according to the third embodiment of the present disclosure includes an electric power supply apparatus 110, a power receiving apparatus 120, and a posture/position adjustment mechanism 160.

The wireless power transfer system 100 according to the third embodiment of the present disclosure may include the electric power supply apparatus 110, the power receiving apparatus 120, the posture/position adjustment mechanism 160, and an object support structure 172.

Since the configurations of the electric power supply apparatus 110 and the power receiving apparatus 120 are the same as those of the wireless power transfer system 100 according to the first embodiment, the description will be omitted.

The posture/position adjustment mechanism 160 is a mechanism that can adjust a posture or position of an electric power supply primary coil 111.

The posture/position adjustment mechanism 160 is a mechanism that can adjust the posture or position of the electric power supply primary coil 111 to a predetermined posture or position.

The posture/position adjustment mechanism 160 may be provided at a specific position that is at least one particular position.

The posture/position adjustment mechanism 160 can adjust the posture or position of the electric power supply primary coil 111 to the predetermined posture or position based on position information of an electric power supply secondary coil 121 which will be described later.

The object support structure 172 is a structure that can support an object.

The object support structure 172 can support the object at a fixed posture or position.

When the object is a vehicle, a pallet corresponding to the object support structure can support the vehicle at a fixed posture or position by means of a wheel stopper.

The object support structure 172 may be provided with a void Q2 in a region facing the electric power supply secondary coil 121 when the object support structure 172 supports the object.

Hereinafter, two examples of the wireless power transfer system according to the third embodiment of the present disclosure will be described.

First, first control of the wireless power transfer system will be described.

FIG. 6 is a first functional block diagram of the wireless power transfer system according to the embodiment of the present disclosure.

The first wireless power transfer system according to the embodiment of the present disclosure causes a control device to realize a specific coil position information obtaining function F30 and a wireless power transfer function F40.

Since the specific coil position information obtaining function F30 is the same as that of the wireless power transfer system according to the first embodiment, the description will be omitted.

The wireless power transfer function F40 is a function to supply, in a wireless manner, electric power from the electric power supply primary coil 111 to the electric power supply secondary coil 121 after the posture/position adjustment mechanism 160 adjusts the posture or position of the electric power supply primary coil 111 based on the information related to the position of the electric power supply secondary coil 121 in a specific object corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the posture or position of the electric power supply primary coil 111 based on the information related to the position of the electric power supply secondary coil 121 in the specific object corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the posture or position of the electric power supply primary coil 111 based on the information related to the position of the electric power supply secondary coil 121 in the specific object corresponding to the specific coil position information when an object 171 is located at the specific position.

Next, second control of the wireless power transfer system will be described.

FIG. 7 is a second functional block diagram of the wireless power transfer system according to the embodiment of the present disclosure.

The wireless power transfer system according to the embodiment of the present disclosure causes a control device to realize an information recording function F10, a specific identification information obtaining function F20, a specific coil position information obtaining function F30, and a wireless power transfer function F40.

The wireless power transfer system according to the embodiment of the present disclosure may cause the control device to realize the information recording function F10, the specific identification information obtaining function F20, the specific coil position information obtaining function F30, the wireless power transfer function F40, and an information updating function F50.

Since the information recording function F10, the specific identification information obtaining function F20, the specific coil position information obtaining function F30, and the information updating function F50 are the same as those of the wireless power transfer system according to the first embodiment, the description will be omitted.

The wireless power transfer function F40 is a function to supply, in a wireless manner, electric power from the electric power supply primary coil 111 to the electric power supply secondary coil 121 after the posture/position adjustment mechanism 160 adjusts the posture or position of the electric power supply primary coil 111 based on the information related to the position of the electric power supply secondary coil 121 in the specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the posture or position of the electric power supply primary coil 111 based on the information related to the position of the electric power supply secondary coil 121 in the specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the posture or position of the electric power supply primary coil 111 based on the information related to the position of the electric power supply secondary coil 121 in the specific object 171 corresponding to the specific coil position information when the object 171 is located at the specific position.

Next, a wireless power transfer system 100 according to a fourth embodiment of the present disclosure will be described.

Figure 4:
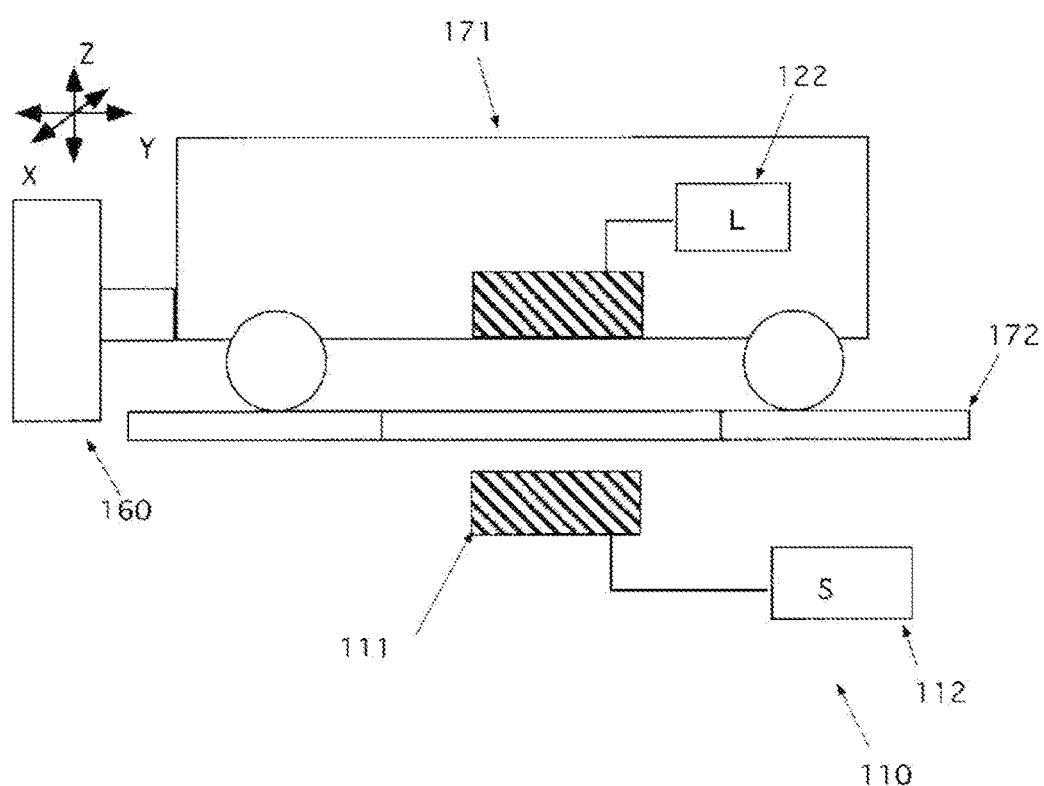
FIG. 4 is a conceptual diagram of a wireless power transfer system according to a fourth embodiment of the present disclosure.

FIG. 4 is a conceptual diagram of the wireless power transfer system according to the fourth embodiment of the present disclosure.

The wireless power transfer system 100 according to the fourth embodiment of the present disclosure includes an electric power supply apparatus 110, a power receiving apparatus 120, and a posture/position adjustment mechanism 160.

The wireless power transfer system 100 according to the fourth embodiment of the present disclosure may include the electric power supply apparatus 110, the power receiving apparatus 120, the posture/position adjustment mechanism 160, and an object support structure 172.

Since the configurations of the electric power supply apparatus 110 and the power receiving apparatus 120 are the same as those of the wireless power transfer system 100 according to the first embodiment, the description will be omitted.

The posture/position adjustment mechanism 160 is a mechanism that can adjust a posture or position of an object 171.

The posture/position adjustment mechanism 160 is a mechanism that can adjust the posture or position of the object 171 to a predetermined posture or position.

The posture/position adjustment mechanism 160 is provided at a specific position that is at least one particular position.

The posture/position adjustment mechanism 160 can adjust the posture or position of the object 171 to the predetermined posture or position based on position information of an electric power supply secondary coil 121 which will be described later.

The object support structure 172 is a structure that can support the object.

The object support structure 172 can support the object at a fixed posture or position.

When the object is a vehicle, a pallet corresponding to the object support structure can support the vehicle at a fixed posture or position by means of a wheel stopper.

The object support structure 172 may be provided with a void Q2 in a region facing the electric power supply secondary coil 121 when the object support structure 172 supports the object.

Hereinafter, two examples of the wireless power transfer system according to the fourth embodiment of the present disclosure will be described.

First, first control of the wireless power transfer system will be described.

FIG. 6 is a first functional block diagram of the wireless power transfer system according to the embodiment of the present disclosure.

The first wireless power transfer system according to the embodiment of the present disclosure causes a control device to realize a specific coil position information obtaining function F30 and a wireless power transfer function F40.

Since the specific coil position information obtaining function F30 is the same as that of the wireless power transfer system according to the first embodiment, the description will be omitted.

The wireless power transfer function F40 is a function to supply, in a wireless manner, electric power from an electric power supply primary coil 111 to the electric power supply secondary coil 121 after the posture/position adjustment mechanism 160 adjusts the posture or position of the object 171 based on the information related to the position of the electric power supply secondary coil 121 in a specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the posture or position of the object 171 based on the information related to the position of the electric power supply secondary coil 121 in the specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the posture or position of the object 171 based on the information related to the position of the electric power supply secondary coil 121 in the specific object 171 corresponding to the specific coil position information when the object is located at the specific position.

Next, second control of the wireless power transfer system will be described.

FIG. 7 is a second functional block diagram of the wireless power transfer system according to the embodiment of the present disclosure.

The wireless power transfer system according to the embodiment of the present disclosure causes a control device to realize an information recording function F10, a specific identification information obtaining function F20, a specific coil position information obtaining function F30, and a wireless power transfer function F40.

The wireless power transfer system according to the embodiment of the present disclosure may cause the control device to realize the information recording function F10, the specific identification information obtaining function F20, the specific coil position information obtaining function F30, the wireless power transfer function F40, and an information updating function F50.

Since the information recording function F10, the specific identification information obtaining function F20, the specific coil position information obtaining function F30, and the information updating function F50 are the same as those of the wireless power transfer system according to the first embodiment, the description will be omitted.

The wireless power transfer function F40 is a function to supply, in a wireless manner, electric power from the electric power supply primary coil 111 to the electric power supply secondary coil 121 after the posture/position adjustment mechanism 160 adjusts the posture or position of the object 171 based on the information related to the position of the electric power supply secondary coil 121 in the specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the posture or position of the object 171 based on the information related to the position of the electric power supply secondary coil 121 in the specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the posture or position of the object 171 based on the information related to the position of the electric power supply secondary coil 121 in the specific object 171 corresponding to the specific coil position information when the object 171 is located at the specific position.

Next, a wireless power transfer system 100 according to a fifth embodiment of the present disclosure will be described.

Figure 3:
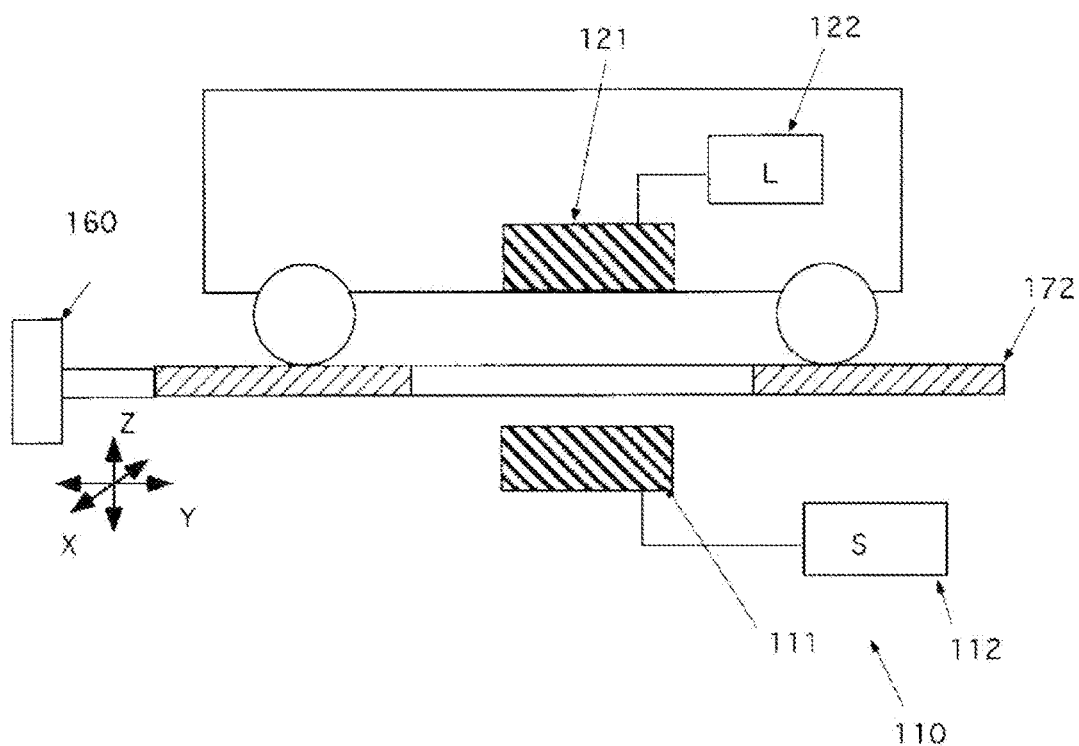
FIG. 3 is a conceptual diagram of a wireless power transfer system according to a fifth embodiment of the present disclosure.

FIG. 3 is a conceptual diagram of the wireless power transfer system according to the fifth embodiment of the present disclosure. FIG. 2 is a cross-sectional diagram taken along line A-A of the wireless power transfer system according to the fifth embodiment of the present disclosure.

The wireless power transfer system 100 according to the fifth embodiment of the present disclosure includes an electric power supply apparatus 110, a power receiving apparatus 120, a posture/position adjustment mechanism 160, and an object support structure 172.

Since the configurations of the electric power supply apparatus 110 and the power receiving apparatus 120 are the same as those of the wireless power transfer system 100 according to the first embodiment, the description will be omitted.

The object support structure 172 is a structure that can support an object.

The object support structure 172 can support the object at a fixed posture or position.

When the object is a vehicle, a pallet corresponding to the object support structure can support the vehicle at a fixed posture or position by means of a wheel stopper.

The object support structure 172 may be provided with a void Q2 in a region facing an electric power supply secondary coil 121 when the object support structure 172 supports the object.

The posture/position adjustment mechanism 160 is a mechanism that can adjust a posture or position of the object support structure 172.

The posture/position adjustment mechanism 160 is a mechanism that can adjust the posture or position of the object support structure 172 to a predetermined posture or position.

The posture/position adjustment mechanism 160 is provided at a specific position that is at least one particular position.

The posture/position adjustment mechanism 160 may be able to adjust the posture or position of the object support structure 172 to the predetermined posture or position based on position information of the electric power supply secondary coil 121 which will be described later.

The posture/position adjustment mechanism 160 may be able to adjust the posture or position of the object support structure 172 that supports an object 171 to the predetermined posture or position based on the position information of the electric power supply secondary coil 121 which will be described later.

Hereinafter, two examples of the wireless power transfer system according to the fifth embodiment of the present disclosure will be described.

First, first control of the wireless power transfer system will be described.

FIG. 6 is a first functional block diagram of the wireless power transfer system according to the embodiment of the present disclosure.

The first wireless power transfer system according to the embodiment of the present disclosure causes a control device to realize a specific coil position information obtaining function F30 and a wireless power transfer function F40.

Since the specific coil position information obtaining function F30 is the same as that of the wireless power transfer system according to the first embodiment, the description will be omitted.

The wireless power transfer function F40 is a function to supply, in a wireless manner, electric power from an electric power supply primary coil 111 to the electric power supply secondary coil 121 after the posture/position adjustment mechanism 160 adjusts the posture or position of the object support structure 172 based on the information related to the position of the electric power supply secondary coil 121 in the specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the posture or position of the object support structure 172 based on the information related to the position of the electric power supply secondary coil 121 in the specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the posture or position of the object support structure 172 based on the information related to the position of the electric power supply secondary coil 121 in the specific object 171 corresponding to the specific coil position information when the object 171 is located at the specific position.

Next, second control of the wireless power transfer system will be described.

FIG. 7 is a second functional block diagram of the wireless power transfer system according to the embodiment of the present disclosure.

The wireless power transfer system according to the embodiment of the present disclosure causes a control device to realize an information recording function F10, a specific identification information obtaining function F20, a specific coil position information obtaining function F30, and a wireless power transfer function F40.

The wireless power transfer system according to the embodiment of the present disclosure may cause the control device to realize the information recording function F10, the specific identification information obtaining function F20, the specific coil position information obtaining function F30, the wireless power transfer function F40, and an information updating function F50.

Since the information recording function F10, the specific identification information obtaining function F20, the specific coil position information obtaining function F30, and the information updating function F50 are the same as those of the wireless power transfer system according to the first embodiment, the description will be omitted.

The wireless power transfer function F40 is a function to supply, in a wireless manner, electric power from the electric power supply primary coil 111 to the electric power supply secondary coil 121 after the posture/position adjustment mechanism 160 adjusts the posture or position of the object support structure 172 based on the information related to the position of the electric power supply secondary coil 121 in the specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the posture or position of the object support structure 172 based on the information related to the position of the electric power supply secondary coil 121 in the specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the posture or position of the object support structure 172 based on the information related to the position of the electric power supply secondary coil 121 in the specific object 171 corresponding to the specific coil position information when the object 171 is located at the specific position.

Next, a wireless power transfer system 100 according to a sixth embodiment of the present disclosure will be described.

Figure 5:
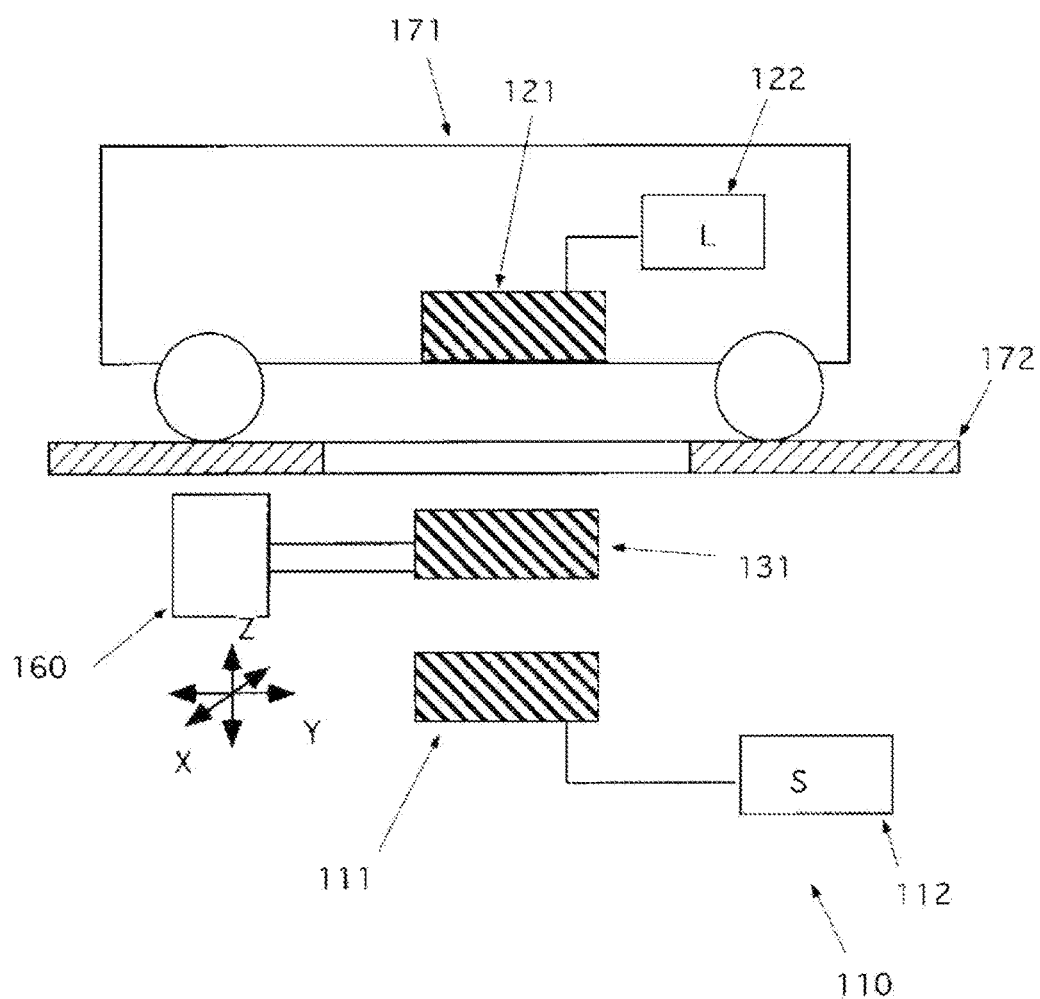
FIG. 5 is a conceptual diagram of a wireless power transfer system according to a sixth embodiment of the present disclosure.

FIG. 5 is a conceptual diagram of the wireless power transfer system according to the sixth embodiment of the present disclosure. FIG. 2 is a cross-sectional diagram taken along line A-A of the wireless power transfer system according to the sixth embodiment of the present disclosure.

The wireless power transfer system 100 according to the sixth embodiment of the present disclosure includes an electric power supply apparatus 110, a power receiving apparatus 120, a relay apparatus 130, and a posture/position adjustment mechanism 160.

Since the configurations of the electric power supply apparatus 110 and the power receiving apparatus 120 are the same as those of the wireless power transfer system 100 according to the first embodiment, the description will be omitted.

The relay apparatus 130 is an apparatus having a combination electromagnetic circuit 131 holding a relay coil or a relay core that can relay wireless power transfer from an electric power supply primary coil to an electric power supply secondary coil.

The combination electromagnetic circuit 131 may include a coil circuit.

The combination electromagnetic circuit 131 may include a core that induces a magnetic field.

The combination electromagnetic circuit 131 may include the coil circuit and the core.

The posture/position adjustment mechanism 160 is a mechanism that can adjust a posture or position of the combination electromagnetic circuit 131.

The posture/position adjustment mechanism 160 is a mechanism that can adjust the posture or position of the combination electromagnetic circuit 131 to a predetermined posture or position.

The posture/position adjustment mechanism 160 is provided at a specific position that is at least one particular position.

The posture/position adjustment mechanism 160 can adjust the posture or position of the combination electromagnetic circuit 131 to the predetermined posture or position based on position information of an electric power supply secondary coil 121 which will be described later.

Hereinafter, two examples of the wireless power transfer system according to the sixth embodiment of the present disclosure will be described.

First, first control of the wireless power transfer system will be described.

FIG. 6 is a first functional block diagram of the wireless power transfer system according to the embodiment of the present disclosure.

The first wireless power transfer system according to the embodiment of the present disclosure causes a control device to realize a specific coil position information obtaining function F30 and a wireless power transfer function F40.

Since the specific coil position information obtaining function F30 is the same as that of the wireless power transfer system according to the first embodiment, the description will be omitted.

The wireless power transfer function F40 is a function to supply, in a wireless manner, electric power from an electric power supply primary coil to the electric power supply secondary coil after the posture/position adjustment mechanism 160 adjusts the posture or position of the combination electromagnetic circuit 131 based on the information related to the position of the electric power supply secondary coil 121 in a specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the posture or position of the combination electromagnetic circuit 131 based on the information related to the position of the electric power supply secondary coil 121 in the specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the posture or position of the combination electromagnetic circuit 131 based on the information related to the position of the electric power supply secondary coil 121 in the specific object 171 corresponding to the specific coil position information when an object is located at the specific position.

Electric power is supplied in a wireless manner from the electric power supply primary coil 111 to the electric power supply secondary coil 121 via the combination electromagnetic circuit 131.

Next, second control of the wireless power transfer system will be described.

FIG. 7 is a second functional block diagram of the wireless power transfer system according to the embodiment of the present disclosure.

The wireless power transfer system according to the embodiment of the present disclosure causes a control device to realize an information recording function F10, a specific identification information obtaining function F20, a specific coil position information obtaining function F30, and a wireless power transfer function F40.

The wireless power transfer system according to the embodiment of the present disclosure may cause the control device to realize the information recording function F10, the specific identification information obtaining function F20, the specific coil position information obtaining function F30, the wireless power transfer function F40, and an information updating function F50.

Since the information recording function F10, the specific identification information obtaining function F20, the specific coil position information obtaining function F30, and the information updating function F50 are the same as those of the wireless power transfer system according to the first embodiment, the description will be omitted.

The wireless power transfer function F40 is a function to supply, in a wireless manner, electric power from the electric power supply primary coil 111 to the electric power supply secondary coil 121 after the posture/position adjustment mechanism 160 adjusts the posture or position of the combination electromagnetic circuit 131 based on the information related to the position of the electric power supply secondary coil 121 in the specific object 171 corresponding to the specific coil position information.

The wireless power transfer function F40 supplies, in a wireless manner, electric power from the electric power supply primary coil 111 to the electric power supply secondary coil 121 after causing the posture/position adjustment mechanism 160 to adjust the posture or position of the combination electromagnetic circuit 131 based on the information related to the position of the electric power supply secondary coil 121 in the specific object 171 corresponding to the specific coil position information.

The wireless power transfer function F40 may supply, in a wireless manner, electric power from the electric power supply primary coil 111 to the electric power supply secondary coil 121 after causing the posture/position adjustment mechanism 160 to adjust the posture or position of the combination electromagnetic circuit 131 based on the information related to the position of the electric power supply secondary coil 121 in the specific object 171 corresponding to the specific coil position information when the object is located at the specific position.

Electric power is supplied in a wireless manner from the electric power supply primary coil 111 to the electric power supply secondary coil 121 via the combination electromagnetic circuit 131.

Hereinafter, a vehicle electric power supply device according to an embodiment of the present disclosure will be described.

To begin with, a vehicle electric power supply device according to the first embodiment of the present disclosure will be described based on the drawings.

Figure 8:
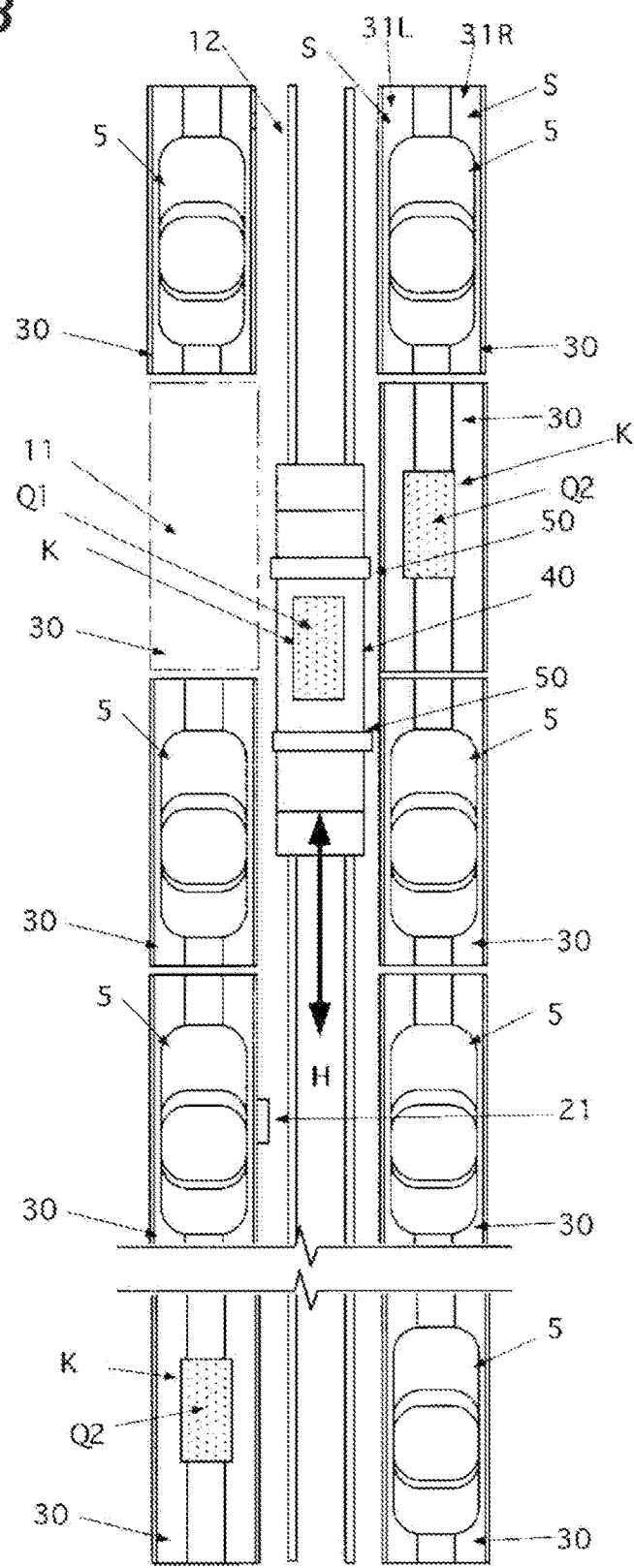
FIG. 8 is a plan view of a parking device to which a vehicle electric power supply device according to first and seventh embodiments of the present disclosure is applied.
Figure 9:
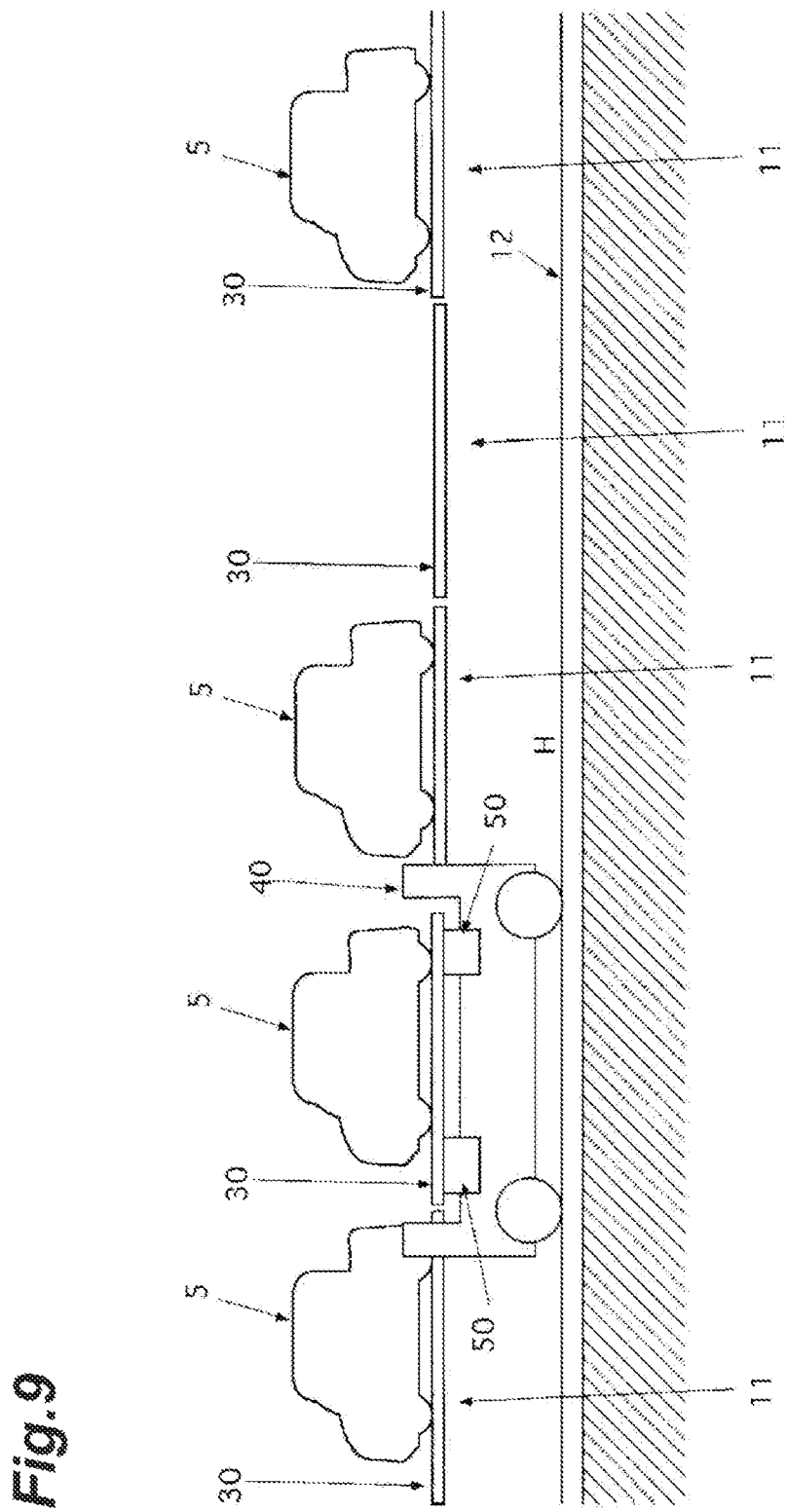
FIG. 9 is a side view of the parking device to which the vehicle electric power supply device according to the first and the seventh embodiments of the present disclosure is applied.
Figure 10:
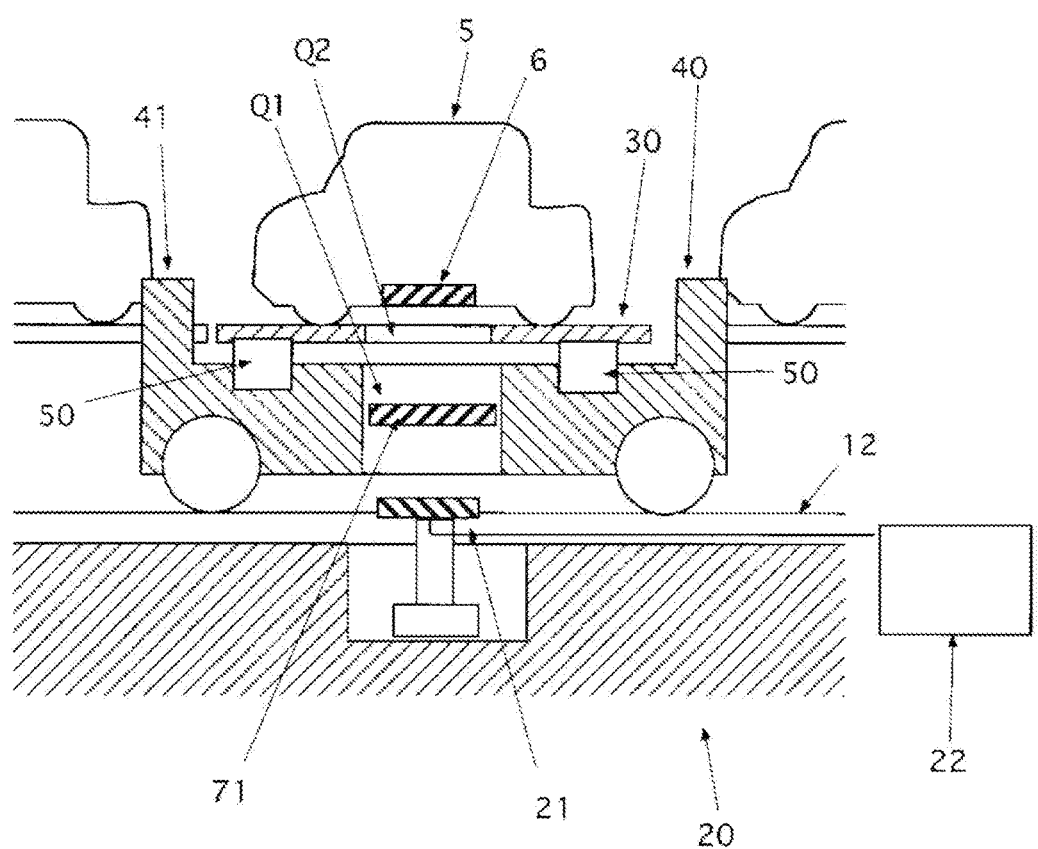
FIG. 10 is a side cross-sectional view of the vehicle electric power supply device according to the first and the seventh embodiments of the present disclosure.

FIG. 8 is a plan view of a parking device to which the vehicle electric power supply device according to the first embodiment of the present disclosure is applied. FIG. 9 is a side view of the parking device to which the vehicle electric power supply device according to the first embodiment of the present disclosure is applied. FIG. 10 is a side cross-sectional view of the vehicle electric power supply device according to the first embodiment of the present disclosure. FIGS. 11A and 11B are partial cross-sectional views of the vehicle electric power supply device according to the first embodiment of the present disclosure.

The vehicle electric power supply device according to the first embodiment is configured in such a manner that the present disclosure is applied to a so-called plane reciprocation parking device or an elevator sliding parking device.

The vehicle electric power supply device according to the first embodiment of the present disclosure is a device that supplies electric power to a vehicle capable of receiving power supply.

The vehicle electric power supply device according to the first embodiment of the present disclosure includes a main structure (not illustrated), a wireless power transfer system 20, a vehicle support structure 30, and a movable carriage 40.

The vehicle electric power supply device according to the first embodiment of the present disclosure may include the main structure (not illustrated), the wireless power transfer system 20, the vehicle support structure 30, the movable carriage 40, and a relay apparatus 70.

The vehicle electric power supply device according to the first embodiment of the present disclosure may include the main structure (not illustrated), the wireless power transfer system 20, the vehicle support structure 30, the movable carriage 40, a transfer apparatus 50, and the relay apparatus 70.

A vehicle 5 is a movable body capable of receiving power supply.

The vehicle 5 may be provided, on a lower surface thereof, with an electric power supply secondary coil 6 capable of receiving wireless power transfer.

For example, the vehicle 5 is a car having the electric power supply secondary coil 6 for wireless power transfer on a bottom part thereof.

To the electric power supply secondary coil 6, electric power is supplied in a wireless manner from an electric power supply primary coil 21 provided below the electric power supply secondary coil 6.

To the electric power supply secondary coil 6, for example, electric power is supplied in a wireless manner using a magnetic field resonance type from the electric power supply primary coil 21 provided below the electric power supply secondary coil 6.

To the electric power supply secondary coil 6, for example, electric power is supplied in a wireless manner using an electric field resonance type from the electric power supply primary coil 21 provided below the electric power supply secondary coil 6.

To the electric power supply secondary coil 6, for example, electric power is supplied in a wireless manner using an electromagnetic induction type from the electric power supply primary coil 21 provided below the electric power supply secondary coil 6.

The main structure (not illustrated) is a principal structure of the vehicle electric power supply device.

For example, the main structure (not illustrated) is a foundation structure of the vehicle electric power supply device.

The main structure (not illustrated) is provided with a storage space 11 arranged along a moving path H.

The main structure (not illustrated) may be provided with a plurality of storage spaces 11.

For example, the main structure (not illustrated) includes the plurality of storage spaces 11 and a rail for movement 12.

The movable carriage which will be described later runs on the rail for movement 12 to move along the moving path H.

The storage space 11 is a space in which a vehicle can be stored.

For example, the storage space 11 is a parking space in which a vehicle can be stored.

For example, the storage space 11 is a space in which the vehicle support structure on which a vehicle has been placed can be stored.

In FIG. 8, it is illustrated that the plurality of storage spaces 11 is arranged in series on the left and right of the moving path H which will be described later.

The wireless power transfer system 20 is a system that supplies electric power to the vehicle 5.

The wireless power transfer system 20 is an apparatus that supplies electric power to the vehicle 5.

The wireless power transfer system 20 is one of the wireless power transfer systems 100 according to the first to sixth embodiments of the present disclosure.

The electric power supply primary coil 21 corresponds to the electric power supply primary coil 111.

The electric power supply primary coil 21 is provided at a specific position.

The electric power supply secondary coil 6 corresponds to the electric power supply secondary coil 121.

The electric power supply secondary coil 6 is incorporated in the vehicle 5.

The electric power supply primary coil 21 is an electric power supply primary coil that can supply, in a wireless manner, electric power to the electric power supply secondary coil 6.

The electric power supply primary coil 21 is provided at the specific position that is at least one particular position on the moving path H.

For example, the electric power supply primary coil 21 is provided on a bottom surface of the specific position that is at least one particular position on the moving path H.

For example, the electric power supply primary coil 21 is provided on a side surface of the specific position that is at least one particular position on the moving path H.

A drive circuit 22 is a circuit that supplies electric power to the electric power supply primary coil 21 to drive the electric power supply primary coil 21.

To the drive circuit 22, electric power is supplied from a power source apparatus (not illustrated).

When an electric current flows in the electric power supply primary coil 21, the electric current can be extracted from the electric power supply secondary coil.

For example, when an AC current flows in the electric power supply primary coil 21, the AC current can be extracted from the electric power supply secondary coil 6.

The vehicle support structure 30 is a configuration that can support the vehicle 5.

For example, the vehicle 5 can be placed on the vehicle support structure 30.

For example, the vehicle support structure 30 is provided with a right wheel support structure part 31R and a left wheel support structure part 31L.

The right wheel support structure part 31R is a part that supports a pair of front and rear right wheels of the vehicle 5.

The left wheel support structure part 31L is a part that supports a pair of front and rear left wheels of the vehicle 5.

The right wheel support structure part 31R and the left wheel support structure part 31L integrally support the vehicle.

The vehicle support structure 30 is provided with a void Q2 surrounded by a predetermined contour K between the right wheel support structure part 31R and the left wheel support structure part 31L arranged left and right when viewed from above.

In FIG. 10, it is illustrated that the void Q2 surrounded by the rectangular contour K is provided between the right wheel support structure part 31R and the left wheel support structure part 31L.

The right wheel support structure part 31R and the left wheel support structure part 31L each have a running surface S on which the wheels of the vehicle 5 run.

For example, the vehicle support structure 30 may be a structure having a substantially quadrilateral shape when viewed from above that holds the wheels of the vehicle 5 to support the vehicle, and may be provided with the vehicle support structure void Q2 that is the void having the predetermined contour K and penetrating in a vertical direction.

For example, the vehicle support structure 30 is a so-called pallet, and provided with the void Q2 penetrating a central part of the pallet in the vertical direction when viewed from above.

For example, the pallet rolls the wheels provided at a lower part thereof, and can move between a movable carriage main body 41 which will be described later and the storage space 11.

The movable carriage 40 is a carriage that supports the vehicle 5 and moves along the moving path H.

The movable carriage 40 includes the movable carriage main body 41.

The movable carriage main body 41 is a structure that supports the vehicle support structure 30 that supports the vehicle 5, and can move on the moving path H.

A movable carriage void Q1 is formed in the movable carriage main body.

For example, in the movable carriage main body, the movable carriage void Q1 penetrating in an upward direction and a horizontal direction facing a side surface of the main structure on which the electric power supply primary coil is provided is formed.

The transfer apparatus 50 is an apparatus that can transfer the vehicle 5 between the movable carriage main body 41 and the storage space 11.

The transfer apparatus 50 may be able to transfer the vehicle support structure 30 that supports the vehicle 5 between the movable carriage main body 41 and the storage space 11.

The relay apparatus 70 corresponds to the relay apparatus 130.

The relay apparatus 70 is an apparatus that relays wireless power transfer from the electric power supply primary coil 21 to the electric power supply secondary coil 6.

The relay apparatus 70 is an apparatus having a combination electromagnetic circuit 71 holding a relay coil or a relay core that can relay wireless power transfer from the electric power supply primary coil to the electric power supply secondary coil.

The combination electromagnetic circuit 71 may include a coil circuit.

The combination electromagnetic circuit 71 may include a core that induces a magnetic field.

The combination electromagnetic circuit 71 may include the coil circuit and the core.

The combination electromagnetic circuit 71 is provided so as to be surrounded by the contour K of the movable carriage void Q1.

In FIGS. 11A and 11B, two aspects are illustrated in which the combination electromagnetic circuit 71 is provided so as to be surrounded by the contour K of the movable carriage void Q1.

In FIG. 11A, it is illustrated that the combination electromagnetic circuit 71 is fixed to the movable carriage void Q1 by a bracket made of a material such as a fluororesin that does not hinder an electromagnetic field.

In FIG. 11B, it is illustrated that the movable carriage void Q1 is filled with the material such as the fluororesin that does not hinder the electromagnetic field, and the combination electromagnetic circuit 71 is embedded in the movable carriage void Q1.

In FIG. 10, it is illustrated that the moving path H extends horizontally, the electric power supply primary coil 21 is provided on the side surface of the specific position on the moving path H, the movable carriage 40 supports the vehicle support structure 30 that supports the vehicle 5, and the movable carriage 40 stops at the specific position on the moving path H.

In the drawing, a magnetic flux generated in the electric power supply primary coil 21 is represented by a broken line.

When the movable carriage 40 stops at the specific position on the moving path H, electric power is supplied in a wireless manner from the electric power supply primary coil 21 to the electric power supply secondary coil 6 after a posture/position adjustment mechanism adjusts a relative posture or position between the electric power supply primary coil 21 and the electric power supply secondary coil 6 incorporated in the specific vehicle 5 based on information related to a position of the electric power supply secondary coil in the specific vehicle corresponding to specific coil position information.

For example, when the movable carriage 40 stops at the specific position on the moving path H, electric power is supplied in a wireless manner from the electric power supply primary coil 21 to the electric power supply secondary coil 6 after the posture/position adjustment mechanism adjusts a posture or position of the electric power supply primary coil 21 based on the information related to the position of the electric power supply secondary coil 6 in the specific vehicle corresponding to the specific coil position information.

For example, when the movable carriage 40 stops at the specific position on the moving path H, electric power is supplied in a wireless manner from the electric power supply primary coil 21 to the electric power supply secondary coil 6 after the posture/position adjustment mechanism adjusts a posture or position of the vehicle 5 based on the information related to the position of the electric power supply secondary coil 6 in the specific vehicle corresponding to the specific coil position information.

For example, when the movable carriage 40 stops at the specific position on the moving path H, electric power is supplied in a wireless manner from the electric power supply primary coil 21 to the electric power supply secondary coil 6 after the posture/position adjustment mechanism adjusts a posture or position of the vehicle support structure 30 based on the information related to the position of the electric power supply secondary coil 6 in the specific vehicle corresponding to the specific coil position information.

For example, when the movable carriage 40 stops at the specific position on the moving path H, electric power is supplied in a wireless manner from the electric power supply primary coil 21 to the electric power supply secondary coil 6 after the posture/position adjustment mechanism adjusts a posture or position of the relay coil 71 based on the information related to the position of the electric power supply secondary coil 6 in the specific vehicle corresponding to the specific coil position information.

Hereinafter, operation of the vehicle electric power supply device according to the first embodiment of the present disclosure will be described.

Management of the parking device to which the vehicle electric power supply device is applied includes an entry step, an exit step, and a power supply step.

(Entry Step)

An entry command is received.

The vehicle 5 runs by itself to be placed on the vehicle support structure 30 located in an entry/exit space (not illustrated).

A lifter (not illustrated) moves the vehicle support structure 30 that supports the vehicle 5 from a layer in which the entry/exit space is located to a layer in which the storage space 11 is located.

The transfer apparatus 50 transfers the vehicle support structure 30 that supports the vehicle 5 from the lifter to the movable carriage 40.

The movable carriage 40 supports the vehicle support structure 30 that supports the vehicle 5, and moves on the moving path H.

The movable carriage 40 stops next to one storage space 11.

The transfer apparatus 50 transfers the vehicle support structure 30 that supports the vehicle 5 from the movable carriage 40 to the storage space 11.

(Exit Step)

An exit command is received.

The movable carriage 40 moves along the moving path H to stop next to the storage space 11 in which the vehicle 5 having the exit command is parked.

The transfer apparatus 50 transfers the vehicle support structure 30 that supports the vehicle 5 from the storage space 11 to the movable carriage 40.

The movable carriage 40 moves along the moving path H to a position where the lifter is located.

The transfer apparatus 50 transfers the vehicle support structure 30 that supports the vehicle 5 from the movable carriage 40 to the lifter.

The lifter (not illustrated) moves the vehicle support structure 30 that supports the vehicle 5 from the layer in which the storage space 11 is located to the layer in which the entry/exit space is located.

The vehicle 5 runs by itself to get down from the vehicle support structure 30 located in the entry/exit space (not illustrated).

(Power Supply Command)

A power supply command is received.

The movable carriage 40 moves along the moving path H to stop next to the storage space 11 in which the vehicle 5 having the power supply command is parked.

The transfer apparatus 50 transfers the vehicle support structure 30 that supports the vehicle 5 from the storage space 11 to the movable carriage 40.

The movable carriage 40 moves along the moving path H to the specific position.

The drive circuit 22 drives the electric power supply primary coil 21, and electric power is supplied in a wireless manner from the electric power supply primary coil 21 to the first electric power supply secondary coil 6.

The vehicle 5 is charged with the electric power supplied to the electric power supply secondary coil 6, and outputs a completion signal when the charging is completed.

Upon receiving the completion signal, the movable carriage 40 moves along the moving path H from the specific position, and the movable carriage 40 stops next to one storage space 11.

The transfer apparatus 50 transfers the vehicle support structure 30 that supports the vehicle 5 from the movable carriage 40 to the storage space 11.

Next, a vehicle electric power supply device according to the second embodiment of the present disclosure will be described based on the drawings.

Figure 12:
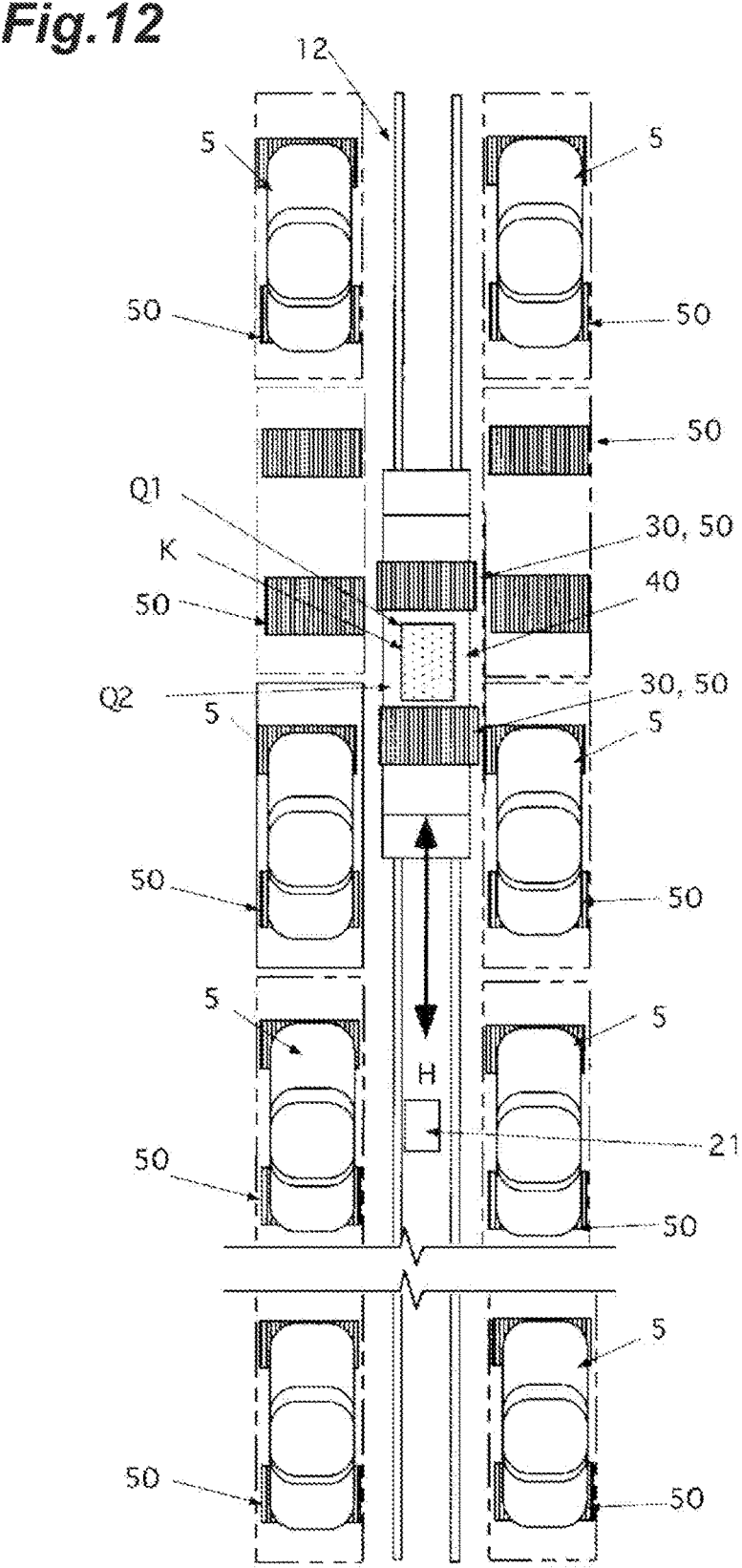
FIG. 12 is a plan view of a vehicle electric power supply device according to second and eighth embodiments of the present disclosure.

FIG. 12 is a plan view of the vehicle electric power supply device according to second embodiment of the present disclosure.

The vehicle electric power supply device according to the second embodiment of the present disclosure is a device that supplies electric power to a vehicle capable of receiving power supply.

The vehicle electric power supply device according to the second embodiment of the present disclosure includes a main structure (not illustrated), a wireless power transfer system 20, a vehicle support structure 30, and a movable carriage 40.

The vehicle electric power supply device according to the second embodiment of the present disclosure may include the main structure (not illustrated), the wireless power transfer system 20, the vehicle support structure 30, the movable carriage 40, and a relay apparatus 130.

The vehicle electric power supply device according to the second embodiment of the present disclosure may include the main structure (not illustrated), the wireless power transfer system 20, the vehicle support structure 30, the movable carriage 40, a transfer apparatus 50, and the relay apparatus 130.

Since the configurations of a vehicle 5, the main structure (not illustrated), the wireless power transfer system 20, the movable carriage 40, and the relay apparatus 130 are the same as those of the vehicle electric power supply device according to the first embodiment, the description will be omitted.

The vehicle support structure 30 is a configuration that can support the vehicle 5.

The vehicle support structure 30 includes a pair of conveyers on which the vehicle 5 can be placed.

For example, the vehicle support structure 30 includes a pair of front and rear conveyers.

For example, the vehicle support structure 30 includes a pair of left and right conveyers.

Wheels of the vehicle are placed on the conveyer, so that the conveyer supports the vehicle.

The vehicle support structure 30 is provided, at a position sandwiched between the pair of conveyers, with a vehicle support structure void that is a void having a predetermined contour K and penetrating in a vertical direction.

In FIG. 12, the vehicle support structure including the pair of front and rear conveyers is illustrated.

The transfer apparatus 50 is an apparatus that can transfer the vehicle between a movable carriage main body and a storage space.

The transfer apparatus 50 includes a pair of conveyers.

For example, the transfer apparatus 50 includes a pair of front and rear conveyers.

For example, the transfer apparatus 50 includes a pair of left and right conveyers.

The conveyer of the vehicle support structure 30 and the conveyer of the transfer apparatus 50 operate in cooperation with each other to transfer the vehicle between the conveyer of the vehicle support structure 30 and the conveyer of the transfer apparatus 50.

Since operation of the vehicle electric power supply device according to the second embodiment is substantially the same as the operation of the vehicle electric power supply device according to the first embodiment except for the above-mentioned configuration of the vehicle support structure, the description will be omitted.

Next, a vehicle electric power supply device according to the third embodiment of the present disclosure will be described based on the drawings.

Figure 13:
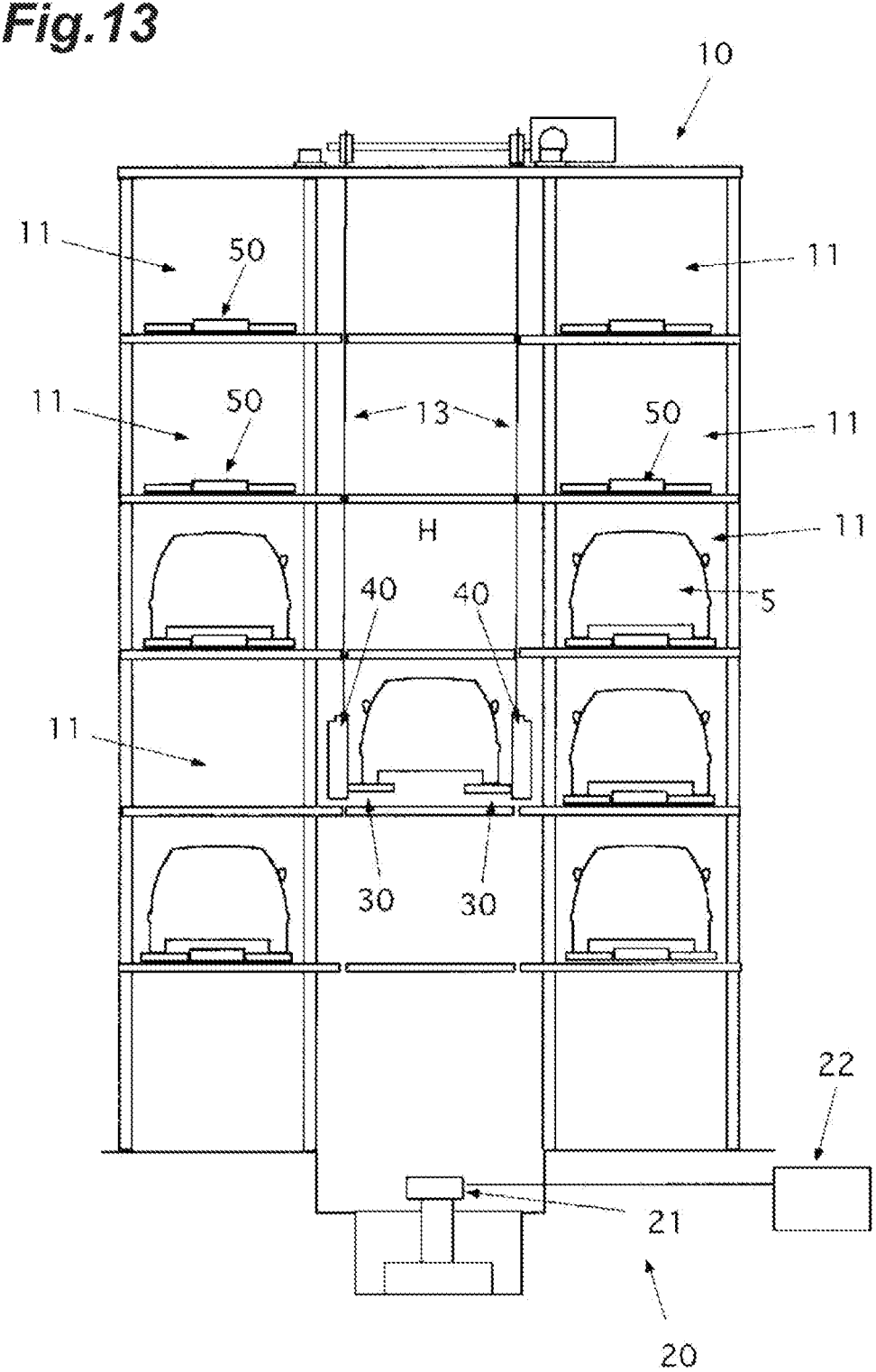
FIG. 13 is a front view of a vehicle electric power supply device according to the third and ninth embodiments of the present disclosure.
Figure 14:
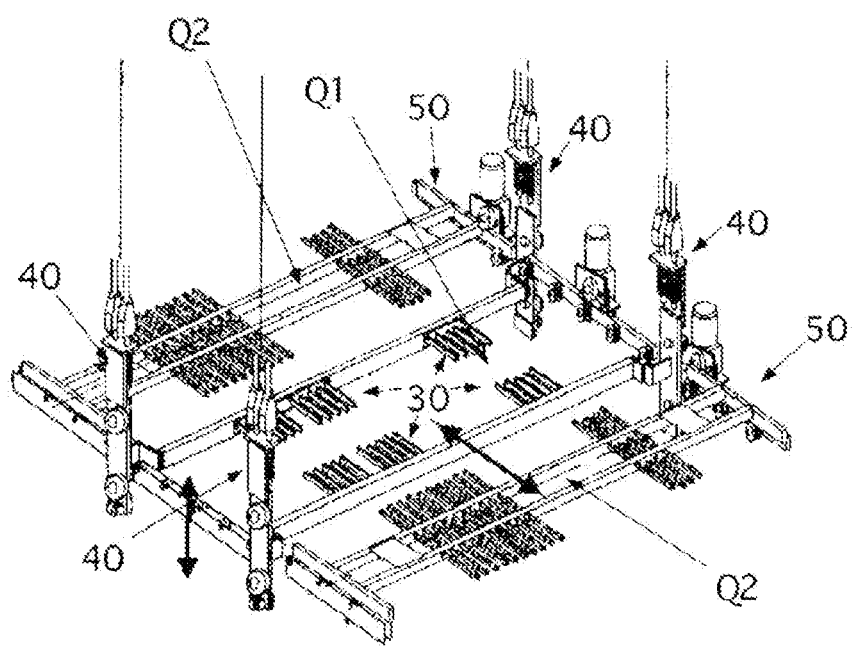
FIG. 14 is a conceptual view of the vehicle electric power supply device according to the third and the ninth embodiments of the present disclosure.

FIG. 13 is a front view of the vehicle electric power supply device according to the third embodiment of the present disclosure. FIG. 14 is a conceptual view of the vehicle electric power supply device according to the third embodiment of the present disclosure.

The vehicle electric power supply device according to the third embodiment of the present disclosure is a device that supplies electric power to a vehicle capable of receiving power supply.

The vehicle electric power supply device according to the third embodiment of the present disclosure may include a main structure 10, a wireless power transfer system 20, a vehicle support structure 30, and a movable carriage 40.

The vehicle electric power supply device according to the third embodiment of the present disclosure may include the main structure 10, the wireless power transfer system 20, the vehicle support structure 30, the movable carriage 40, and a transfer apparatus 50.

The vehicle electric power supply device according to the third embodiment of the present disclosure may include the main structure 10, the wireless power transfer system 20, the vehicle support structure 30, the movable carriage 40, and a transfer apparatus 50.

Since a vehicle is the same as that of the vehicle electric power supply device according to the first embodiment, the description will be omitted.

The main structure 10 is a principal structure of the vehicle electric power supply device.

For example, the main structure 10 is a foundation structure of the vehicle electric power supply device.

The main structure 10 is provided with a storage space 11 arranged along a moving path H extending in a vertical direction.

The main structure 10 may be provided with a plurality of storage spaces 11.

For example, the main structure 10 includes the plurality of storage spaces 11.

The movable carriage which will be described later moves along the moving path H in the vertical direction.

The storage space 11 is a space in which a vehicle can be stored.

For example, the storage space 11 is a parking space in which a vehicle can be stored.

For example, the storage space 11 is a space in which the vehicle support structure on which a vehicle has been placed can be stored.

In FIG. 14, it is illustrated that the plurality of storage spaces 11 is arranged in series in the vertical direction on the left and right of the moving path H which will be described later.

The wireless power transfer system 20 is an apparatus that supplies electric power to the vehicle 5.

An electric power supply primary coil 21 is an electric power supply primary coil that can supply, in a wireless manner, electric power to an electric power supply secondary coil.

The electric power supply primary coil 21 is provided at a specific position that is at least one particular position on the moving path H.

For example, the electric power supply primary coil 21 is provided at the lowermost part of the moving path H.

For example, the electric power supply primary coil 21 is provided on a side surface of the lowermost part of the moving path H.

For example, the electric power supply primary coil 21 is provided on a wall in the middle of the moving path H.

Since a drive circuit 22 is the same as that of the vehicle electric power supply device according to the first embodiment, the description will be omitted.

The vehicle support structure 30 is a configuration that can support the vehicle 5.

For example, the vehicle 5 can be placed on the vehicle support structure 30.

The vehicle support structure 30 includes a pair of comb-shaped support members.

For example, the vehicle support structure 30 includes a pair of left and right comb-shaped support members.

The pair of left and right comb-shaped support members has a plurality of rod-shaped members arranged in a front-rear direction so as to hold wheels of the vehicle and support the vehicle.

Figure 15:
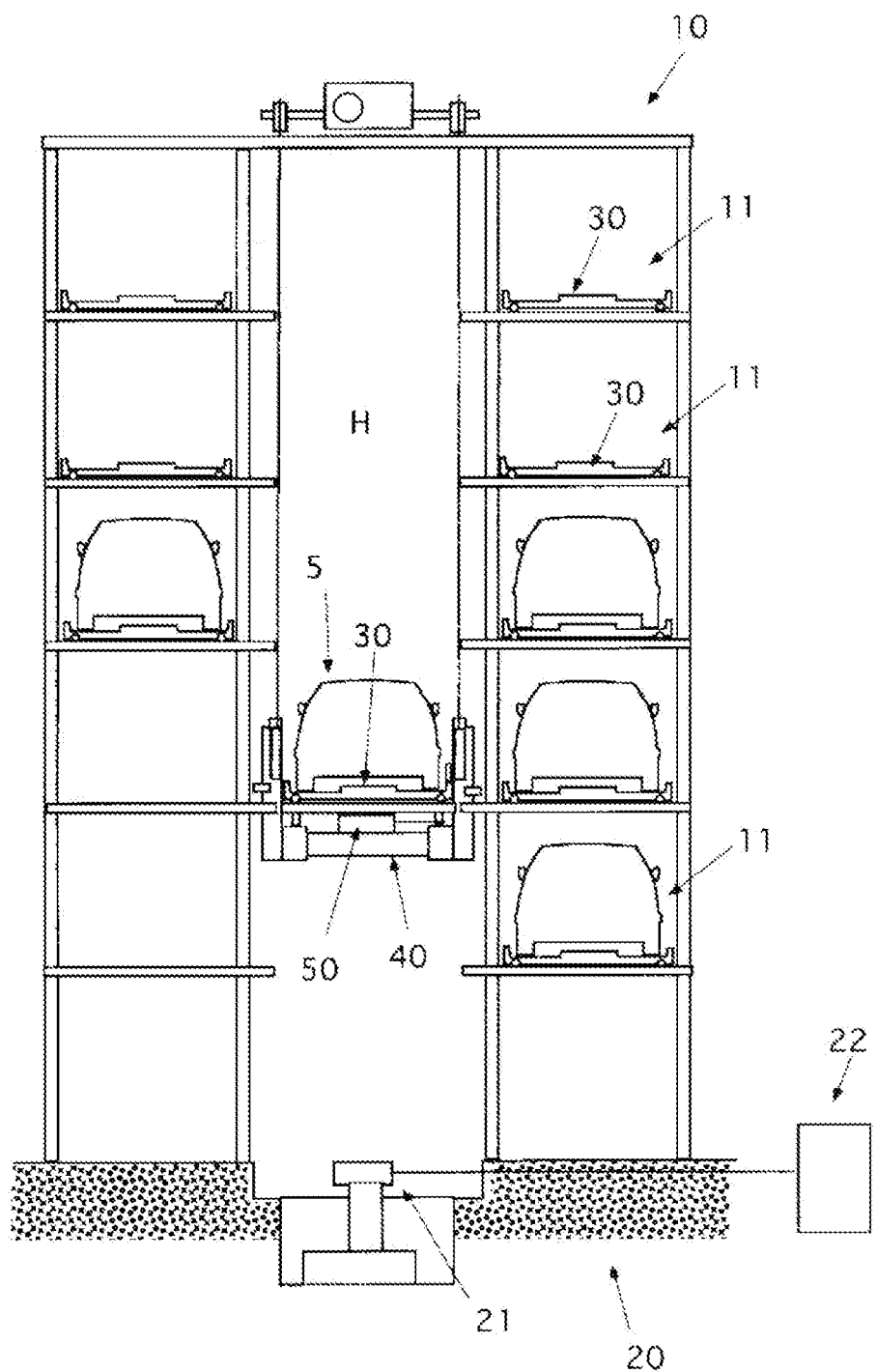
FIG. 15 is a front view of a vehicle electric power supply device according to the fourth and tenth embodiments of the present disclosure.

In FIG. 15, it is illustrated that the vehicle support structure 30 is configured such that each of the pair of left and right comb-shaped support members has the plurality of rod-shaped members on which front wheels and rear wheels of the vehicle are placed, is supported by the movable carriage 40, and is capable of moving on the moving path H in the vertical direction.

The vehicle support structure 30 is provided, at a position sandwiched between the pair of left and right comb-shaped support members, with a vehicle support structure void that is a void having a predetermined contour K when viewed from above and penetrating in the vertical direction.

The movable carriage 40 is a carriage that supports the vehicle 5 and moves along the moving path H.

The movable carriage 40 includes a movable carriage main body (not illustrated).

The movable carriage main body 41 is a structure that supports the vehicle support structure 30 that supports the vehicle 5, and can move on the moving path H in the vertical direction.

Since another configuration of the movable carriage is the same as that of the vehicle electric power supply device according to the first to second embodiments, the description will be omitted.

The transfer apparatus 50 is an apparatus that can transfer the vehicle 5 between the movable carriage main body 41 and the storage space 11. The transfer apparatus 50 can transfer the vehicle between the movable carriage main body 41 that has stopped on the moving path H and the storage space 11.

The transfer apparatus 50 has a plurality of rod-shaped members that can support the wheels of the vehicle 5.

Since operation of the vehicle electric power supply device according to the third embodiment is the same as the operation of the vehicle electric power supply device according to the first embodiment except for the above-mentioned moving path that extends in the vertical direction and the configuration of the vehicle support structure, the description will be omitted.

Next, a vehicle electric power supply device according to the fourth embodiment of the present disclosure will be described based on the drawings.

FIG. 15 is a front view of the vehicle electric power supply device according to the fourth embodiment of the present disclosure.

The vehicle electric power supply device according to the fourth embodiment of the present disclosure is a device that supplies electric power to a vehicle capable of receiving power supply.

The vehicle electric power supply device according to the fourth embodiment of the present disclosure may include a main structure 10, a wireless power transfer system 20, a vehicle support structure 30, and a movable carriage 40.

The vehicle electric power supply device according to the fourth embodiment of the present disclosure may include the main structure 10, the wireless power transfer system 20, the vehicle support structure 30, the movable carriage 40, and a transfer apparatus 50.

Since the configurations of a vehicle, the vehicle support structure 30, the movable carriage 40, the transfer apparatus 50, and a relay apparatus 130 are the same as those of the vehicle electric power supply device according to the first to fourth embodiments, the description will be omitted.

The main structure 10 is a principal structure of the vehicle electric power supply device.

For example, the main structure 10 is a foundation structure of the vehicle electric power supply device.

The main structure 10 is provided with a storage space 11 arranged along a moving path H extending in a vertical direction.

The main structure 10 may be provided with a plurality of storage spaces 11.

For example, the main structure 10 includes the plurality of storage spaces 11.

The movable carriage which will be described later moves along the moving path H in the vertical direction.

The storage space 11 is a space in which a vehicle can be stored.

For example, the storage space 11 is a parking space in which a vehicle can be stored.

For example, the storage space 11 is a space in which the vehicle support structure on which a vehicle has been placed can be stored.

In FIG. 15, it is illustrated that the plurality of storage spaces 11 is arranged in series in the vertical direction on the left and right of the moving path H which will be described later.

The wireless power transfer system 20 is an apparatus that supplies electric power to the vehicle 5.

An electric power supply primary coil 21 is an electric power supply primary coil that can supply, in a wireless manner, electric power to an electric power supply secondary coil.

The electric power supply primary coil 21 is provided on a side surface of a specific position that is at least one particular position on the moving path H.

For example, the electric power supply primary coil 21 is provided on a side surface of the lowermost part of the moving path H.

For example, the electric power supply primary coil 21 is provided on a wall in the middle of the moving path H.

Since a drive circuit 22 is the same as that of the vehicle electric power supply device according to the first embodiment, the description will be omitted.

Since operation of the vehicle electric power supply device according to the fourth embodiment is substantially the same as the operation of the vehicle electric power supply device according to the first embodiment except for the moving path that extends in the vertical direction, the description will be omitted.

The wireless power transfer system according to the embodiment of the present disclosure has the following effects owing to its configuration.

Electric power is supplied in a wireless manner after the specific coil position information is obtained and the relative posture or position between the electric power supply primary coil 111 and the electric power supply secondary coil 121 is adjusted based on the specific coil position information. Therefore, electric power can be efficiently supplied in a wireless manner from the electric power supply primary coil 111 to the electric power supply secondary coil 121.

Electric power is supplied in a wireless manner after the specific coil position information is obtained and the relative posture or position between the electric power supply primary coil 111 and the object 171 is adjusted based on the specific coil position information. Therefore, electric power can be efficiently supplied in a wireless manner from the electric power supply primary coil 111 to the electric power supply secondary coil 121 incorporated in the specific object 171.

Electric power is supplied in a wireless manner after the specific coil position information is obtained and the posture or position of the electric power supply primary coil 111 is adjusted based on the specific coil position information. Therefore, electric power can be efficiently supplied in a wireless manner from the electric power supply primary coil 111 to the electric power supply secondary coil 121 incorporated in the specific object 171.

Electric power is supplied in a wireless manner after the specific coil position information is obtained and the posture or position of the specific object 171 is adjusted based on the specific coil position information. Therefore, electric power can be efficiently supplied in a wireless manner from the electric power supply primary coil 111 to the electric power supply secondary coil 121 incorporated in the specific object 171.

Electric power is supplied in a wireless manner after the specific coil position information is obtained and the posture or position of the object support structure 172 that supports the specific object 171 is adjusted based on the specific coil position information. Therefore, electric power can be efficiently supplied in a wireless manner from the electric power supply primary coil 111 to the electric power supply secondary coil 121 incorporated in the specific object 171.

Electric power is supplied in a wireless manner after the specific coil position information is obtained and the posture or position of the combination electromagnetic circuit 131 is adjusted based on the specific coil position information. Therefore, electric power can be efficiently supplied in a wireless manner from the electric power supply primary coil 111 to the electric power supply secondary coil 121 incorporated in the specific object via the combination electromagnetic circuit 131.

Each of the plurality of items of identification information capable of identifying the object is preliminarily correlated with the corresponding one of the plurality of items of coil position information, each of the plurality of items of identification information and each of the plurality of items of coil position information are recorded, the specific identification information of the specific object that has made the electric power supply request is obtained, and the specific coil position information related to the specific identification information is obtained. Therefore, the specific coil position information can be easily obtained in accordance with a lot of objects, and electric power can be efficiently supplied in a wireless manner from the electric power supply primary coil 111 to the electric power supply secondary coil 121 incorporated in the specific object.

Each of the plurality of items of identification information capable of identifying the kind of the object is preliminarily correlated with the corresponding one of the plurality of items of coil position information, each of the plurality of items of identification information and each of the plurality of items of coil position information are recorded, the specific identification information of the specific object 171 that has made the electric power supply request is obtained, and the specific coil position information related to the specific identification information is obtained. Therefore, the specific coil position information can be easily obtained in accordance with a lot of kinds of the objects 171, and electric power can be efficiently supplied in a wireless manner from the electric power supply primary coil 111 to the electric power supply secondary coil 121 incorporated in the specific object 171.

The specific identification information is obtained from the specific object 171 when the entry into the parking device is waited for. Therefore, the relative posture or position between the electric power supply primary coil 111 and the electric power supply secondary coil 121 is adjusted in accordance with the kind of the specific object 171, and electric power can be efficiently supplied in a wireless manner from the electric power supply primary coil 111 to the electric power supply secondary coil 121 incorporated in the specific object 171.

The specific identification information is obtained from the specific object 171 when the electric power supply request is received. Therefore, the relative posture or position between the electric power supply primary coil 111 and the electric power supply secondary coil 121 is adjusted in accordance with the kind of the specific object 171, and electric power can be efficiently supplied in a wireless manner from the electric power supply primary coil 111 to the electric power supply secondary coil 121 incorporated in the specific object 171.

The vehicle electric power supply device according to the embodiment of the present disclosure has the following effects owing to its configuration.

Electric power is supplied in a wireless manner after the specific coil position information is obtained and the relative posture or position between the electric power supply primary coil 21 and the electric power supply secondary coil 6 is adjusted based on the specific coil position information when the movable carriage 40 stops at the specific position on the moving path H. Therefore, electric power can be efficiently supplied in a wireless manner from the electric power supply primary coil 21 to the electric power supply secondary coil 6.

Electric power is supplied in a wireless manner after the specific coil position information is obtained and the relative posture or position between the electric power supply primary coil 21 and the vehicle 5 is adjusted based on the specific coil position information when the movable carriage 40 stops at the specific position on the moving path H. Therefore, electric power can be efficiently supplied in a wireless manner from the electric power supply primary coil 21 to the electric power supply secondary coil 6 incorporated in the specific vehicle 5.

Electric power is supplied in a wireless manner after the specific coil position information is obtained and the posture or position of the electric power supply primary coil 21 is adjusted based on the specific coil position information when the movable carriage 40 stops at the specific position on the moving path H. Therefore, electric power can be efficiently supplied in a wireless manner from the electric power supply primary coil 21 to the electric power supply secondary coil 6 incorporated in the specific vehicle 5.

Electric power is supplied in a wireless manner after the specific coil position information is obtained and the posture or position of the specific vehicle 5 is adjusted based on the specific coil position information when the movable carriage 40 stops at the specific position on the moving path H. Therefore, electric power can be efficiently supplied in a wireless manner from the electric power supply primary coil 21 to the electric power supply secondary coil 6 incorporated in the specific vehicle 5.

Electric power is supplied in a wireless manner after the specific coil position information is obtained and the posture or position of the vehicle support structure 30 that supports the specific vehicle 5 is adjusted based on the specific coil position information when the movable carriage 40 stops at the specific position on the moving path H. Therefore, electric power can be efficiently supplied in a wireless manner from the electric power supply primary coil 21 to the electric power supply secondary coil 6 incorporated in the specific vehicle 5.

Electric power is supplied in a wireless manner after the specific coil position information is obtained and the posture or position of the combination electromagnetic circuit 71 is adjusted based on the specific coil position information. Therefore, electric power can be efficiently supplied in a wireless manner from the electric power supply primary coil 21 to the electric power supply secondary coil 6 incorporated in the specific vehicle 5 via the combination electromagnetic circuit 71.

Each of the plurality of items of identification information is preliminarily correlated with the corresponding one of the plurality of items of coil position information, each of the plurality of items of identification information and each of the plurality of items of coil position information are recorded, the specific identification information of the specific vehicle 5 that has made the electric power supply request is obtained, and the specific coil position information related to the specific identification information is obtained. Therefore, the specific coil position information can be easily obtained in accordance with a lot of kinds of the vehicles 5, and electric power can be efficiently supplied in a wireless manner from the electric power supply primary coil 21 to the electric power supply secondary coil 6 incorporated in the specific vehicle 5.

The specific identification information is obtained from the specific vehicle when the entry into the parking device is waited for. Therefore, the relative posture or position between the electric power supply primary coil 21 and the electric power supply secondary coil 6 is adjusted in accordance with the kind of the specific vehicle 5, and electric power can be efficiently supplied in a wireless manner from the electric power supply primary coil 21 to the electric power supply secondary coil 6 incorporated in the specific vehicle 5.

The specific identification information is obtained from the specific vehicle 5 when the electric power supply request is received. Therefore, the relative posture or position between the electric power supply primary coil 21 and the electric power supply secondary coil 6 is adjusted in accordance with the kind of the specific vehicle 5, and electric power can be efficiently supplied in a wireless manner from the electric power supply primary coil 21 to the electric power supply secondary coil 6 incorporated in the specific vehicle 5.

Next, a wireless power transfer system according to seventh to thirteenth embodiments of the present disclosure will be described based on the drawings. First, a wireless power transfer system 100 according to an embodiment of the present disclosure will be described.

The wireless power transfer system 100 according to the embodiment of the present disclosure is a system that supplies electric power to an object in which an electric power supply secondary coil capable of receiving wireless power transfer is incorporated.

The wireless power transfer system 100 according to the embodiment of the present disclosure includes an electric power supply apparatus 110 and a posture/position adjustment mechanism 160.

The wireless power transfer system 100 according to the embodiment of the present disclosure may include the electric power supply apparatus 110, a power receiving apparatus 120, and the posture/position adjustment mechanism 160.

The wireless power transfer system 100 according to the embodiment of the present disclosure may include the electric power supply apparatus 110, the power receiving apparatus 120, a relay apparatus 130, and the posture/position adjustment mechanism 160.

The wireless power transfer system 100 according to the embodiment of the present disclosure may include the electric power supply apparatus 110, the power receiving apparatus 120, the relay apparatus 130, the posture/position adjustment mechanism 160, and a position change apparatus 165.

An electric power supply primary coil 111 is a transmission side apparatus that can supply, in a wireless manner, electric power to an electric power supply secondary coil 121.

The electric power supply apparatus 110 includes the electric power supply primary coil 111, a drive circuit 112, and an adjustment circuit (not illustrated).

The electric power supply primary coil 111 is a transmission side coil circuit that supplies electric power in a wireless manner.

The drive circuit 112 is an electric circuit that drives the electric power supply primary coil 111.

For example, the drive circuit 112 supplies AC electric power having a predetermined frequency of the electric power supply primary coil.

The adjustment circuit (not illustrated) is a circuit that adjusts electric and magnetic properties of the electric power supply apparatus 110.

For example, the adjustment circuit (not illustrated) adjusts an electromagnetic resonance frequency of the electric power supply apparatus 110.

The electric power supply primary coil is provided at a specific position that is at least one particular position.

The power receiving apparatus 120 is a reception side apparatus to which electric power is supplied in a wireless manner from the electric power supply primary coil.

The power receiving apparatus 120 includes the electric power supply secondary coil 121 and a load 122.

The power receiving apparatus 120 may include the electric power supply secondary coil 121, the load 122, and an adjustment circuit (not illustrated).

The electric power supply secondary coil 121 is a reception side coil circuit for enabling wireless power transfer.

The adjustment circuit (not illustrated) is a circuit that adjusts electric and magnetic properties of the power receiving apparatus 120.

For example, the adjustment circuit (not illustrated) adjusts an electromagnetic resonance frequency of the power receiving apparatus 120.

The electric power supply secondary coil 121 is incorporated in an object.

Electric power supplied in a wireless manner from the electric power supply primary coil 111 can be supplied to the electric power supply secondary coil 121.

When an electric current flows in the electric power supply primary coil 111, a magnetic field is generated in a space sandwiched between the electric power supply primary coil 111 and the electric power supply secondary coil 121, and the generated magnetic field causes an electric current of the electric power supply primary coil 111 to flow.

When a relative posture or position between the electric power supply primary coil 111 and the electric power supply secondary coil 121 is set to a predetermined posture or position, electric power can be efficiently supplied in a wireless manner from the electric power supply primary coil 111 to the electric power supply secondary coil 121 with a small energy loss.

The middle apparatus 130 is an apparatus having a combination electromagnetic circuit 131 holding a relay coil or a relay core that can relay wireless power transfer from the electric power supply primary coil to the electric power supply secondary coil.

The combination electromagnetic circuit 131 may include a coil circuit.

The combination electromagnetic circuit 131 may include a core that induces a magnetic field.

The combination electromagnetic circuit 131 may include the coil circuit and the core.

The posture/position adjustment mechanism 160 is a mechanism that can adjust the relative posture or position between the electric power supply primary coil 111 and the electric power supply secondary coil 121.

The posture/position adjustment mechanism 160 can adjust the relative posture or position between the electric power supply primary coil 111 and the electric power supply secondary coil 121 to the predetermined posture or position.

The posture/position adjustment mechanism 160 may be provided at the specific position that is at least one particular position.

The posture/position adjustment mechanism 160 can adjust the relative posture or position between the electric power supply primary coil 111 and the electric power supply secondary coil 121 to the predetermined posture or position based on position information of the electric power supply secondary coil 121 which will be described later.

The position change mechanism 165 supports the posture/position adjustment mechanism 160, and can change a position of the posture/position adjustment mechanism 160 between an approach position that is a position to approach the object and a separate position that is a position to be separated from the object.

For example, the position change mechanism 165 is an elevating/lowering apparatus that supports, elevates and lowers the posture/position adjustment mechanism 160.

Hereinafter, a plurality of specific examples of the wireless power transfer system according to the embodiment of the present disclosure will be described based on the drawings.

To begin with, a wireless power transfer system according to a seventh embodiment of the present disclosure will be described based on the drawings.

Figure 16:
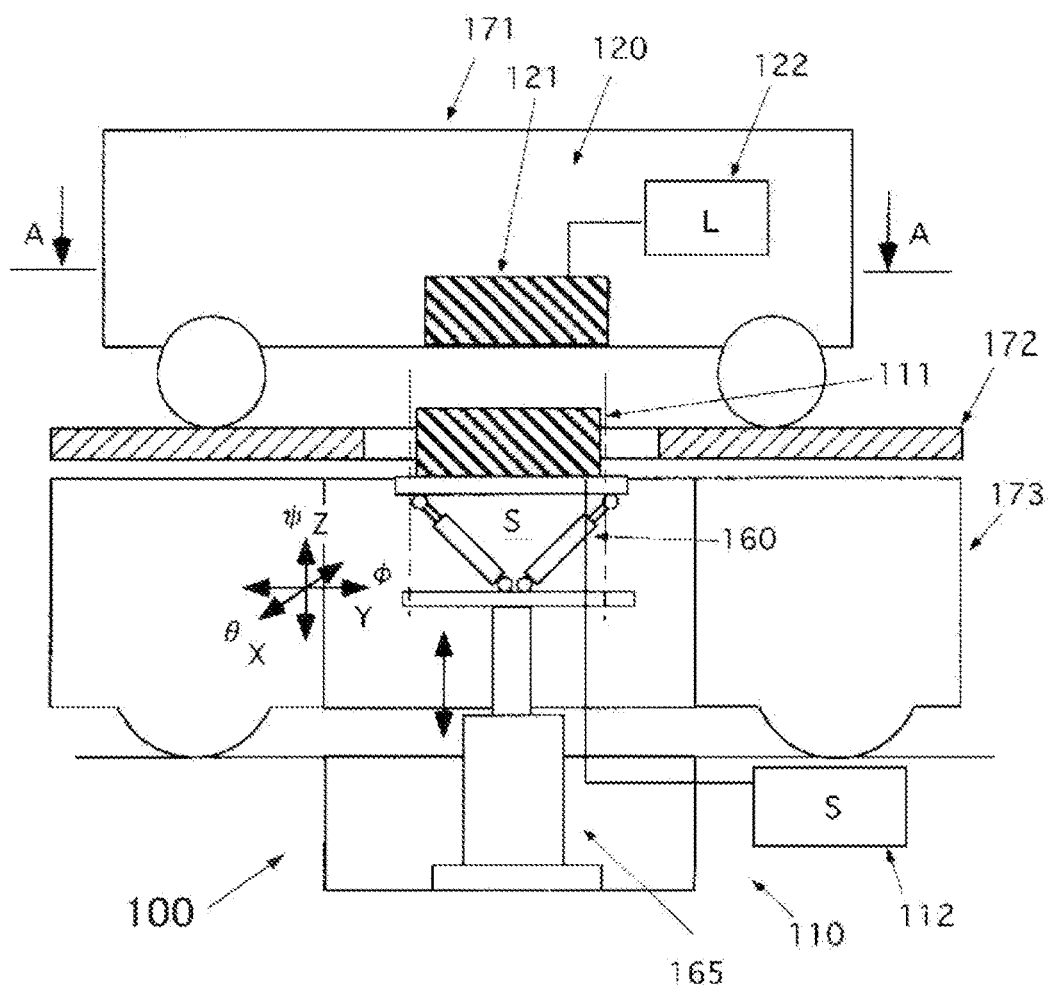
FIG. 16 is a conceptual diagram of a wireless power transfer system according to the seventh embodiment of the present disclosure.
Figure 17:
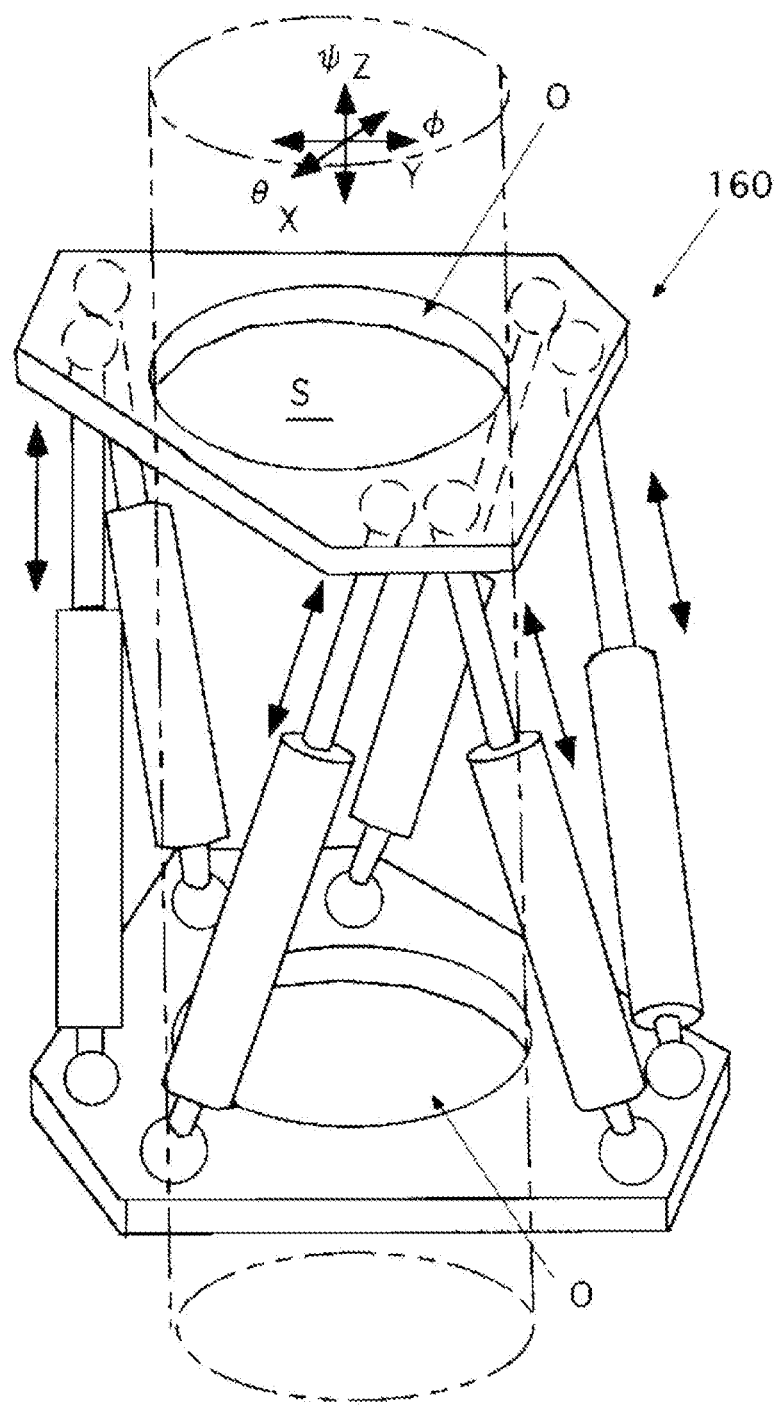
FIG. 17 is a conceptual view of a six-axis parallel link mechanism.

FIG. 16 is a conceptual diagram of the wireless power transfer system according to the seventh embodiment of the present disclosure. FIG. 17 is a conceptual view of a six-axis parallel link mechanism. FIG. 3 is a plan diagram of the wireless power transfer system according to the seventh embodiment of the present disclosure.

The wireless power transfer system according to the seventh embodiment of the present disclosure includes an electric power supply apparatus 110, a posture/position adjustment mechanism 160, and a position change mechanism 165.

The wireless power transfer system according to the seventh embodiment of the present disclosure may include the electric power supply apparatus 110, the posture/position adjustment mechanism 160, the position change mechanism 165, and an object support structure 172.

The wireless power transfer system according to the seventh embodiment of the present disclosure may include the electric power supply apparatus 110, the posture/position adjustment mechanism 160, the position change mechanism 165, and a movable body 173.

The wireless power transfer system according to the seventh embodiment of the present disclosure may include the electric power supply apparatus 110, the posture/position adjustment mechanism 160, the position change mechanism 165, the object support structure 172, and the movable body 173.

Since the configuration of the electric power supply apparatus 110 is the same as that of the above-mentioned electric power supply apparatus 110, the description will be omitted.

The posture/position adjustment mechanism 160 is a mechanism that can expand and contract a six-axis linear motion actuator to set a spatial six-degree-of-freedom of an electric power supply primary coil 111 to a predetermined spatial six-degree-of-freedom.

FIG. 17 is a view illustrating a so-called six-axis parallel link type mechanism that is an example of the posture/position adjustment mechanism 160.

The six-axis parallel link type mechanism includes six linear motion actuators 161, a base 162, and an end 163.

One end of each of the six actuators is swingably fixed to the base 162.

The other end of each of the six actuators is swingably fixed to the end 163.

An opening O is provided in a central part of the base 162.

An opening O is provided in a central part of the end 163.

A magnetic flux space S that is a space is formed between the opening O provided in the base 162 and the opening O provided in the end 163.

A magnetic flux generated between the electric power supply primary coil 111 and an electric power supply secondary coil 121 flows in the magnetic flux space S.

The spatial six-degree-of-freedom is a back and forth swing (surge) X, a left and right swing (sway) Y, an up and down swing (heave) Z, a horizontal swing (roll) $\theta$, a vertical swing (pitch) $\varphi$, and a bow swing (yaw) $\psi$.

A length of the six-axis linear motion actuator (L1, L2, L3, L4, L5, L6) is expanded and contracted, whereby the spatial six-degree-of-freedom of the end 163 is changed.

The end 163 supports the electric power supply secondary coil 121.

As a result, the length of the six-axis linear motion actuator (L1, L2, L3, L4, L5, L6) is expanded and contracted, whereby the spatial six-degree-of-freedom of the electric power supply secondary coil 121 is changed.

The position change mechanism 165 is provided at a specific position, supports the posture/position adjustment mechanism 160, and can change the position of the posture/position adjustment mechanism 160 between the approach position that is the position to approach the object 171 and the separate position that is the position to be separated from the object.

The position change mechanism 165 may be a linear motion mechanism fixed to the base of the posture/position adjustment mechanism 160.

When a specific object 171 that is an object 171 that has made an electric power supply request is located at the specific position, electric power is supplied in a wireless manner from the electric power supply primary coil 111 to the electric power supply secondary coil 121 after specific coil position information corresponding to information related to a position of the electric power supply secondary coil 121 incorporated in the specific object 171 is obtained, the position change mechanism 165 changes the position of the posture/position adjustment mechanism 160 from the separate position to the approach position, and the posture/position adjustment mechanism 160 expands and contracts the six-axis linear motion actuator based on the specific coil position information to set the spatial six-degree-of-freedom of the electric power supply primary coil to the predetermined spatial six-degree-of-freedom and adjust a relative posture or position between the electric power supply primary coil 111 and the electric power supply secondary coil 121 incorporated in the specific object 171.

Hereinafter, two examples of a process for obtaining the specific coil position information will be described based on the drawings.

First, a first procedure for obtaining the specific coil position information will be described.

FIG. 6 is a first functional block diagram of the process for obtaining the specific coil position information.

The first procedure for obtaining the specific coil position information causes a control device to realize a specific coil position information obtaining function F30 and a wireless power transfer function F40.

The specific coil position information obtaining function F30 is a function to obtain the specific coil position information that is coil position information corresponding to information related to a position of an electric power supply secondary coil in a specific object that is an object that has made an electric power supply request.

The specific coil position information obtaining function F30 may obtain, when the specific object stops at the specific position, the specific coil position information that is the coil position information corresponding to the information related to the position of the electric power supply secondary coil in the specific object that is the object that has made the electric power supply request.

The coil position information may be the information related to the position of the electric power supply secondary coil 121 with respect to the object.

The coil position information may be the information related to the position of the electric power supply secondary coil 121 with respect to the specific position.

For example, the specific coil position information obtaining function F30 obtains the specific coil position information by means of a sensor.

For example, the specific coil position information obtaining function F30 detects, when the specific object stops at the specific position, by means of the sensor, the electric power supply secondary coil incorporated in the specific object to obtain the specific coil position information.

For example, the specific coil position information obtaining function F30 detects, when the specific object stops at the specific position, by means of the sensor, a contour of the electric power supply secondary coil incorporated in the specific object to obtain the specific coil position information.

For example, the specific coil position information obtaining function F30 detects, when the specific object stops at the specific position, by means of the sensor, a marker provided in the electric power supply secondary coil incorporated in the specific object to obtain the specific coil position information.

For example, the specific coil position information obtaining function F30 obtains the specific coil position information by means of communication.

For example, the specific coil position information obtaining function F30 obtains, when the specific object stops at the specific position, the specific coil position information from the specific object by means of the communication.

For example, the specific coil position information obtaining function F30 obtains, from the specific object, the specific coil position information by means of the communication.

For example, the specific coil position information obtaining function F30 obtains, when the specific object stops at the specific position, the specific coil position information from the specific object by means of the communication.

Next, a second procedure for obtaining the specific coil position information will be described.

FIG. 7 is the second procedure for obtaining the specific coil position information.

The procedure for obtaining the specific coil position information causes a control device to realize an information recording function F10, a specific kind information obtaining function F20, a specific coil position information obtaining function F30, and a wireless power transfer function F40.

The information recording function F10 is a function to preliminarily correlate each of a plurality of items of kind information corresponding to a kind of an object with a corresponding one of a plurality of items of coil position information corresponding to information related to a position of an electric power supply secondary coil in the object, and record each of the plurality of items of kind information and each of the plurality of items of coil position information.

The information recording function F10 correlates each of the plurality of items of kind information with the corresponding one of the plurality of items of coil position information, and records, in a database DB, each of the plurality of items of kind information and each of the plurality of items of coil position information.

The kind information is information corresponding to the kind of the object.

For example, when the object is a vehicle, the kind is a vehicle type.

For example, the kind information is a code corresponding to the vehicle type of the vehicle.

The coil position information corresponds to the information related to the position of the electric power supply secondary coil 121 in the object.

For example, the coil position information is a code corresponding to information for specifying the position of the electric power supply secondary coil 121 in the object 171.

For example, when the object is a vehicle, the information related to the position of the electric power supply secondary coil 121 is coordinate data of the electric power supply secondary coil 121 in the vehicle.

For example, the coil position information is a code corresponding to the coordinate data.

The specific kind information obtaining function F20 is a function to obtain specific kind information that is kind information of a specific object that is an object that has made an electric power supply request.

The specific kind information obtaining function F20 may obtain and temporarily record the specific kind information that is the kind information of the specific object that is the object that has made the electric power supply request.

In a case where a wireless power transfer system is used in a parking device for a vehicle, the specific kind information obtaining function F20 may obtain the specific kind information when waiting for an entry into the parking device.

For example, in a case where the wireless power transfer system is used in the parking device for a vehicle, the specific kind information obtaining function F20 obtains the specific kind information from the specific object when waiting for the entry into the parking device.

The specific kind information obtaining function F20 may obtain the specific kind information when receiving the electric power supply request.

For example, the specific kind information obtaining function F20 obtains the specific kind information from the specific object when receiving the electric power supply request.

The specific coil position information obtaining function F30 is a function to obtain the specific coil position information that is the coil position information related to the obtained specific kind information.

The specific coil position information obtaining function F30 obtains, as the specific coil position information, the coil position information related to the specific kind information extracted from the database DB.

The specific coil position information obtaining function F30 may obtain, when the specific object stops at a specific position, the specific coil position information that is the coil position information related to the obtained specific kind information.

The specific coil position information obtaining function F30 may receive the specific kind information from the specific kind information obtaining function F20, and refer to the database DB to obtain, as the specific coil position information, the coil position information related to the specific kind information.

Next, a wireless power transfer system 100 according to an eighth embodiment of the present disclosure will be described based on the drawings.

Figure 18:
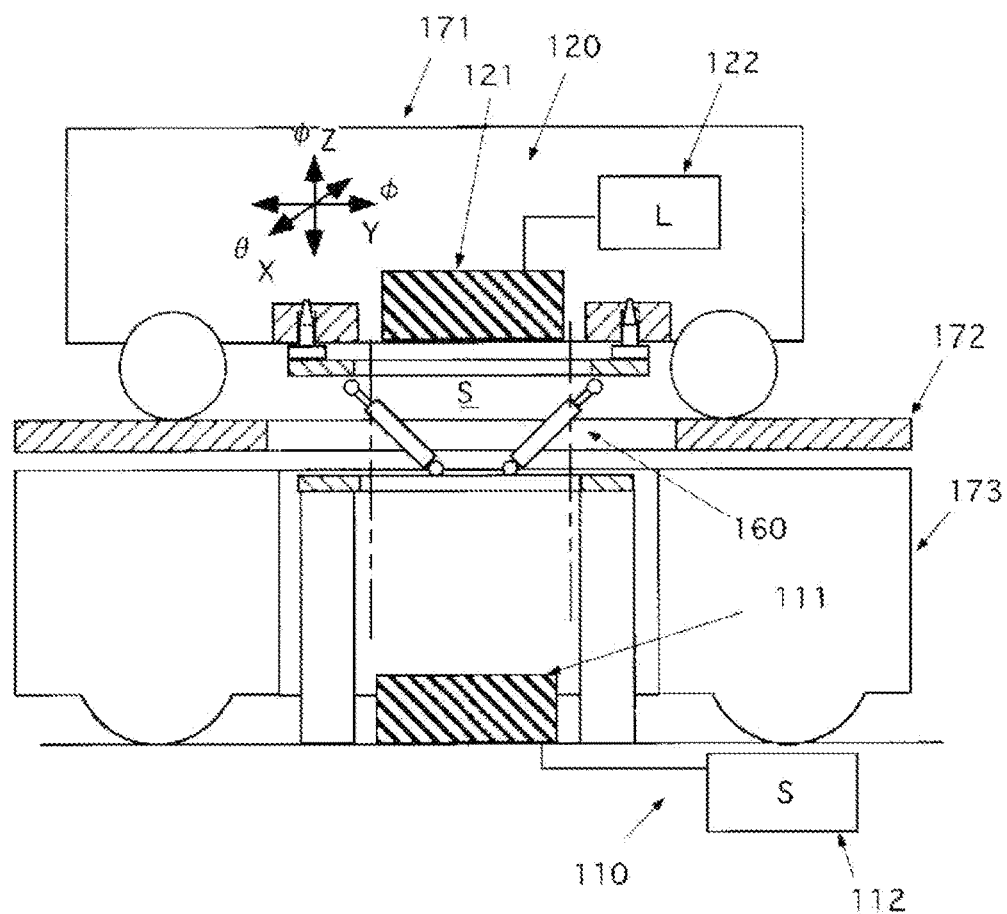
FIG. 18 is a conceptual diagram of a wireless power transfer system according to the eighth embodiment of the present disclosure.

FIG. 18 is a conceptual diagram of the wireless power transfer system according to the eighth embodiment of the present disclosure.

The wireless power transfer system 100 according to the eighth embodiment of the present disclosure includes an electric power supply apparatus 110, a power receiving apparatus 120, and a posture/position adjustment mechanism 160.

The wireless power transfer system 100 according to the eighth embodiment of the present disclosure may include the electric power supply apparatus 110, the power receiving apparatus 120, the posture/position adjustment mechanism 160, and an object support structure 172.

The wireless power transfer system 100 according to the eighth embodiment of the present disclosure may include the electric power supply apparatus 110, the power receiving apparatus 120, the posture/position adjustment mechanism 160, and a movable body 173.

The wireless power transfer system 100 according to the eighth embodiment of the present disclosure may include the electric power supply apparatus 110, the power receiving apparatus 120, the posture/position adjustment mechanism 160, the object support structure 172, and the movable body 173.

Since the configurations of the electric power supply apparatus 110 and the power receiving apparatus 120 are the same as those mentioned above, the description will be omitted.

An electric power supply primary coil 111 is provided at a specific position.

The posture/position adjustment mechanism 160 is a mechanism that is provided at the specific position and can expand and contract a six-axis linear motion actuator 161 to set a spatial six-degree-of-freedom of an object 171 to a predetermined spatial six-degree-of-freedom.

An example of the posture/position adjustment mechanism 160 is a so-called six-axis parallel link type mechanism.

The six-axis parallel link type mechanism includes six linear motion actuators 161, a base 162, and an end 163.

One end of each of the six linear motion actuators is swingably fixed to the base 162.

The other end of each of the six linear motion actuators is swingably fixed to the end 163.

An opening O is provided in a central part of the base 162.

An opening O is provided in a central part of the end 163.

A magnetic flux space S that is a space is formed between the opening O provided in the base 162 and the opening O provided in the end 163.

A magnetic flux generated between the electric power supply primary coil 111 and an electric power supply secondary coil 121 flows in the magnetic flux space S.

A length of the six-axis linear motion actuator (L1, L2, L3, L4, L5, L6) is expanded and contracted, whereby the spatial six-degree-of-freedom of the end 163 is changed.

The end 163 supports the object 171 so as to be detachable and attachable with respect to the object 171.

For example, an engaging part provided on the end 163 is engaged with an engaged part of the object 171 detachably and attachably.

As a result, the length of the six-axis linear motion actuator (L1, L2, L3, L4, L5, L6) is expanded and contracted, whereby the spatial six-degree-of-freedom of the electric power supply secondary coil 121 incorporated in the object 171 is changed.

When a specific object 171 that is an object 171 that has made an electric power supply request is located at the specific position, electric power is supplied in a wireless manner from the electric power supply primary coil to the electric power supply secondary coil after specific coil position information corresponding to information related to a position of the electric power supply secondary coil 121 incorporated in the specific object 171 is obtained, and the posture/position adjustment mechanism 160 expands and contracts the six-axis linear motion actuator 161 based on the specific coil position information to set the spatial six-degree-of-freedom of the specific object 171 to the predetermined spatial six-degree-of-freedom and adjust a relative posture or position between the electric power supply primary coil 111 and the electric power supply secondary coil 121 incorporated in the specific object 171.

For example, when the specific object 171 that is the object 171 that has made the electric power supply request is located at the specific position, electric power is supplied in a wireless manner from the electric power supply primary coil to the electric power supply secondary coil after the specific coil position information corresponding to the information related to the position of the electric power supply secondary coil 121 incorporated in the specific object 171 is obtained, and the posture/position adjustment mechanism 160 causes the end 163 to be engaged with the object 171, and expands and contracts the six-axis linear motion actuator 161 based on the specific coil position information to set the spatial six-degree-of-freedom of the specific object 171 to the predetermined spatial six-degree-of-freedom and adjust the relative posture or position between the electric power supply primary coil 111 and the electric power supply secondary coil 121 incorporated in the specific object 171.

Accordingly, a magnetic field generated between the electric power supply primary coil 111 and the electric power supply secondary coil 121 is generated in the magnetic flux space S surrounded by a three-axis linear motion actuator of the six-axis parallel link type mechanism.

Since a procedure for obtaining the specific coil position information is the same as that described in the wireless power transfer system according to the seventh embodiment, the description will be omitted.

Next, a wireless power transfer system 100 according to a ninth embodiment of the present disclosure will be described based on the drawings.

Figure 19:
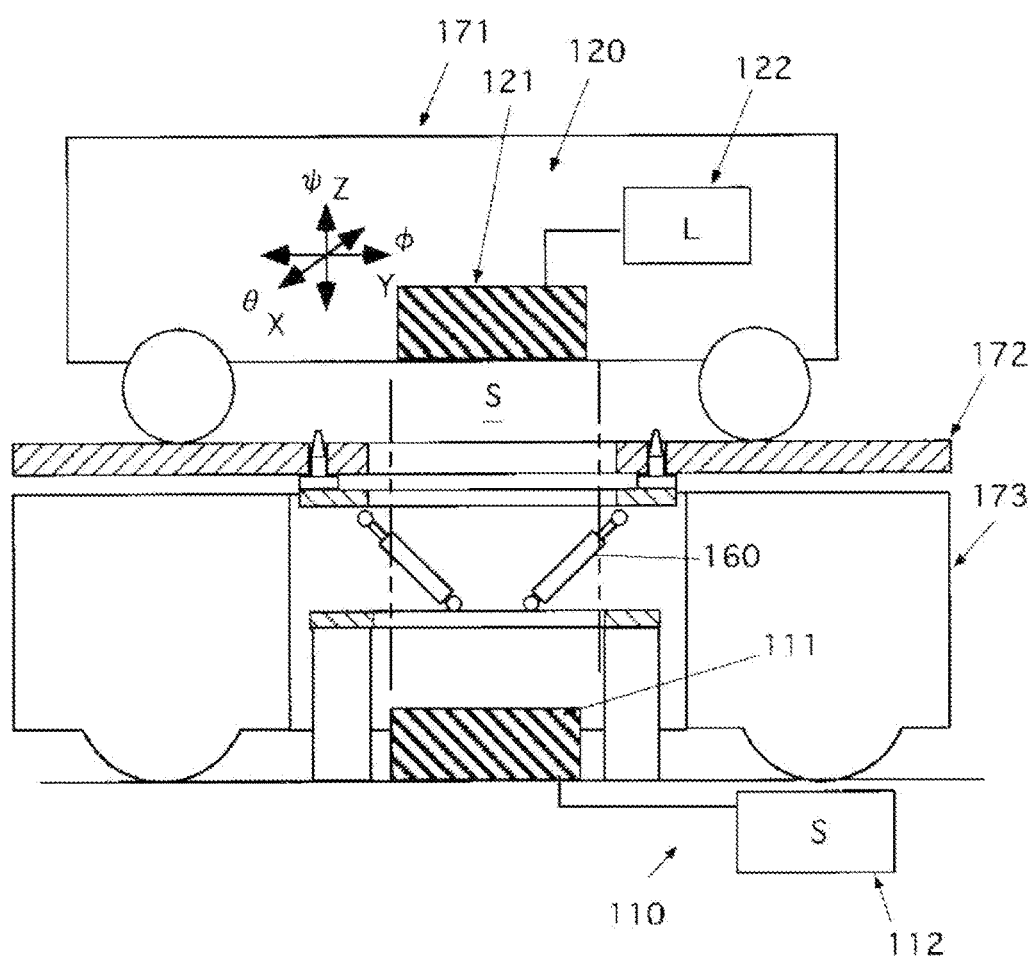
FIG. 19 is a conceptual diagram of a wireless power transfer system according to the ninth embodiment of the present disclosure.

FIG. 19 is a conceptual diagram of the wireless power transfer system 100 according to the ninth embodiment of the present disclosure.

The wireless power transfer system 100 according to the ninth embodiment of the present disclosure includes an electric power supply apparatus 110, a posture/position adjustment mechanism 160, and an object support structure 172.

The wireless power transfer system 100 according to the ninth embodiment of the present disclosure may include the electric power supply apparatus 110, the posture/position adjustment mechanism 160, the object support structure 172, and a movable body 173.

Since the configurations of the electric power supply apparatus 110 and the power receiving apparatus 120 are the same as those mentioned above, the description will be omitted.

An electric power supply primary coil 111 is provided at a specific position.

The posture/position adjustment mechanism 160 is a mechanism that is provided at the specific position and can expand and contract a six-axis linear motion actuator to set a spatial six-degree-of-freedom of the object support structure to a predetermined spatial six-degree-of-freedom.

An example of the posture/position adjustment mechanism 160 is a so-called six-axis parallel link type mechanism.

The six-axis parallel link type mechanism includes six linear motion actuators 161, a base 162, and an end 163.

One end of each of the six linear motion actuators is swingably fixed to the base 162.

The other end of each of the six linear motion actuators is swingably fixed to the end 163.

An opening O is provided in a central part of the base 162.

An opening O is provided in a central part of the end 163.

A magnetic flux space S that is a space is formed between the opening O provided in the base 162 and the opening O provided in the end 163.

A magnetic flux generated between the electric power supply primary coil 111 and an electric power supply secondary coil 121 flows in the magnetic flux space S.

A length of the six-axis linear motion actuator (L1, L2, L3, L4, L5, L6) is expanded and contracted, whereby the spatial six-degree-of-freedom of the end 163 is changed.

The end 163 supports the object support structure 172 so as to be detachable and attachable with respect to the object support structure 172.

For example, an engaging part provided on the end 163 is engaged with an engaged part of the object support structure 172 detachably and attachably.

As a result, the length of the six-axis linear motion actuator (L1, L2, L3, L4, L5, L6) is expanded and contracted, whereby the spatial six-degree-of-freedom of the electric power supply secondary coil 121 incorporated in an object 171 is changed.

When the object support structure 172 that supports a specific object 171 that is an object that has made an electric power supply request is located at the specific position, electric power is supplied in a wireless manner from the electric power supply primary coil 111 to the electric power supply secondary coil 121 after specific coil position information corresponding to information related to a position of the electric power supply secondary coil 121 incorporated in the specific object 171 is obtained, and the posture/position adjustment mechanism 160 expands and contracts the six-axis linear motion actuator based on the specific coil position information to set the spatial six-degree-of-freedom of the object support structure 172 that supports a specific object 171 to the predetermined spatial six-degree-of-freedom and adjust a relative posture or position between the electric power supply primary coil 111 and the electric power supply secondary coil 121 incorporated in the specific object 171.

For example, when the object support structure 172 that supports the specific object 171 that is the object that has made the electric power supply request is located at the specific position, electric power is supplied in a wireless manner from the electric power supply primary coil 111 to the electric power supply secondary coil 121 after the specific coil position information corresponding to the information related to the position of the electric power supply secondary coil 121 incorporated in the specific object 171 is obtained, and the posture/position adjustment mechanism 160 causes the end 163 to be engaged with the object support structure 172, and expands and contracts the six-axis linear motion actuator 161 based on the specific coil position information to set the spatial six-degree-of-freedom of the object support structure 172 that supports the specific object 171 to the predetermined spatial six-degree-of-freedom and adjust the relative posture or position between the electric power supply primary coil 111 and the electric power supply secondary coil 121 incorporated in the specific object 171.

Accordingly, a magnetic field generated between the electric power supply primary coil 111 and the electric power supply secondary coil 121 is generated in the magnetic flux space S surrounded by a three-axis linear motion actuator of the six-axis parallel link type mechanism.

Since a procedure for obtaining the specific coil position information is the same as that described in the wireless power transfer system according to the seventh embodiment, the description will be omitted.

Next, a wireless power transfer system 100 according to a tenth embodiment of the present disclosure will be described based on the drawings.

Figure 20:
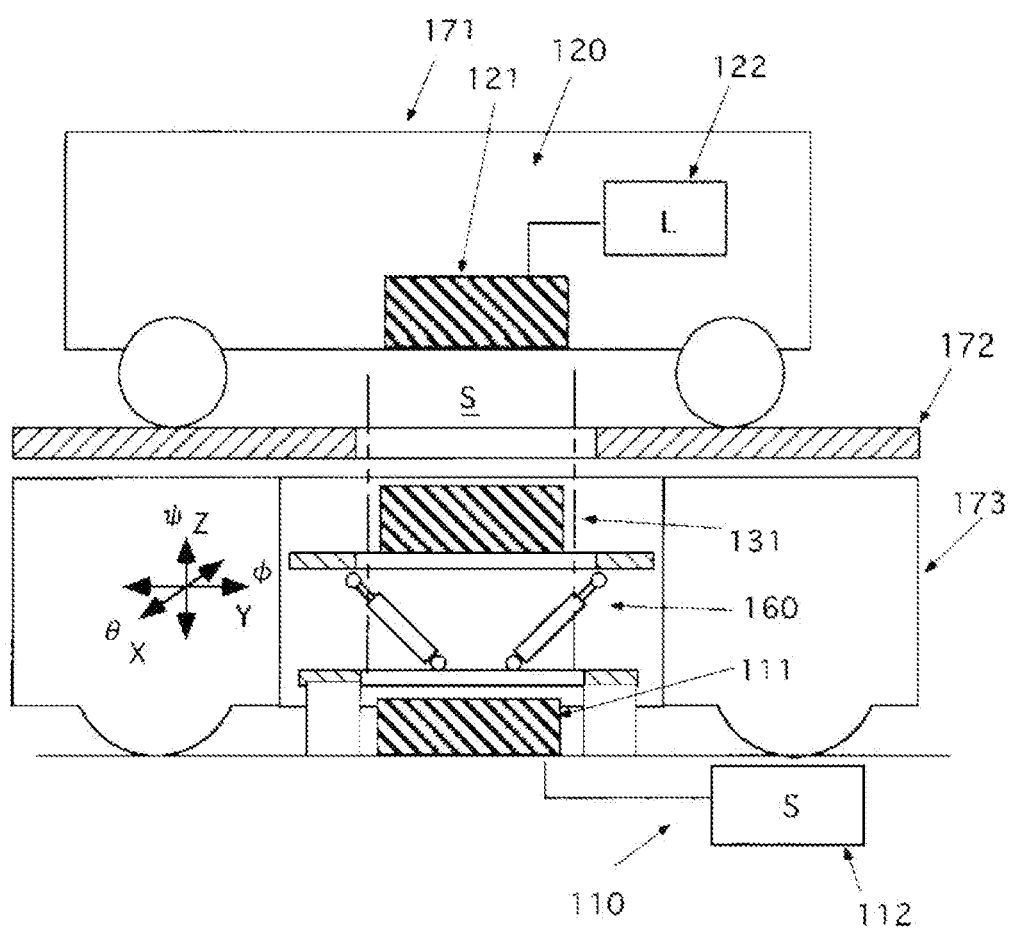
FIG. 20 is a conceptual diagram of a wireless power transfer system according to the tenth embodiment of the present disclosure.

FIG. 20 is a conceptual diagram of the wireless power transfer system according to the tenth embodiment of the present disclosure.

The wireless power transfer system 100 according to the tenth embodiment of the present disclosure includes an electric power supply apparatus 110, a relay apparatus 130, and a posture/position adjustment mechanism 160.

The wireless power transfer system 100 according to the tenth embodiment of the present disclosure includes the electric power supply apparatus 110, the relay apparatus 130, the posture/position adjustment mechanism 160, and an object support structure 172.

The wireless power transfer system 100 according to the tenth embodiment of the present disclosure may include the electric power supply apparatus 110, the relay apparatus 130, the posture/position adjustment mechanism 160, and a movable body 173.

The wireless power transfer system 100 according to the tenth embodiment of the present disclosure may include the electric power supply apparatus 110, the relay apparatus 130, the posture/position adjustment mechanism 160, the object support structure 172, and the movable body 173.

Since the configurations of the electric power supply apparatus 110 and the relay apparatus 130 are the same as those mentioned above, the description will be omitted.

An electric power supply primary coil 111 is provided at a specific position.

The posture/position adjustment mechanism 160 is a mechanism that is provided at the specific position and can expand and contract a six-axis linear motion actuator to set a spatial six-degree-of-freedom of a combination electromagnetic circuit 131 to a predetermined spatial six-degree-of-freedom.

An example of the posture/position adjustment mechanism 160 is a so-called six-axis parallel link type mechanism.

The six-axis parallel link type mechanism includes six linear motion actuators 161, a base 162, and an end 163.

One end of each of the six linear motion actuators is swingably fixed to the base 162.

The other end of each of the six linear motion actuators is swingably fixed to the end 163.

An opening O is provided in a central part of the base 162.

An opening O is provided in a central part of the end 163.

A magnetic flux space S that is a space is formed between the opening O provided in the base 162 and the opening O provided in the end 163.

A magnetic flux generated between the electric power supply primary coil 111 and an electric power supply secondary coil 121 flows in the magnetic flux space S.

A length of the six-axis linear motion actuator (L1, L2, L3, L4, L5, L6) is expanded and contracted, whereby the spatial six-degree-of-freedom of the end 163 is changed.

The end 163 supports the combination electromagnetic circuit 131.

As a result, the length of the six-axis linear motion actuator (L1, L2, L3, L4, L5, L6) is expanded and contracted, whereby the spatial six-degree-of-freedom of the combination electromagnetic circuit 131 is changed.

When a specific object 171 that is an object that has made an electric power supply request is located at the specific position, electric power is supplied in a wireless manner from the electric power supply primary coil 111 to the electric power supply secondary coil 121 after specific coil position information corresponding to information related to a position of the electric power supply secondary coil 121 incorporated in the specific object 171 is obtained, and the posture/position adjustment mechanism 160 expands and contracts the six-axis linear motion actuator 161 based on the specific coil position information to set the spatial six-degree-of-freedom of the combination electromagnetic circuit 131 to the predetermined spatial six-degree-of-freedom and cause the combination electromagnetic circuit 131 to be located between the electric power supply primary coil 111 and the electric power supply secondary coil 121.

Accordingly, a magnetic field generated between the electric power supply primary coil 111 and the electric power supply secondary coil 121 is generated in the magnetic flux space S surrounded by a three-axis linear motion actuator of the six-axis parallel link type mechanism.

Since a procedure for obtaining the specific coil position information is the same as that described in the wireless power transfer system according to the seventh embodiment, the description will be omitted.

Next, a wireless power transfer system 100 according to an eleventh embodiment of the present disclosure will be described based on the drawings.

Figure 21:
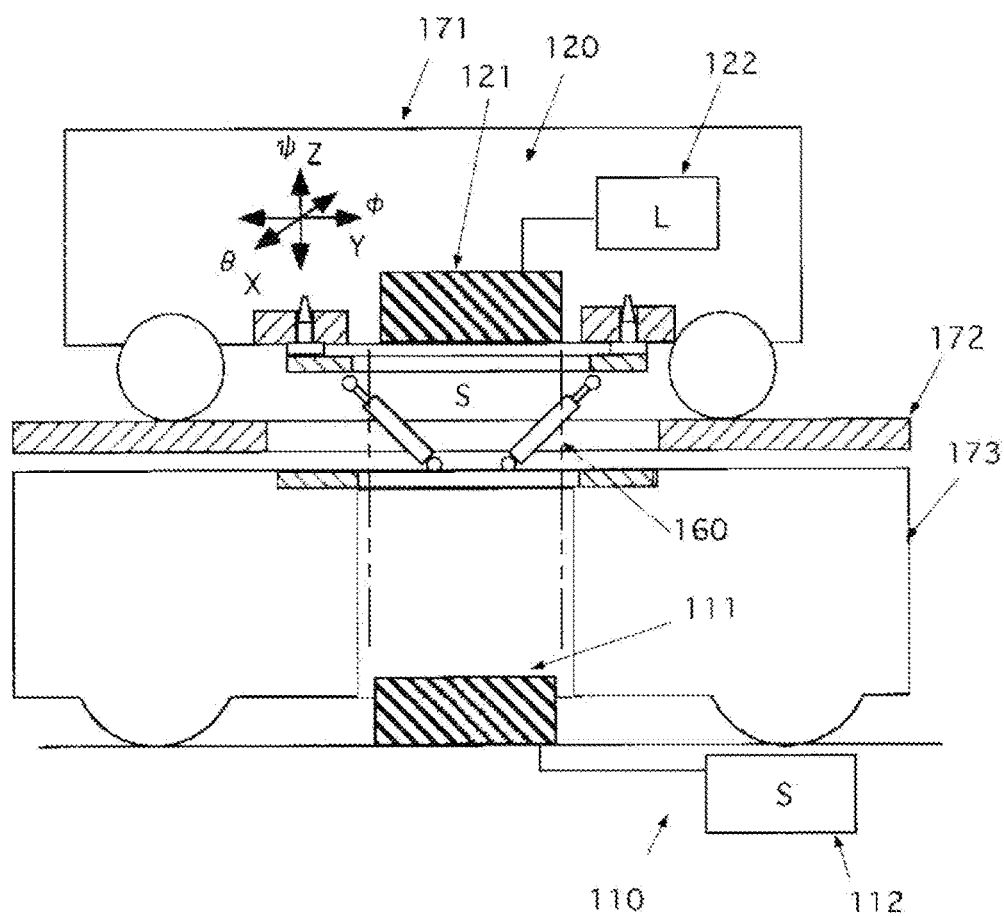
FIG. 21 is a conceptual diagram of a wireless power transfer system according to an eleventh embodiment of the present disclosure.

FIG. 21 is a conceptual diagram of the wireless power transfer system according to the eleventh embodiment of the present disclosure.

The wireless power transfer system 100 according to the eleventh embodiment of the present disclosure includes an electric power supply apparatus 110, a posture/position adjustment mechanism 160, and a movable body 173.

The wireless power transfer system 100 according to the eleventh embodiment of the present disclosure may include the electric power supply apparatus 110, the posture/position adjustment mechanism 160, an object support structure 172, and the movable body 173.

Since the configurations of the electric power supply apparatus 110 and the power receiving apparatus 120 are the same as those mentioned above, the description will be omitted.

An electric power supply primary coil 111 is provided at a specific position.

The movable body 173 is a carriage that can support an object.

The movable body 173 may support the object 171 via the object support structure 172.

For example, the movable body 173 is equipped with the object support structure 172 that supports the object 171.

The posture/position adjustment mechanism 160 is a mechanism that is provided at the movable body 173 and can expand and contract a six-axis linear motion actuator to set a spatial six-degree-of-freedom of the object to a predetermined spatial six-degree-of-freedom.

An example of the posture/position adjustment mechanism 160 is a so-called six-axis parallel link type mechanism.

The six-axis parallel link type mechanism includes six linear motion actuators 161, a base 162, and an end 163.

One end of each of the six linear motion actuators is swingably fixed to the base 162.

The other end of each of the six linear motion actuators is swingably fixed to the end 163.

An opening O is provided in a central part of the base 162.

An opening O is provided in a central part of the end 163.

A magnetic flux space S that is a space is formed between the opening O provided in the base 162 and the opening O provided in the end 163.

A magnetic flux generated between the electric power supply primary coil 111 and an electric power supply secondary coil 121 flows in the magnetic flux space S.

A length of the six-axis linear motion actuator (L1, L2, L3, L4, L5, L6) is expanded and contracted, whereby the spatial six-degree-of-freedom of the end 163 is changed.

The end 163 supports the object 171 so as to be detachable and attachable with respect to the object 171.

For example, an engaging part provided on the end 163 is engaged with an engaged part of the object 171 detachably and attachably.

As a result, the length of the six-axis linear motion actuator (L1, L2, L3, L4, L5, L6) is expanded and contracted, whereby the spatial six-degree-of-freedom of the electric power supply secondary coil 121 incorporated in the object 171 is changed.

When the movable body 173 that supports a specific object 171 that is an object 171 that has made an electric power supply request is located at the specific position, electric power is supplied in a wireless manner from the electric power supply primary coil 111 to the electric power supply secondary coil 121 after specific coil position information corresponding to information related to a position of the electric power supply secondary coil 121 incorporated in the specific object 171 is obtained, and the posture/position adjustment mechanism 160 expands and contracts the six-axis linear motion actuator based on the specific coil position information to set the spatial six-degree-of-freedom of the specific object 171 to the predetermined spatial six-degree-of-freedom and adjust a relative posture or position between the electric power supply primary coil 111 and the electric power supply secondary coil 121 incorporated in the specific object 171.

For example, when the movable body 173 that supports the specific object 171 that is the object 171 that has made the electric power supply request is located at the specific position, electric power is supplied in a wireless manner from the electric power supply primary coil 111 to the electric power supply secondary coil 121 after the specific coil position information corresponding to the information related to the position of the electric power supply secondary coil 121 incorporated in the specific object 171 is obtained, and the posture/position adjustment mechanism 160 causes the end 163 to be engaged with the object 171, and expands and contracts the six-axis linear motion actuator based on the specific coil position information to set the spatial six-degree-of-freedom of the specific object 171 to the predetermined spatial six-degree-of-freedom and adjust the relative posture or position between the electric power supply primary coil 111 and the electric power supply secondary coil 121 incorporated in the specific object 171.

Accordingly, a magnetic field generated between the electric power supply primary coil 111 and the electric power supply secondary coil 121 is generated in the magnetic flux space S surrounded by a three-axis linear motion actuator of the six-axis parallel link type mechanism.

Since a procedure for obtaining the specific coil position information is the same as that described in the wireless power transfer system according to the seventh embodiment, the description will be omitted.

Next, a wireless power transfer system 100 according to a twelfth embodiment of the present disclosure will be described based on the drawings.

Figure 22:
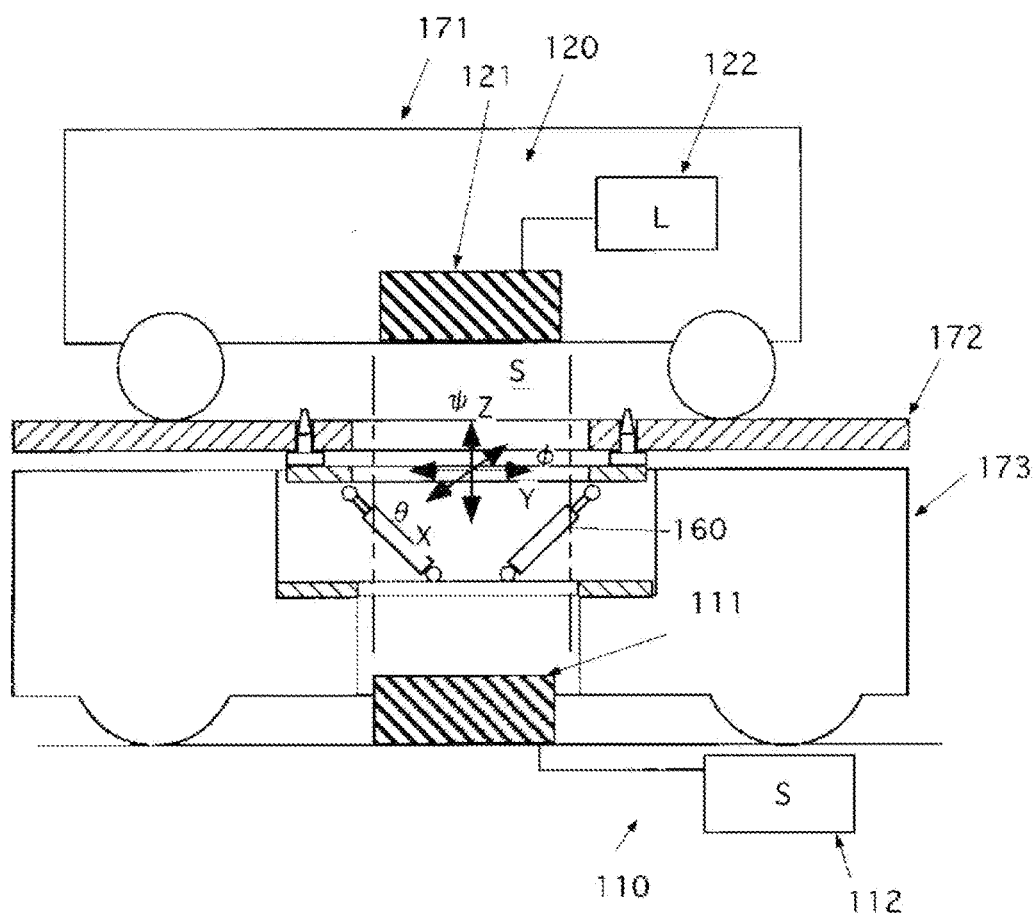
FIG. 22 is a conceptual diagram of a wireless power transfer system according to a twelfth embodiment of the present disclosure.

FIG. 22 is a conceptual diagram of the wireless power transfer system according to the twelfth embodiment of the present disclosure.

The wireless power transfer system 100 according to the twelfth embodiment of the present disclosure may include an electric power supply apparatus 110, a posture/position adjustment mechanism 160, an object support structure 172, and a movable body 173.

Since the configurations of the electric power supply apparatus 110 and the power receiving apparatus 120 are the same as those mentioned above, the description will be omitted.

An electric power supply primary coil 111 is provided at a specific position.

The posture/position adjustment mechanism 160 is a mechanism that is provided at the movable body and can expand and contract a six-axis linear motion actuator to set a spatial six-degree-of-freedom of the object support structure to a predetermined spatial six-degree-of-freedom.

An example of the posture/position adjustment mechanism 160 is a so-called six-axis parallel link type mechanism.

The six-axis parallel link type mechanism includes six linear motion actuators 161, a base 162, and an end 163.

One end of each of the six linear motion actuators is swingably fixed to the base 162.

The other end of each of the six linear motion actuators is swingably fixed to the end 163.

An opening O is provided in a central part of the base 162.

An opening O is provided in a central part of the end 163.

A magnetic flux space S that is a space is formed between the opening O provided in the base 162 and the opening O provided in the end 163.

A magnetic flux generated between the electric power supply primary coil 111 and an electric power supply secondary coil 121 flows in the magnetic flux space S.

A length of the six-axis linear motion actuator (L1, L2, L3, L4, L5, L6) is expanded and contracted, whereby the spatial six-degree-of-freedom of the end 163 is changed.

The end 163 supports the object support structure 172 so as to be detachable and attachable with respect to an object 171.

For example, an engaging part provided on the end 163 is engaged with an engaged part of the object support structure 172 detachably and attachably.

As a result, the length of the six-axis linear motion actuator (L1, L2, L3, L4, L5, L6) is expanded and contracted, whereby the spatial six-degree-of-freedom of the electric power supply secondary coil 121 incorporated in the object 171 is changed.

When the movable body 173 equipped with the object support structure 172 that supports a specific object 171 that is an object 171 that has made an electric power supply request is located at the specific position, electric power is supplied in a wireless manner from the electric power supply primary coil 111 to the electric power supply secondary coil 121 after specific coil position information corresponding to information related to a position of the electric power supply secondary coil 121 incorporated in the specific object 171 is obtained, and the posture/position adjustment mechanism 160 expands and contracts the six-axis linear motion actuator 161 based on the specific coil position information to set the spatial six-degree-of-freedom of the object support structure 172 that supports the specific object 171 to the predetermined spatial six-degree-of-freedom and adjust a relative posture or position between the electric power supply primary coil 111 and the electric power supply secondary coil 121 incorporated in the specific object 171.

For example, when the movable body 173 equipped with the object support structure 172 that supports the specific object 171 that is the object 171 that has made the electric power supply request is located at the specific position, electric power is supplied in a wireless manner from the electric power supply primary coil 111 to the electric power supply secondary coil 12 after the specific coil position information corresponding to the information related to the position of the electric power supply secondary coil 121 incorporated in the specific object 171 is obtained, and the posture/position adjustment mechanism 160 causes the end 163 to be engaged with the object support structure 172, and expands and contracts the six-axis linear motion actuator 161 based on the specific coil position information to set the spatial six-degree-of-freedom of the object support structure 172 that supports the specific object 171 to the predetermined spatial six-degree-of-freedom and adjust the relative posture or position between the electric power supply primary coil 111 and the electric power supply secondary coil 121 incorporated in the specific object 171.

Accordingly, a magnetic field generated between the electric power supply primary coil 111 and the electric power supply secondary coil 121 is generated in the magnetic flux space S surrounded by a three-axis linear motion actuator of the six-axis parallel link type mechanism.

Since a procedure for obtaining the specific coil position information is the same as that described in the wireless power transfer system according to the seventh embodiment, the description will be omitted.

Next, a wireless power transfer system according to a thirteenth embodiment of the present disclosure will be described based on the drawings.

Figure 23:
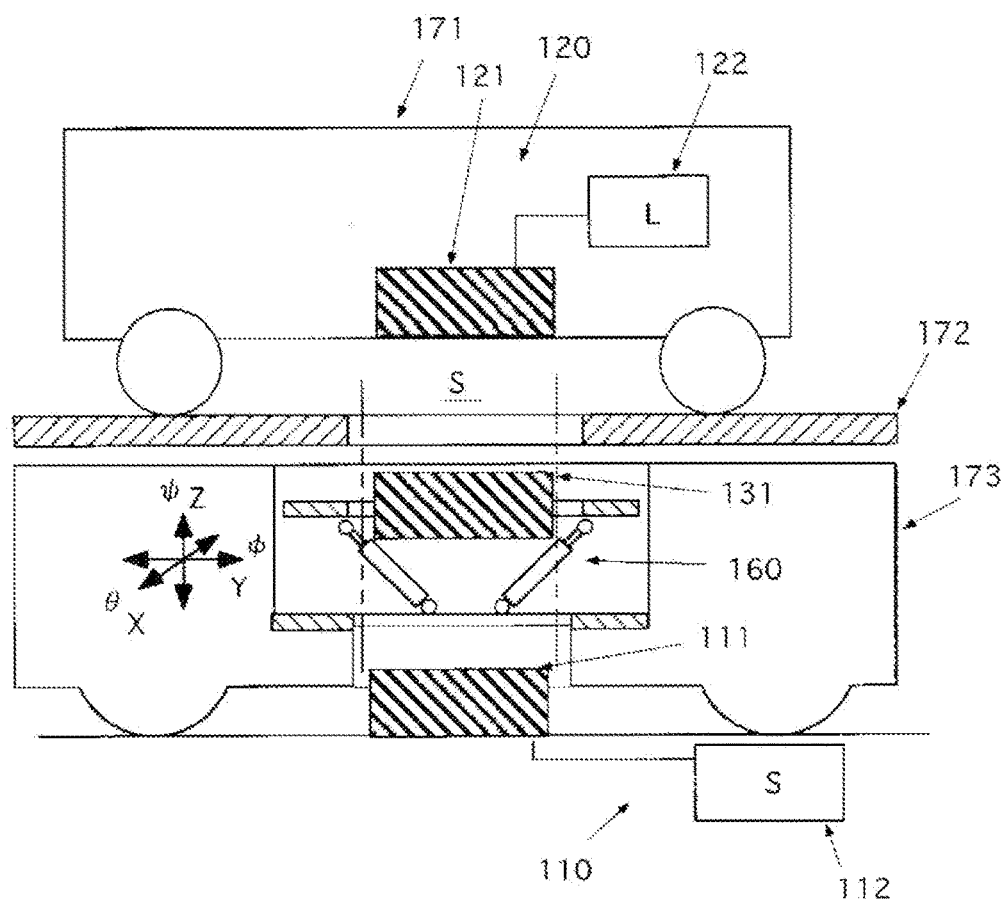
FIG. 23 is a conceptual diagram of a wireless power transfer system according to a thirteenth embodiment of the present disclosure.
Figure 24A:
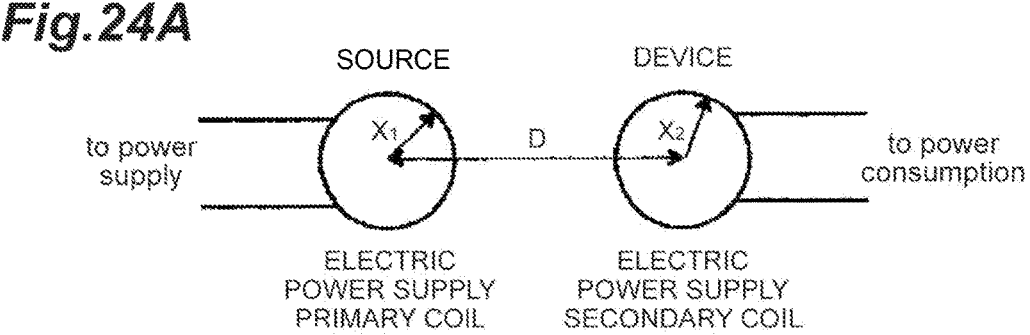
FIGS. 24A and 24B are conceptual diagrams of the wireless power transfer system.
Figure 24B:
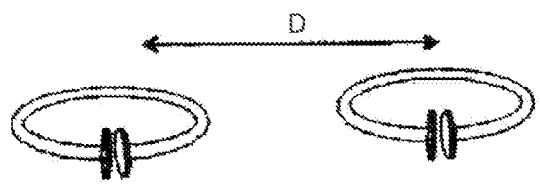

FIG. 23 is a conceptual diagram of the wireless power transfer system according to the thirteenth embodiment of the present disclosure.

The wireless power transfer system 100 according to the thirteenth embodiment of the present disclosure includes an electric power supply apparatus 110, a relay apparatus 130, a posture/position adjustment mechanism 160, and a movable body 173.

The wireless power transfer system 100 according to the thirteenth embodiment of the present disclosure may include the electric power supply apparatus 110, the posture/position adjustment mechanism 160, an object support structure 172, and the movable body 173.

Since the configurations of the electric power supply apparatus 110 and the relay apparatus 130 are the same as those mentioned above, the description will be omitted.

An electric power supply primary coil 111 is provided at a specific position.

The posture/position adjustment mechanism 160 is a mechanism that is provided at the movable body 173 and can expand and contract a six-axis linear motion actuator to set a spatial six-degree-of-freedom of a combination electromagnetic circuit to a predetermined spatial six-degree-of-freedom. An example of the posture/position adjustment mechanism 160 is a so-called six-axis parallel link type mechanism.

The six-axis parallel link type mechanism includes six linear motion actuators 161, a base 162, and an end 163.

One end of each of the six linear motion actuators is swingably fixed to the base 162.

The other end of each of the six linear motion actuators is swingably fixed to the end 163.

An opening O is provided in a central part of the base 162.

An opening O is provided in a central part of the end 163.

A magnetic flux space S that is a space is formed between the opening O provided in the base 162 and the opening O provided in the end 163.

A magnetic flux generated between the electric power supply primary coil 111 and an electric power supply secondary coil 121 flows in the magnetic flux space S.

A length of the six-axis linear motion actuator (L1, L2, L3, L4, L5, L6) is expanded and contracted, whereby the spatial six-degree-of-freedom of the end 163 is changed.

The end 163 supports the combination electromagnetic circuit 131.

As a result, the length of the six-axis linear motion actuator (L1, L2, L3, L4, L5, L6) is expanded and contracted, whereby the spatial six-degree-of-freedom of the combination electromagnetic circuit 131 is changed.

When the movable body 173 that supports a specific object 171 that is an object 171 that has made an electric power supply request is located at the specific position, electric power is supplied in a wireless manner from the electric power supply primary coil 111 to the electric power supply secondary coil 121 after specific coil position information corresponding to information related to a position of the electric power supply secondary coil 121 incorporated in the specific object 171 is obtained, and the posture/position adjustment mechanism 160 expands and contracts the six-axis linear motion actuator 161 based on the specific coil position information to set the spatial six-degree-of-freedom of the combination electromagnetic circuit 131 to the predetermined spatial six-degree-of-freedom and cause the combination electromagnetic circuit 131 to be located between the electric power supply primary coil 111 and the electric power supply secondary coil 121.

When the movable body 173 equipped with the object support structure 172 that supports the specific object 171 that is the object 171 that has made the electric power supply request is located at the specific position, electric power is supplied in a wireless manner from the electric power supply primary coil 111 to the electric power supply secondary coil 121 after the specific coil position information corresponding to the information related to the position of the electric power supply secondary coil 121 incorporated in the specific object 171 is obtained, and the posture/position adjustment mechanism 160 expands and contracts the six-axis linear motion actuator 161 based on the specific coil position information to set the spatial six-degree-of-freedom of the combination electromagnetic circuit 131 to the predetermined spatial six-degree-of-freedom and cause the combination electromagnetic circuit 131 to be located between the electric power supply primary coil 111 and the electric power supply secondary coil 121.

Accordingly, a magnetic field generated between the electric power supply primary coil 111 and the electric power supply secondary coil 121 is generated in the magnetic flux space S surrounded by a three-axis linear motion actuator of the six-axis parallel link type mechanism.

Since a procedure for obtaining the specific coil position information is the same as that described in the wireless power transfer system according to the seventh embodiment, the description will be omitted. With respect to the seventh to thirteenth embodiments, since a vehicle electric power supply device and operation thereof are the same as those described in the first to sixth embodiments with reference to FIGS. 8 to 15, the description will be omitted.

The wireless power transfer system according to the embodiment of the present disclosure has the following effects owing to its configuration.

When the object 171 having the electric power supply request is located at the specific position, electric power is supplied in a wireless manner from the electric power supply primary coil 111 to the electric power supply secondary coil 121 after the position change mechanism 165 provided at the specific position changes the position of the posture/position adjustment mechanism 160 to the approach position to approach the object, the posture/position adjustment mechanism 160 expands and contracts the six-axis linear motion actuator 161 based on the information related to the position of the electric power supply secondary coil 121 incorporated in the object 171 to change the spatial six-degree-of-freedom of the electric power supply primary coil 111 and adjust the relative spatial relation between the electric power supply primary coil 111 and the electric power supply secondary coil 121. Therefore, electric power can be efficiently supplied in a wireless manner from the electric power supply primary coil 111 to the electric power supply secondary coil 121 incorporated in the specific object.

When the object 171 having the electric power supply request is located at the specific position, electric power is supplied in a wireless manner from the electric power supply primary coil 111 to the electric power supply secondary coil 121 after the posture/position adjustment mechanism 160 provided at the specific position expands and contracts the six-axis linear motion actuator 161 based on the information related to the position of the electric power supply secondary coil 121 incorporated in the object 171 to change the spatial six-degree-of-freedom of the object 171 and adjust the relative spatial relation between the electric power supply primary coil 111 and the electric power supply secondary coil 121. Therefore, electric power can be efficiently supplied in a wireless manner from the electric power supply primary coil 111 to the electric power supply secondary coil 121 incorporated in the specific object 171.

When the object support structure 172 that supports the object 171 having the electric power supply request is located at the specific position, electric power is supplied in a wireless manner from the electric power supply primary coil 111 to the electric power supply secondary coil 121 after the posture/position adjustment mechanism 160 provided at the specific position expands and contracts the six-axis linear motion actuator 161 based on the information related to the position of the electric power supply secondary coil 121 incorporated in the object 171 to change the spatial six-degree-of-freedom of the object support structure 172 that supports the object 171 and adjust the relative spatial relation between the electric power supply primary coil 111 and the electric power supply secondary coil 121. Therefore, electric power can be efficiently supplied in a wireless manner from the electric power supply primary coil 111 to the electric power supply secondary coil 121 incorporated in the specific object 171.

When the object 171 having the electric power supply request is located at the specific position, electric power is supplied in a wireless manner from the electric power supply primary coil 111 to the electric power supply secondary coil 121 after the posture/position adjustment mechanism 160 provided at the specific position expands and contracts the six-axis linear motion actuator 161 based on the information related to the position of the electric power supply secondary coil 121 incorporated in the object 171 to change the spatial six-degree-of-freedom of the combination electromagnetic circuit 131 and cause the combination electromagnetic circuit 131 to be located between the electric power supply primary coil 111 and the electric power supply secondary coil 121. Therefore, electric power can be efficiently supplied in a wireless manner from the electric power supply primary coil 111 to the electric power supply secondary coil 121 incorporated in the specific object 171.

When the movable body 173 that supports the object 171 having the electric power supply request is located at the specific position, electric power is supplied in a wireless manner from the electric power supply primary coil 111 to the electric power supply secondary coil 121 after the posture/position adjustment mechanism 160 provided at the movable body 173 expands and contracts the six-axis linear motion actuator 161 based on the information related to the position of the electric power supply secondary coil 121 incorporated in the object 171 to change the spatial six-degree-of-freedom of the object and adjust the relative spatial relation between the electric power supply primary coil 111 and the electric power supply secondary coil 121. Therefore, electric power can be efficiently supplied in a wireless manner from the electric power supply primary coil 111 to the electric power supply secondary coil 121 incorporated in the specific object 171.

When the movable body 173 equipped with the object support structure 172 that supports the object 171 having the electric power supply request is located at the specific position, electric power is supplied in a wireless manner from the electric power supply primary coil 111 to the electric power supply secondary coil 121 after the posture/position adjustment mechanism 160 provided at the movable body 173 expands and contracts the six-axis linear motion actuator 161 based on the information related to the position of the electric power supply secondary coil 121 incorporated in the object 171 to change the spatial six-degree-of-freedom of the object support structure 172 and adjust the relative spatial relation between the electric power supply primary coil 111 and the electric power supply secondary coil 121. Therefore, electric power can be efficiently supplied in a wireless manner from the electric power supply primary coil 111 to the electric power supply secondary coil 121 incorporated in the specific object 171.

When the movable body 173 equipped with the object 171 having the electric power supply request is located at the specific position, electric power is supplied in a wireless manner from the electric power supply primary coil 111 to the electric power supply secondary coil 121 after the posture/position adjustment mechanism 160 provided at the movable body 173 expands and contracts the six-axis linear motion actuator 161 based on the information related to the position of the electric power supply secondary coil 121 incorporated in the object 171 to change the spatial six-degree-of-freedom of the combination electromagnetic circuit 131 and cause the combination electromagnetic circuit 131 to be located between the electric power supply primary coil 111 and the electric power supply secondary coil 121. Therefore, electric power can be efficiently supplied in a wireless manner from the electric power supply primary coil 111 to the electric power supply secondary coil 121 incorporated in the specific object 171.

Each of the plurality of items of kind information is preliminarily correlated with the corresponding one of the plurality of items of coil position information, each of the plurality of items of kind information and each of the plurality of items of coil position information are recorded, the specific kind information of the specific object that has made the electric power supply request is obtained, and the specific coil position information related to the specific kind information is obtained. Therefore, the specific coil position information can be easily obtained in accordance with a lot of kinds of the objects, and electric power can be efficiently supplied in a wireless manner from the electric power supply primary coil to the electric power supply secondary coil incorporated in the specific object.

The vehicle electric power supply device according to the embodiment of the present disclosure has the following effects owing to its configuration.

When the vehicle 5 having the electric power supply request is located at the specific position, electric power is supplied in a wireless manner from the electric power supply primary coil 21 to the electric power supply secondary coil 6 after the position change mechanism provided at the specific position changes the position of the posture/position adjustment mechanism to the approach position to approach the vehicle 5, the posture/position adjustment mechanism expands and contracts the six-axis linear motion actuator based on the information related to the position of the electric power supply secondary coil 6 incorporated in the vehicle 5 to change the spatial six-degree-of-freedom of the electric power supply primary coil 21 and adjust the relative spatial relation between the electric power supply primary coil 21 and the electric power supply secondary coil 6. Therefore, electric power can be efficiently supplied in a wireless manner from the electric power supply primary coil 21 to the electric power supply secondary coil 6 incorporated in the specific vehicle 5.

When the vehicle 5 having the electric power supply request is located at the specific position, electric power is supplied in a wireless manner from the electric power supply primary coil 21 to the electric power supply secondary coil 6 after the posture/position adjustment mechanism provided at the specific position expands and contracts the six-axis linear motion actuator based on the information related to the position of the electric power supply secondary coil 6 incorporated in the vehicle 5 to change the spatial six-degree-of-freedom of the vehicle 5 and adjust the relative spatial relation between the electric power supply primary coil 21 and the electric power supply secondary coil 6. Therefore, electric power can be efficiently supplied in a wireless manner from the electric power supply primary coil 21 to the electric power supply secondary coil 6 incorporated in the specific vehicle 5.

When the vehicle support structure 30 that supports the vehicle 5 having the electric power supply request is located at the specific position, electric power is supplied in a wireless manner from the electric power supply primary coil 21 to the electric power supply secondary coil 6 after the posture/position adjustment mechanism provided at the specific position expands and contracts the six-axis linear motion actuator based on the information related to the position of the electric power supply secondary coil 6 incorporated in the vehicle 5 to change the spatial six-degree-of-freedom of the vehicle support structure 30 that supports the vehicle 5 and adjust the relative spatial relation between the electric power supply primary coil 21 and the electric power supply secondary coil 6. Therefore, electric power can be efficiently supplied in a wireless manner from the electric power supply primary coil 21 to the electric power supply secondary coil 6 incorporated in the specific vehicle 5.

When the vehicle 5 having the electric power supply request is located at the specific position, electric power is supplied in a wireless manner from the electric power supply primary coil 21 to the electric power supply secondary coil 6 after the posture/position adjustment mechanism provided at the specific position expands and contracts the six-axis linear motion actuator based on the information related to the position of the electric power supply secondary coil 6 incorporated in the object vehicle 5 to change the spatial six-degree-of-freedom of the combination electromagnetic circuit and cause the combination electromagnetic circuit to be located between the electric power supply primary coil 21 and the electric power supply secondary coil 6. Therefore, electric power can be efficiently supplied in a wireless manner from the electric power supply primary coil 21 to the electric power supply secondary coil 6 incorporated in the specific vehicle 5.

When the movable carriage 40 that supports the vehicle 5 having the electric power supply request is located at the specific position, electric power is supplied in a wireless manner from the electric power supply primary coil 21 to the electric power supply secondary coil 6 after the posture/position adjustment mechanism provided at the movable carriage 40 expands and contracts the six-axis linear motion actuator based on the information related to the position of the electric power supply secondary coil 6 incorporated in the vehicle 5 to change the spatial six-degree-of-freedom of the vehicle 5 and adjust the relative spatial relation between the electric power supply primary coil 21 and the electric power supply secondary coil 6. Therefore, electric power can be efficiently supplied in a wireless manner from the electric power supply primary coil 21 to the electric power supply secondary coil 6 incorporated in the specific vehicle 5.

When the movable carriage 40 equipped with the vehicle support structure 30 that supports the vehicle 5 having the electric power supply request is located at the specific position, electric power is supplied in a wireless manner from the electric power supply primary coil 21 to the electric power supply secondary coil 6 after the posture/position adjustment mechanism provided at the movable carriage 40 expands and contracts the six-axis linear motion actuator based on the information related to the position of the electric power supply secondary coil 6 incorporated in the vehicle 5 to change the spatial six-degree-of-freedom of the vehicle support structure 30 and adjust the relative spatial relation between the electric power supply primary coil 21 and the electric power supply secondary coil 6. Therefore, electric power can be efficiently supplied in a wireless manner from the electric power supply primary coil 21 to the electric power supply secondary coil 6 incorporated in the specific vehicle 5.

When the movable carriage 40 equipped with the vehicle support structure 30 that supports the vehicle 5 having the electric power supply request is located at the specific position, electric power is supplied in a wireless manner from the electric power supply primary coil 21 to the electric power supply secondary coil 6 after the posture/position adjustment mechanism provided at the movable carriage 40 expands and contracts the six-axis linear motion actuator based on the information related to the position of the electric power supply secondary coil incorporated in the vehicle to change the spatial six-degree-of-freedom of the combination electromagnetic circuit and cause the combination electromagnetic circuit to be located between the electric power supply primary coil 21 and the electric power supply secondary coil 6. Therefore, electric power can be efficiently supplied in a wireless manner from the electric power supply primary coil 21 to the electric power supply secondary coil 6 incorporated in the specific vehicle 5.

Each of the plurality of items of kind information is preliminarily correlated with the corresponding one of the plurality of items of coil position information, each of the plurality of items of kind information and each of the plurality of items of coil position information are recorded, the specific kind information of the specific vehicle that has made the electric power supply request is obtained, and the specific coil position information related to the specific kind information is obtained. Therefore, the specific coil position information can be easily obtained in accordance with a lot of kinds of the vehicles, and electric power can be efficiently supplied in a wireless manner from the electric power supply primary coil to the electric power supply secondary coil incorporated in the specific vehicle.

The present disclosure is not limited to the above-mentioned embodiments, and can be variously changed in a range not deviating from the gist of the disclosure.

Although an exemplary case where a vehicle power collecting device includes the relay apparatus has been described, the present disclosure is not limited to this exemplary case. The vehicle power collecting device may not include the relay apparatus.

A plate made of a material that does not affect the magnetic field may cover the void.

Although an exemplary case where the present disclosure is applied to the parking device has been described, the present disclosure is not limited to this exemplary case. For example, such a case may be employed that the transfer apparatus or the storage space is not included.

Although an exemplary case where a moving mechanism of the parking device is configured to be an elevator parking device has been described, the present disclosure is not limited to this exemplary case. For example, a circulation mechanism may be employed, such as a box circulation parking device, a horizontal circulation parking device, a merry-go-round parking device, an elevator sliding parking device, a plane reciprocating parking device, a transporting storage parking device, and a two-stage or multiple-stage parking device.

INDUSTRIAL APPLICABILITY

According to some aspects of the present disclosure, easily available power supply can be performed with a small energy loss using a simple structure.

REFERENCE SIGNS LIST

H moving path
Q1 movable carriage void
Q2 vehicle support structure void
K contour
O opening
S magnetic flux space
5 vehicle
6 electric power supply secondary coil
7 charging cable
10 main structure
11 storage space
12 rail for movement
20 wireless power transfer system
21 electric power supply primary coil
22 drive circuit
30 vehicle support structure
31 vehicle support structure main body
31L left wheel support structure part
31R right wheel support structure part
40 movable carriage
41 movable carriage main body
44 power storage apparatus
50 transfer apparatus
70 relay apparatus
71 combination electromagnetic circuit
100 wireless power transfer system
110 electric power supply apparatus
111 electric power supply primary coil
112 drive circuit
120 power receiving apparatus
121 electric power supply secondary coil
122 load
130 relay apparatus
131 combination electromagnetic circuit
160 posture/position adjustment mechanism
161 linear motion actuator
162 base
163 end
165 position change mechanism
171 object
172 object support structure
173 movable body

The invention claimed is:

1. A wireless power transfer system that supplies electric power to an object in which an electric power supply secondary coil capable of receiving wireless power transfer is incorporated, the wireless power transfer system comprising:
an electric power supply apparatus having an electric power supply primary coil capable of supplying electric power to the electric power supply secondary coil in a wireless manner, and a drive circuit that drives the electric power supply primary coil; and
a posture/position adjustment mechanism capable of adjusting a relative posture or position between the electric power supply primary coil and the electric power supply secondary coil, wherein
the wireless power transfer system obtains, by means of data transfer, specific coil position information that is coil position information corresponding to information related to a position of the electric power supply secondary coil in a specific object that is an object that has made an electric power supply request,
electric power is supplied in a wireless manner from the electric power supply primary coil to the electric power supply secondary coil after the posture/position adjustment mechanism adjusts the relative posture or position between the electric power supply primary coil and the electric power supply secondary coil incorporated in the specific object based on the information related to the position of the electric power supply secondary coil in the specific object corresponding to the specific coil position information,
the posture/position adjustment mechanism is a mechanism capable of expanding and contracting a six-axis linear motion actuator to set a spatial six-degree-of-freedom of the electric power supply primary coil to a predetermined spatial six-degree-of-freedom,
the wireless power transfer system further comprises a position change mechanism provided at a specific position and supporting the posture/position adjustment mechanism, the position change mechanism being capable of changing a position of the posture/position adjustment mechanism between an approach position that is a position to approach the object and a separate position that is a position to be separated from the object, when the specific object is located at the specific position, electric power is supplied in a wireless manner from the electric power supply primary coil to the electric power supply secondary coil after the specific coil position information corresponding to the information related to the position of the electric power supply secondary coil incorporated in the specific object is obtained, the position change mechanism changes the position of the posture/position adjustment mechanism from the separate position to the approach position, and the posture/position adjustment mechanism expands and contracts the six-axis linear motion actuator based on the specific coil position information to set the spatial six-degree-of-freedom of the electric power supply primary coil to the predetermined spatial six-degree-of-freedom and adjust the relative posture or position between the electric power supply primary coil and the electric power supply secondary coil incorporated in the specific object, and the spatial six-degree-of-freedom is a back and forth swing, a left and right swing, an up and down swing, a horizontal swing, a vertical swing, and a bow swing.

2. The wireless power transfer system according to claim 1, wherein the wireless power transfer system preliminarily records, in a database, a plurality of items of kind information, which correspond to a kind of a plurality of the objects, and a plurality of items of coil position information, which correspond to a plurality of items of coil position information related to a position of the electric power supply secondary coil in the plurality of objects, by associating each of the plurality of items of kind information with each of the plurality of items of coil position information, the wireless power transfer system obtains specific kind information that is kind information of the specific object that is the object that has made the electric power supply request, and the wireless power transfer system obtains, as the specific coil position information, the coil position information related to the specific kind information extracted from the database.

3. A vehicle electric power supply device capable of allowing a vehicle that is an object to be parked, the vehicle electric power supply device comprising:

a main structure forming a parking space in which the vehicle is parked; and the wireless power transfer system according to claim 1.

* * * * *